US012565548B2

(12) United States Patent
Hayashi et al.

(10) Patent No.: US 12,565,548 B2
(45) Date of Patent: Mar. 3, 2026

(54) COMPOUND, POLYMERIZABLE COMPOSITION, AND CURED PRODUCT

(71) Applicant: FUJIFILM Corporation, Tokyo (JP)

(72) Inventors: Daisuke Hayashi, Kanagawa (JP); Keita Takahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 96 days.

(21) Appl. No.: 18/611,199

(22) Filed: Mar. 20, 2024

(65) Prior Publication Data

US 2024/0294678 A1 Sep. 5, 2024

Related U.S. Application Data

(63) Continuation of application No. PCT/JP2022/035369, filed on Sep. 22, 2022.

(30) Foreign Application Priority Data

Sep. 22, 2021 (JP) ................................ 2021-154609

(51) Int. Cl.
*C08F 20/28* (2006.01)
*C09K 11/02* (2006.01)
(Continued)

(52) U.S. Cl.
CPC ............ *C08F 20/28* (2013.01); *C09K 11/025* (2013.01); *C09K 11/565* (2013.01); *C09K 11/70* (2013.01); *C08F 2810/40* (2013.01)

(58) Field of Classification Search
CPC .... C08F 20/28; C08F 2810/40; C09K 11/025; C09K 11/70; C09K 11/565
See application file for complete search history.

(56) References Cited

U.S. PATENT DOCUMENTS 9,044,902 B2 6/2015 Bowman et al.
2010/0233595 A1* 9/2010 Takahashi ................ C08F 2/38 430/7
(Continued)

FOREIGN PATENT DOCUMENTS

JP 2007-277514 A 10/2007
JP 2011127059 A * 6/2011 ............... C08K 5/29
(Continued)

OTHER PUBLICATIONS

International Search Report issued in PCT/JP2022/035369 on Nov. 22, 2022.
(Continued)

*Primary Examiner* — Bijan Ahvazi
(74) *Attorney, Agent, or Firm* — Edwards Neils LLC; Jean C. Edwards, Esq.

(57) ABSTRACT

A compound represented by General Formula (1) $(A^1\text{-}R^1\text{—}S\text{)}_pZ\text{(}S\text{—}R^2\text{—}P^1)_q$. In General Formula (1), $P^1$ represents a polymer structure including a partial structure represented by General Formula (2) $*\text{—}X^2\text{—}O\text{(}Y^1\text{—}O\text{)}_{n1}X^1$. In General Formula (2), n is 1 or more, in a case where n1 is 1, $X^1$ represents a monovalent organic group, $X^2$ represents a divalent organic group, $Y^1$ represents a branched divalent hydrocarbon group, and $Y^1$ and $X^1$ or $X^2$ may form a ring, provided that the ring is a four- or more membered ring, and in a case where n1 is 2 or more, $X^1$ represents a hydrogen atom or a monovalent organic group, $X^2$ represents a divalent organic group, $Y^1$ represents a divalent organic group, and one or more $Y^1$'s each represent a branched divalent organic group, and $Y^1$ and $X^1$ or $X^2$ may form a ring.

13 Claims, 11 Drawing Sheets

(51) Int. Cl.
*C09K 11/56* (2006.01)
*C09K 11/70* (2006.01)

(56) References Cited

U.S. PATENT DOCUMENTS

2012/0160828 A1* 6/2012 Bowman ................. B29C 73/18 219/603
2015/0166780 A1* 6/2015 Arayama .............. G03F 7/0007 522/39

FOREIGN PATENT DOCUMENTS

JP 5454126 B2 3/2014
JP 2014-062222 A 4/2014

OTHER PUBLICATIONS

Written Opinion issued in PCT/JP2022/035369 on Nov. 22, 2022.
International Preliminary Report on Patentability completed by WIPO on Mar. 26, 2024 in connection with International Patent Application No. PCT/JP2022/035369.

* cited by examiner

COMPOUND, POLYMERIZABLE COMPOSITION, AND CURED PRODUCT

CROSS-REFERENCE TO RELATED APPLICATIONS

This application is a Continuation of PCT International Application No. PCT/JP2022/035369 filed on Sep. 22, 2022, which was published under PCT Article 21(2) in Japanese, and which claims priority under 35 U.S.C. § 119(a) to Japanese Patent Application No. 2021-154609 filed on Sep. 22, 2021. The above applications are hereby expressly incorporated by reference, in their entirety, into the present application.

BACKGROUND OF THE INVENTION

1. Field of the Invention

The present invention relates to a novel compound, a polymerizable composition including the compound, and a cured product.

2. Description of the Related Art

JP2007-277514A discloses a polymer compound that can be used as a pigment dispersant.

SUMMARY OF THE INVENTION

In paragraphs [0148] and [0155] of JP2007-277514A, various inorganic pigments are described.

In recent years, inorganic particles have been widely used in pigment applications and various other applications. In these applications, from the viewpoints of improving the performance of a film obtained by forming a film of a composition containing inorganic particles, and the like, it is required to enhance the dispersibility of the inorganic particles.

Therefore, the present inventors have studied a dispersant for enhancing the dispersibility of inorganic particles. It is desirable that such dispersant has excellent solubility in the composition containing the inorganic particles in order to excellently exhibit the effect of improving the dispersibility of the inorganic particles. In this regard, a composition containing a polymerizable compound as a composition containing inorganic particles is useful in various applications since this composition can be cured and molded into various shapes such as a film shape. Therefore, as a dispersant for enhancing the dispersibility of the inorganic particles, a dispersant exhibiting high solubility in the polymerizable compound is desirable.

In consideration of the above circumstances, an object of one aspect of the present invention is to provide a novel compound which can contribute to improvement in dispersibility of inorganic particles and can exhibit high solubility in a polymerizable compound.

One aspect of the present invention is as follows.

[1] A compound represented by General Formula (1),

General Formula (1)

$$(A^1-R^1-S\overline{)_p}Z\overline{(}S-R^2-P^1)_q$$

in General Formula (1), p is in a range of 2 to 9, q is in a range of 1 to 8, p+q is an integer in a range of 3 to 10, Z represents a (p+q)-valent organic group, $R^1$ and $R^2$ each independently represent a single bond or a divalent organic group, $A^1$ represents a monovalent group including one or more groups selected from the group consisting of an acidic group, a basic group having a nitrogen atom, a urea group, a urethane group, a group having a coordinating oxygen atom, a hydrocarbon group having 4 or more carbon atoms, an alkoxysilyl group, an epoxy group, an isocyanate group, and a hydroxy group, p pieces of $A^1$'s and p pieces of $R^1$'s may be each independently the same as or different from each other, $P^1$ represents a polymer structure including a partial structure represented by General Formula (2), and in a case where q is 2 or more, q pieces of $P^1$'s and q pieces of $R^2$'s may be each independently the same as or different from each other, General Formula (2)

$$*-X^2-O\left(Y^1-O\right)_{n1}X^1$$

in General Formula (2), n is 1 or more,

* represents a bonding position with an adjacent atom, in a case where n1 is 1, $X^1$ represents a monovalent organic group, $X^2$ represents a divalent organic group, $Y^1$ represents a branched divalent hydrocarbon group, and $Y^1$ and $X^1$ or $X^2$ may form a ring, provided that the ring is a four- or more membered ring, and in a case where n1 is 2 or more, $X^1$ represents a hydrogen atom or a monovalent organic group, $X^2$ represents a divalent organic group, $Y^1$ represents a divalent organic group, one or more $Y^1$'s each represent a branched divalent organic group, and $Y^1$ and $X^1$ or $X^2$ may form a ring, and n1 pieces of Y's may be the same as or different from each other.

[2] The compound according to [1], in which the partial structure represented by General Formula (2) includes a vinyl polymer chain.

[3] The compound according to [2], in which the vinyl polymer chain contains a repeating unit represented by General Formula (4-1), General Formula (4-1)

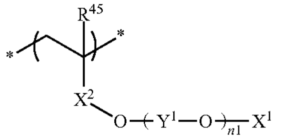

in General Formula (4-1), $R^{45}$ represents a hydrogen atom or a methyl group, $X^1$, $X^2$, $Y^1$, and n1 each have the same definitions as $X^1$, $X^2$, $Y^1$, and n1 in General Formula (2), and * represents a bonding position with an adjacent atom.

[4] The compound according to [3], in which the repeating unit represented by General Formula (4-1) is a repeating unit represented by General Formula (4-3), General Formula (4-3)

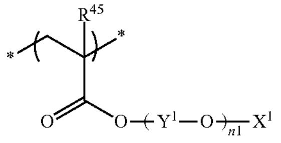

in General Formula (4-3), $R^{45}$ represents a hydrogen atom or a methyl group, $X^1$, $Y^1$, and n1 each have the same definitions as $X^1$, $Y^1$, and n1 in General Formula (2), and * represents a bonding position with an adjacent atom.

[5] The compound according to any one of [1] to [4], in which the polymer structure represented by $P^1$ includes a polyalkylene glycol chain.

[6] The compound according to [5], in which in General Formula (2), $$*-(Y^1-O)_{n1}-*$$

represents a polyalkylene glycol chain, where * represents a bonding position with an adjacent atom.

[7] The compound according to [5] or [6], in which the polyalkylene glycol chain is a polypropylene glycol chain.

[8] The compound according to any one of [1] to [7], in which the compound has a weight-average molecular weight of a range of 4,000 to 15,000.

[9] The compound according to any one of [1] to [8], in which a content of the partial structure represented by General Formula (2) in the polymer structure represented by $P^1$ is 30% by mass or more, provided that in the case where n1 is 2 or more, the partial structure is a moiety in which $Y^1$ is a branched divalent organic group.

[10] The compound according to any one of [1] to [9], in which a content of the partial structure represented by General Formula (2) in the polymer structure represented by $P^1$ is 70% by mass or more, provided that in the case where n1 is 2 or more, the partial structure is a moiety in which $Y^1$ is a branched divalent organic group.

[11] A polymerizable composition comprising the compound according to any one of [1] to [10], inorganic particles, and a polymerizable compound.

[12] A cured product obtained by curing the polymerizable composition according to [11].

According to one aspect of the present invention, it is possible to provide a novel compound which can contribute to improvement in dispersibility of inorganic particles and can exhibit high solubility in a polymerizable compound. In addition, according to one aspect of the present invention, it is possible to provide a polymerizable composition containing the compound and a cured product obtained by curing the polymerizable composition.

DESCRIPTION OF THE PREFERRED EMBODIMENTS

Figure 1:
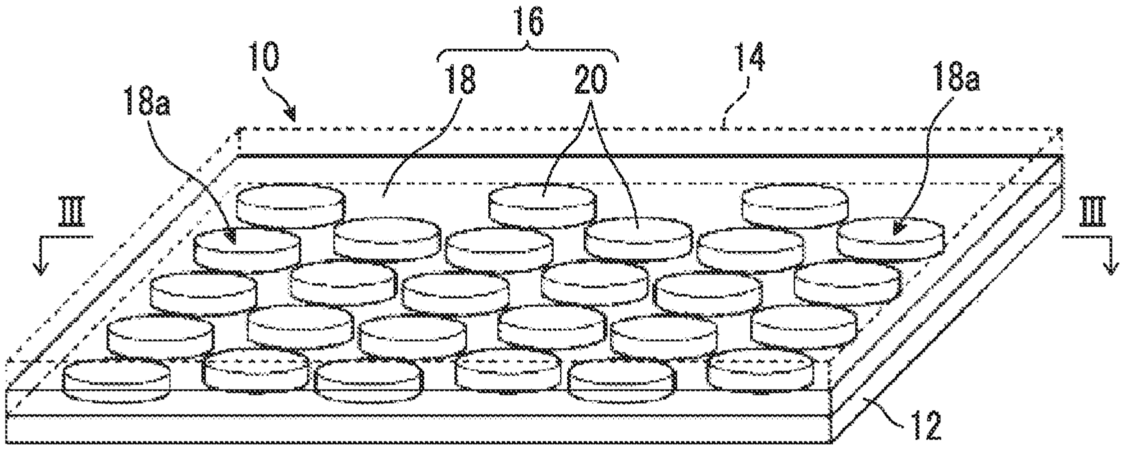
FIG. 1 is a perspective view conceptually showing an example of a wavelength conversion member.

The following description may be based on representative embodiments of the present invention. However, the present invention is not limited to such embodiments. In the present invention and the present specification, any numerical range expressed by using "to" refers to a range including the numerical values before and after the "to" as a lower limit value and an upper limit value, respectively.

[Compound]

One aspect of the present invention relates to a compound represented by General Formula (1). As a result of intensive studies, the present inventors have newly found that the compound represented by General Formula (1) has excellent solubility in a polymerizable compound (hereinafter, also simply referred to as "solubility") and can contribute to improvement of dispersibility of inorganic particles (hereinafter, also simply referred to as "dispersibility"). The present inventors presume that the polymer structure included as $P^1$ in General Formula (1) can contribute to the improvement of the solubility. In addition, it is considered that the fact that a group included in $A^1$ in General Formula (1) can function as an adsorbing group and the fact that the compound represented by General Formula (1) has excellent solubility can contribute to the improvement of dispersibility. However, the present invention is not limited to presumption described in the present specification including the above matters.

Hereinafter, the above compound will be described in more detail.

<General Formula (1)>

In General Formula (1), p is in the range of 2 to 9, q is in the range of 1 to 8, and p+q is an integer in the range of 3 to 10.

p is 2 or more and preferably 3 or more. In addition, p is 9 or less, preferably 8 or less, more preferably 7 or less, and still more preferably 6 or less.

q is 1 or more, and can also be 2 or more. In addition, q is 8 or less, preferably 7 or less, and more preferably in order of 6 or less, 5 or less, 4 or less, and 3 or less.

p+q is 3 or more, and can be 4 or more or 5 or more. In addition, p+q is 10 or less, and can also be 9 or less, 8 or less, or 7 or less.

Z represents a (p+q)-valent organic group. Examples of the organic group represented by Z can include an organic group composed of 1 to 100 carbon atoms, 0 to 10 nitrogen atoms, 0 to 50 oxygen atoms, 1 to 200 hydrogen atoms, and 0 to 20 sulfur atoms. Such organic group may be unsubstituted or may further have a substituent.

Specific examples of the organic group represented by Z can include a group (which may form a ring structure) which is composed of the following structural unit or which is composed of a combination of two or more of the following structural units. Such organic group may be unsubstituted or may further have a substituent.

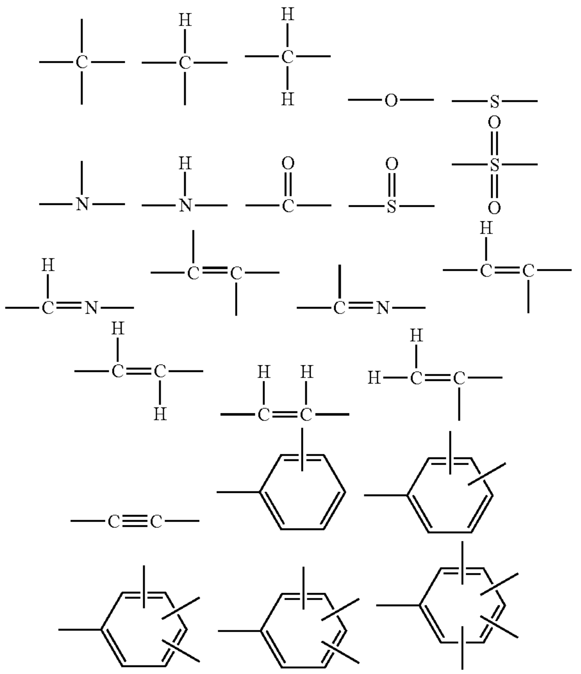

-continued

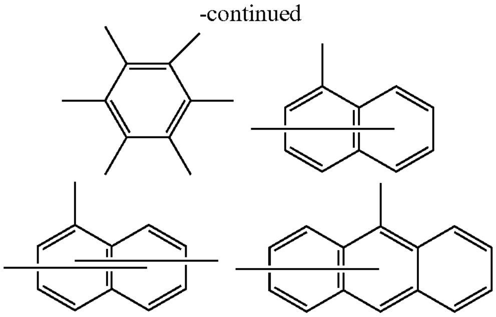

As the organic group represented by Z, an organic group composed of 1 to 60 carbon atoms, 0 to 10 nitrogen atoms, 0 to 40 oxygen atoms, 1 to 120 hydrogen atoms, and 0 to 10 sulfur atoms is preferable, an organic group composed of 1 to 50 carbon atoms, 0 to 10 nitrogen atoms, 0 to 30 oxygen atoms, 1 to 100 hydrogen atoms, and 0 to 7 sulfur atoms is more preferable, and an organic group composed of 1 to 40 carbon atoms, 0 to 8 nitrogen atoms, 0 to 20 oxygen atoms, 1 to 80 hydrogen atoms, and 0 to 5 sulfur atoms is still more preferable. Such organic group may be unsubstituted or may further have a substituent.

In a case where the organic group has substituents, examples of the substituents can include alkyl groups having 1 to 20 carbon atoms such as a methyl group and an ethyl group, aryl groups having 6 to 16 carbon atoms such as a phenyl group and a naphthyl group, acyloxy groups having 1 to 6 carbon atoms such as a hydroxy group, an amino group, a carboxy group, a sulfonamide group, an N-sulfonylamide group, and an acetoxy group, alkoxy groups having 1 to 6 carbon atoms such as a methoxy group and an ethoxy group, halogen atoms such as a chlorine atom and a bromine atom, alkoxycarbonyl group having 2 to 7 carbon atoms such as a methoxycarbonyl group, an ethoxycarbonyl group, and a cyclohexyloxycarbonyl group, a cyano group, carbonate ester groups such as t-butyl carbonate, and the like.

In addition, various groups described below may be unsubstituted or may further have a substituent. For such substituents, reference can be made to the above. In the present invention and the present specification, the number of carbon atoms described for a group having a substituent refers to the number of carbon atoms of a moiety not including the substituent.

Specific examples of the organic group represented by Z (Specific Examples (1) to (17)) are shown below. However, the present invention is not limited to the following specific examples.

(1)

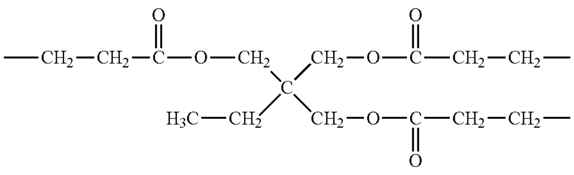

(2)

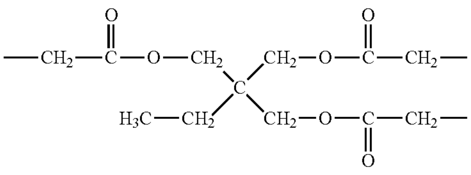

(3)

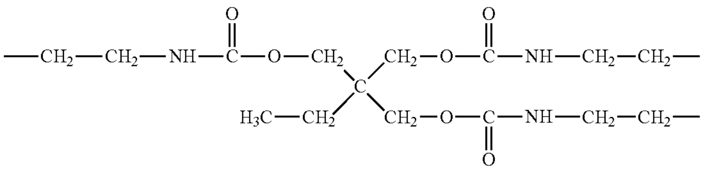

-continued
(4)
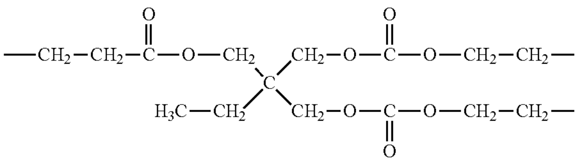
(5)
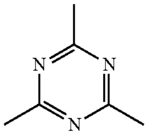
(6)
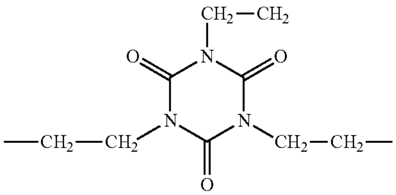
(7)
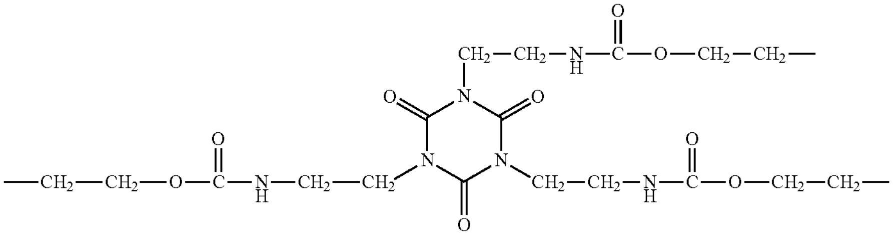
(8)
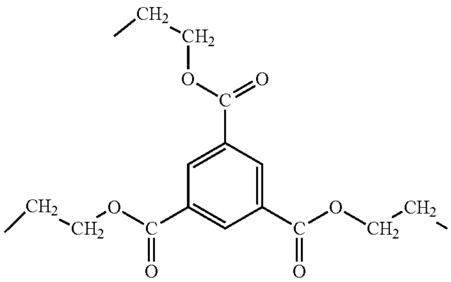
(9)
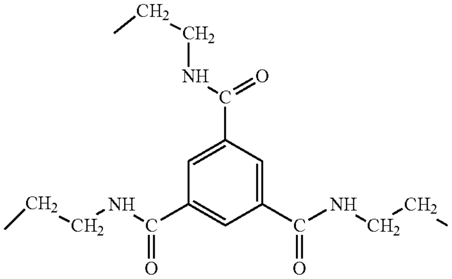
(10)
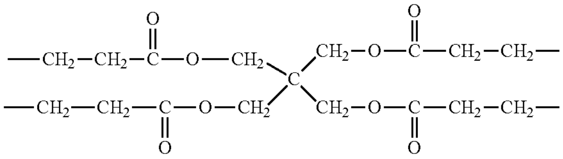
(11)
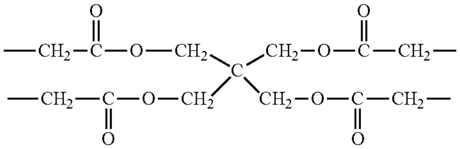
(12)
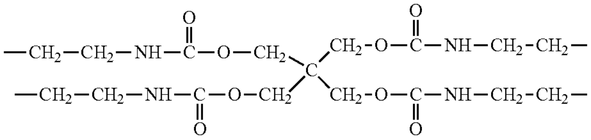
(13)
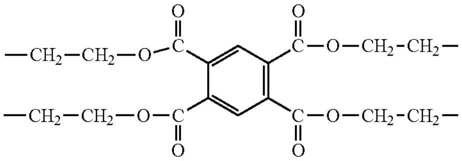
(14)
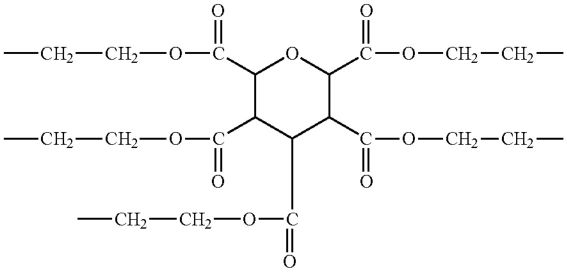

-continued (16)

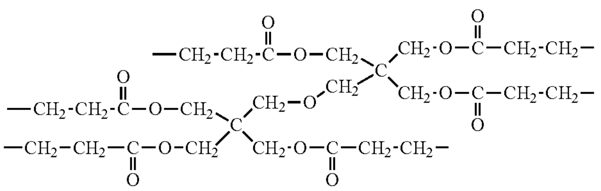

(15)

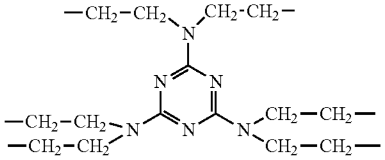

(17)

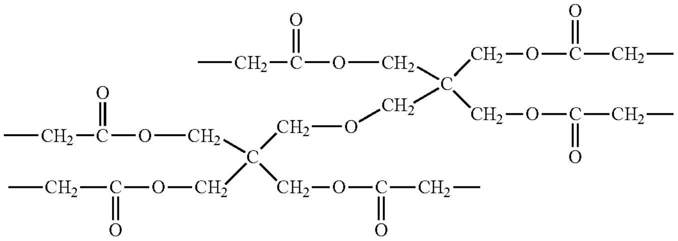

In General Formula (1), $R^1$ and $R^2$ each independently represent a single bond or a divalent organic group. p pieces of $R^1$'s may be the same as or different from each other, and in a case where q is 2 or more, q pieces of $R^2$'s may be the same as or different from each other.

Examples of the organic group can include an organic group composed of 1 to 100 carbon atoms, 0 to 10 nitrogen atoms, 0 to 50 oxygen atoms, 1 to 200 hydrogen atoms, and 0 to 20 sulfur atoms. Such organic group may be unsubstituted or may further have a substituent.

Specific examples of the organic group represented by $R^1$ can include an organic group which is composed of the following structural unit or which is composed of a combination of two or more of the following structural units. Such organic group may be unsubstituted or may further have a substituent.

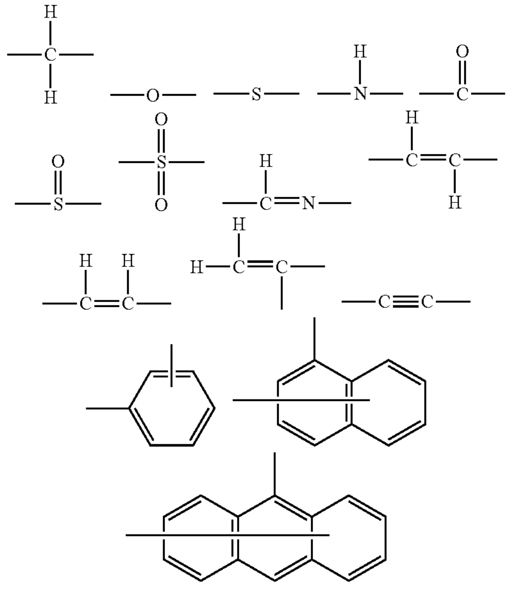

As $R^1$, a single bond or a divalent organic group composed of 1 to 50 carbon atoms, 0 to 8 nitrogen atoms, 0 to 25 oxygen atoms, 1 to 100 hydrogen atoms, and 0 to 10 sulfur atoms is preferable, a single bond or a divalent organic group composed of 1 to 30 carbon atoms, 0 to 6 nitrogen atoms, 0 to 15 oxygen atoms, 1 to 50 hydrogen atoms, and 0 to 7 sulfur atoms is more preferable, and a single bond or a divalent organic group composed of 1 to 10 carbon atoms, 0 to 5 nitrogen atoms, 0 to 10 oxygen atoms, 1 to 30 hydrogen atoms, and 0 to 5 sulfur atoms is still more preferable. Such organic group may be unsubstituted or may further have a substituent.

Specific examples of $R^1$ can include a single bond, the following structural unit, or a divalent organic group which is a group composed of in combination of two or more of the following structural units and which is composed of 1 to 10 carbon atoms, 0 to 5 nitrogen atoms, 0 to 10 oxygen atoms, 1 to 30 hydrogen atoms, and 0 to 5 sulfur atoms (which may have a substituent, where examples of such substituent can include alkyl groups having 1 to 20 carbon atoms such as a methyl group and an ethyl group, aryl groups having 6 to 16 carbon atoms such as a phenyl group and a naphthyl group, acyloxy groups having 1 to 6 carbon atoms such as a hydroxy group, an amino group, a carboxy group, a sulfonamide group, an N-sulfonylamide group, and an acetoxy group, alkoxy groups having 1 to 6 carbon atoms such as a methoxy group and an ethoxy group, halogen atoms such as a chlorine atom and a bromine atom, alkoxycarbonyl group having 2 to 7 carbon atoms such as a methoxycarbonyl group, an ethoxycarbonyl group, and a cyclohexyloxycarbonyl group, a cyano group, carbonate ester groups such as t-butyl carbonate, and the like). In an aspect, $R^1$ can be a linear alkylene group or a branched alkylene group. The number of carbon atoms in such alkylene group can be 1 or more, preferably 2 or more, and also can be, for example, 5 or less or 4 or less.

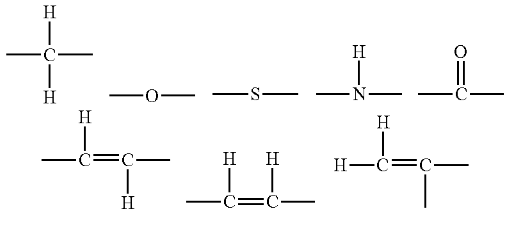

-continued

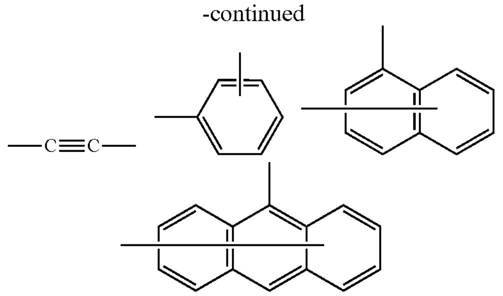

$R^2$ represents a single bond or a divalent organic group. The details of $R^2$ are as described for $R^1$.

Specific examples of $R^2$ can include a single bond, an ethylene group, a propylene group, the following divalent group (a), the following divalent group (b), and the like. In the following divalent groups, $R^{12}$'s represent each a hydrogen atom or a methyl group, and l represents 1 or 2.

(a)

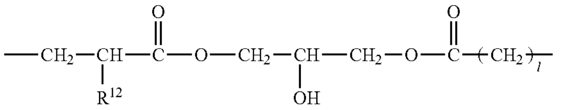

(b)

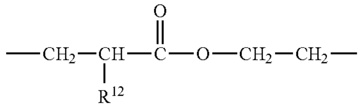

$A^1$ represents a monovalent group including one or more groups selected from the group consisting of an acidic group, a basic group having a nitrogen atom, a urea group, a urethane group, a group having a coordinating oxygen atom, a hydrocarbon group having 4 or more carbon atoms, an alkoxysilyl group, an epoxy group, an isocyanate group, and a hydroxy group. An acidic group, a basic group having a nitrogen atom, a urea group, a urethane group, a group having a coordinating oxygen atom, a hydrocarbon group having 4 or more carbon atoms, an alkoxysilyl group, an epoxy group, an isocyanate group, and a hydroxy group can function as an adsorbing group. p pieces of $A^1$'s may be the same as or different from each other. In the group represented by $A^1$, the total number of groups selected from the group consisting of an acidic group, a basic group having a nitrogen atom, a urea group, a urethane group, a group having a coordinating oxygen atom, a hydrocarbon group having 4 or more carbon atoms, an alkoxysilyl group, an epoxy group, an isocyanate group, and a hydroxy group is 1 or more, and can be, for example, 5 or less, 4 or less, 3 or less, or 2 or less.

In the present invention and the present specification, the "acidic group" refers to a group having a pKa of 6 or less at 25° C. Examples of the acidic group include a carboxy group, a sulfonic acid group, a monosulfuric acid ester group, a phosphoric acid group, a monophosphoric acid ester group, and a boric acid group, a carboxy group, a sulfonic acid group, a monosulfuric acid ester group, a phosphoric acid group, and a monophosphoric acid ester group are preferable, and a carboxy group, a sulfonic acid group, and a phosphoric acid group are more preferable. The carboxy group is a functional group represented by —COOH, and may be contained in the compound represented by General Formula (1) in the form of —COOH or in the form of a salt. The salt of the carboxy group is a salt represented by $—COO^-M^+$. The sulfonic acid group is a functional group represented by $—S(=O)_2OH$, and may be contained in the compound represented by General Formula (1) in the form of $—S(=O)_2OH$ or in the form of a salt. The salt of the sulfonic acid group is a salt represented by $—S(=O)_2O^-M^+$. The phosphoric acid group is a functional group represented by $—P=O(OH)_2$, and may be contained in the compound represented by General Formula (1) in the form of $—P=O(OH)_2$ or in the form of a salt. The salt of phosphoric acid group is a salt represented by $—P=O(O^-M^+)_2$. In the above, $M^+$ represents a cation such as an alkali metal ion. Specific examples of the monovalent group represented by $A^1$ containing one or more acidic groups can include the following groups. In the following, * represents a bonding position with an adjacent atom.

A-101

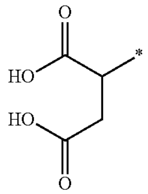

A-102

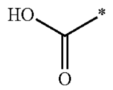

A-103

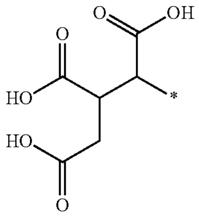

A-104

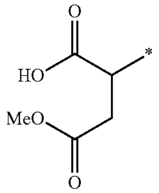

A-105

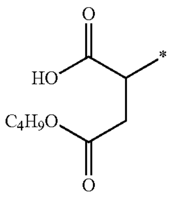

A-106

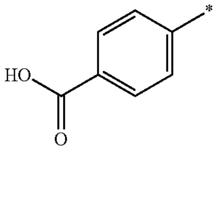

-continued

A-107

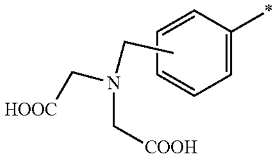

A-108

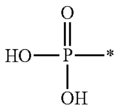

A-109

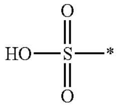

A-110

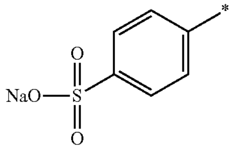

In the present invention and the present specification, the “basic group” refers to a group the conjugate acid of which has a pKa of 4 or more at 25° C. Examples of the basic group having a nitrogen atom can include an amino group (—$NH_2$), substituted imino groups (—$NHR^8$ and —$NR^9R^{10}$, where $R^1$, $R^9$, and $R^{10}$ each independently represent an alkyl group having 1 to 20 carbon atoms, an aryl group having 6 or more carbon atoms, or an aralkyl group having 7 or more carbon atoms), guanidyl groups represented by Formula (a1), amidinyl groups represented by Formula (a2), and the like.

(a1)

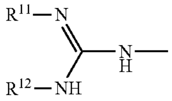

(a2)

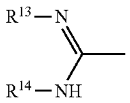

In Formula (a1), $R^{11}$ and $R^{12}$ each independently represent an alkyl group having 1 to 20 carbon atoms, an aryl group having 6 or more carbon atoms, or an aralkyl group having 7 or more carbon atoms.

In Formula (a2), $R^{13}$ and $R^{14}$ each independently represent an alkyl group having 1 to 20 carbon atoms, an aryl group having 6 or more carbon atoms, or an aralkyl group having 7 or more carbon atoms.

Among these, an amino group (—$NH_2$), substituted imino groups (—$NHR^8$ and —$NR^9R^{10}$, where $R^1$, $R^9$, and $R^{10}$ each independently represent an alkyl group having 1 to 10 carbon atoms, a phenyl group, or a benzyl group), guanidyl groups represented by Formula (a1) (in Formula (a1), $R^{11}$ and $R^{12}$ each independently represent an alkyl group having 1 to 10 carbon atoms, a phenyl group, or a benzyl group), and amidinyl groups represented by Formula (a2) (in Formula (a2), $R^{13}$ and $R^{14}$ each independently represent an alkyl group having 1 to 10 carbon atoms, a phenyl group, or a benzyl group) are preferable.

Furthermore, an amino group (—$NH_2$), substituted imino groups (—$NHR^1$ and —$NR^9R^{10}$, where $R^1$, $R^9$, and $R^{10}$ each independently represent an alkyl group having 1 to 5 carbon atoms, a phenyl group, or a benzyl group), guanidyl groups represented by Formula (a1) (in Formula (a1), $R^{11}$ and $R^{12}$ each independently represent an alkyl group having 1 to 5 carbon atoms, a phenyl group, or a benzyl group), and amidinyl groups represented by Formula (a2) (in Formula (a2), $R^{13}$ and $R^{14}$ each independently represent an alkyl group having 1 to 5 carbon atoms, a phenyl group, or a benzyl group) are more preferable.

Examples of the urea group include —$NR^{15}CONR^{16}R^{17}$ (here, $R^{15}$, $R^{16}$, and $R^{17}$ each independently represent a hydrogen atom, an alkyl group having 1 to 20 carbon atoms, an aryl group having 6 or more carbon atoms, or an aralkyl group having 7 or more carbon atoms), —$NR^{15}CONHR^{17}$ (here, $R^{15}$ and $R^{17}$ each independently represent a hydrogen atom, an alkyl group having 1 to 10 carbon atoms, an aryl group having 6 or more carbon atoms, or an aralkyl group having 7 or more carbon atoms) is preferable, and —$NHCONHR^{17}$ (here, $R^{17}$ represents a hydrogen atom, an alkyl group having 1 to 10 carbon atoms, an aryl group having 6 or more carbon atoms, or an aralkyl group having 7 or more carbon atoms) is more preferable.

Examples of the urethane group include —$NHCOOR^{18}$, —$NR^{19}COOR^{20}$, —$OCONHR^{21}$, —$OCONR^{22}R^{23}$ (here, $R^{18}$, $R^{19}$, $R^{20}$, $R^{21}$, $R^{22}$, and $R^{23}$ each independently represent an alkyl group having 1 to 20 carbon atoms, an aryl group having 6 or more carbon atoms, or an aralkyl group having 7 or more carbon atoms) and the like, —$NHCOOR^{18}$, —$OCONHR^{21}$ (here, $R^{18}$ and $R^{21}$ each independently represent an alkyl group having 1 to 20 carbon atoms, an aryl group having 6 or more carbon atoms, or an aralkyl group having 7 or more carbon atoms), and the like are preferable, and —$NHCOOR^{18}$, —$OCONHR^{21}$ (here, $R^{18}$ and $R^{21}$ each independently represent an alkyl group having 1 to 10 carbon atoms, an aryl group having 6 or more carbon atoms, or an aralkyl group having 7 or more carbon atoms), and the like are more preferable.

Examples of the group having a coordinating oxygen atom can include an acetylacetonato group, an acetoacetyl group, and the like. An acetylacetonato group and an acetoacetyl group are each a monovalent group having the following structure.

In the following structures, * represents a bonding position with an adjacent atom.

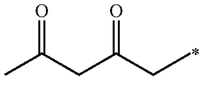

Acetylacetonato group

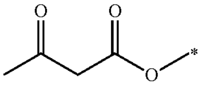

Acetoacetyl group

Examples of the hydrocarbon group having 4 or more carbon atoms include alkyl groups having 4 or more carbon atoms, aryl groups having 6 or more carbon atoms, aralkyl groups having 7 or more carbon atoms, and the like, alkyl groups having 4 to 20 carbon atoms, aryl groups having 6 to 20 carbon atoms, aralkyl groups having 7 to 20 carbon atoms, and the like are preferable, and alkyl groups having 4 to 15 carbon atoms (for example, an octyl group, a dodecyl group, and the like), aryl groups having 6 to 15 carbon atoms (for example, a phenyl group, a naphthyl group, and the like), aralkyl groups having 7 to 15 carbon atoms (for example, a benzyl group and the like), and the like are more preferable.

Examples of the alkoxysilyl group can include a trimethoxysilyl group, a triethoxysilyl group, and the like.

In an aspect, the group represented by $A^1$ can be a monovalent organic group in which one or more groups selected from the group consisting of acidic groups, basic groups having a nitrogen atom, a urea group, a urethane group, groups having a coordinating oxygen atom, hydrocarbon groups having 4 or more carbon atoms, alkoxysilyl groups, an epoxy group, an isocyanate group, and a hydroxy group, are bonded to an organic group (hereinafter, also referred to as a "linking group") composed of 1 to 200 carbon atoms, 0 to 20 nitrogen atoms, 0 to 100 oxygen atoms, 1 to 400 hydrogen atoms, and 0 to 40 sulfur atoms. The organic group exemplified as the linking group may be unsubstituted or may further have a substituent. In addition, in an aspect, the group represented by $A^1$ can be a group selected from the group consisting of an acidic group, a basic group having a nitrogen atom, a urea group, a urethane group, a group having a coordinating oxygen atom, a hydrocarbon group having 4 or more carbon atoms, an alkoxysilyl group, an epoxy group, an isocyanate group, and a hydroxy group.

The linking group described above is preferably an organic group composed of 1 to 100 carbon atoms, 0 to 10 nitrogen atoms, 0 to 50 oxygen atoms, 1 to 200 hydrogen atoms, and 0 to 20 sulfur atoms. Such organic group may be unsubstituted or may further have a substituent.

Specific examples of the organic group exemplified as the linking group described above can include an organic group which is composed of the following structural unit or which is composed of a combination of two or more of the following structural units. Such organic group may be unsubstituted or may further have a substituent.

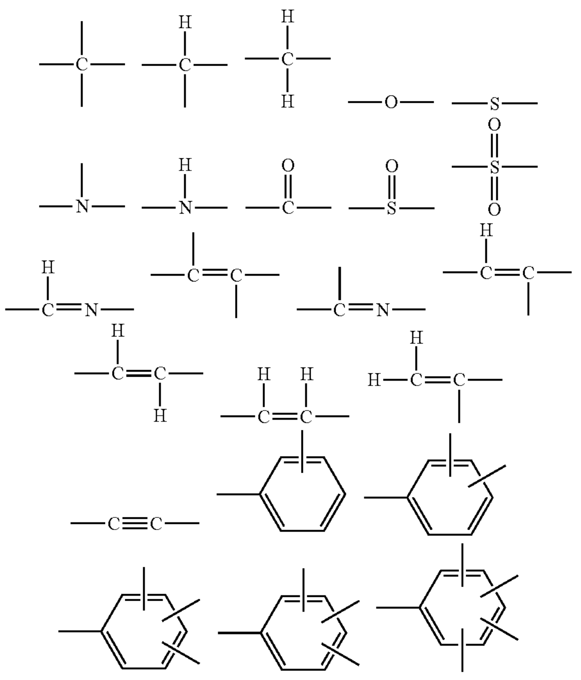

-continued

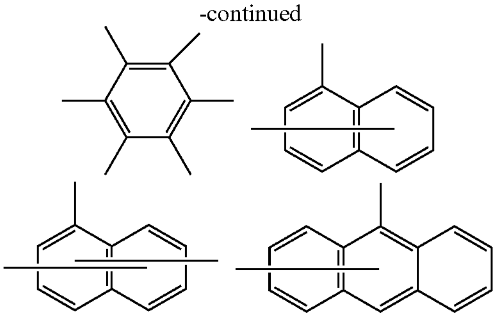

Examples of $A^1$ can include a monovalent organic group represented by General Formula (3).

General Formula (3)

$$(B^1)_a R^{30}-$$

In General Formula (3), $B^1$ represents a group selected from the group consisting of an acidic group, a basic group having a nitrogen atom, a urea group, a urethane group, a group having a coordinating oxygen atom, a hydrocarbon group having 4 or more carbon atoms, an alkoxysilyl group, an epoxy group, an isocyanate group, and a hydroxy group, and $R^{30}$ represents a single bond or an (a+1)-valent organic group. a represents an integer in a range of 1 to 10, and in a case where a is 2 or more, a pieces of $B^1$'s may be the same as or different from each other.

The details of the group represented by $B^1$ are as described above regarding $A^1$.

$R^{30}$ represents a single bond or an (a+1)-valent organic group, a represents an integer in the range of 1 to 10, and a is preferably an integer in the range of 1 to 7, more preferably an integer in the range of 1 to 5, still more preferably an integer in the range of 1 to 3, and even still more preferably 1 or 2.

Examples of the (a+1)-valent organic group can include an organic group composed of 1 to 100 carbon atoms, 0 to 10 nitrogen atoms, 0 to 50 oxygen atoms, 1 to 200 hydrogen atoms, and 0 to 20 sulfur atoms. Such organic group may be unsubstituted or may further have a substituent.

Specific examples of the (a+1)-valent organic group can include an organic group (which may form a ring structure) which is composed of the following structural unit or which is composed of a combination of two or more of the following structural units. Such organic group may be unsubstituted or may further have a substituent.

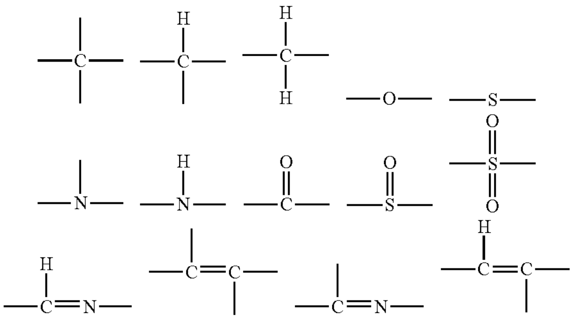

-continued

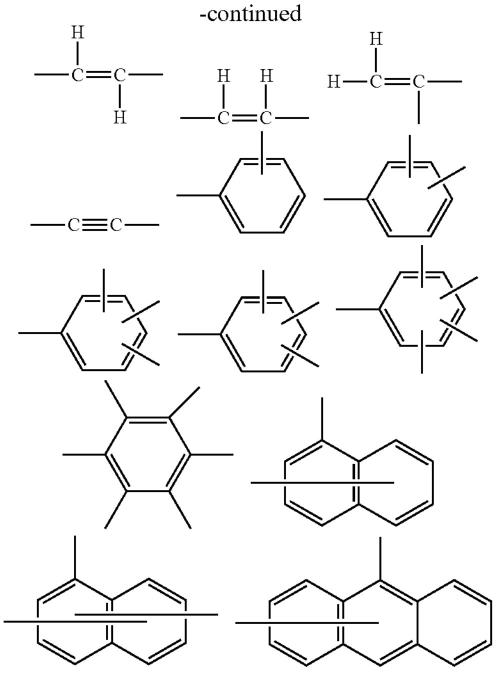

As $R^{30}$, a single bond or an (a+1)-valent organic group composed of 1 to 50 carbon atoms, 0 to 8 nitrogen atoms, 0 to 25 oxygen atoms, 1 to 100 hydrogen atoms, and 0 to 10 sulfur atoms is preferable, a single bond or an (a+1)-valent organic group composed of 1 to 30 carbon atoms, 0 to 6 nitrogen atoms, 0 to 15 oxygen atoms, 1 to 50 hydrogen atoms, and 0 to 7 sulfur atoms is more preferable, and a single bond or an (a+1)-valent organic group composed of 1 to 10 carbon atoms, 0 to 5 nitrogen atoms, 0 to 10 oxygen atoms, 1 to 30 hydrogen atoms, and 0 to 5 sulfur atoms is still more preferable. Such organic group may be unsubstituted or may further have a substituent.

In General Formula (1), $P^1$ represents a polymer structure including a partial structure represented by General Formula (2). In a case where q is 2 or more, q pieces of $P^1$'s may be the same or different from each other.

In General Formula (1), $P^1$ can include only one type of partial structure represented by General Formula (2), or can include two or more types of different partial structures represented by General Formula (2).

Hereinafter, a structure in which a plurality of one type of repeating units are linked is referred to as a "homopolymer structure", and a structure including two or more types of different homopolymer structures is referred to as a "copolymer structure". The "polymer structure" in the present invention and the present specification includes a homopolymer structure and a copolymer structure.

General Formula (2)

$$*—X^2—O—(Y^1—O)_{n1}—X^1$$

In General Formula (2), n1 is 1 or more, can be 2 or more, and can be 3 or more. In addition, n1 can be, for example, 30 or less, 25 or less, 20 or less, 15 or less, or 10 or less.

* represents a bonding position with an adjacent atom. The same applies to other general formulae.

In a case where n1 is 1, $X^1$ represents a monovalent organic group, $X^2$ represents a divalent organic group, $Y^1$ represents a branched divalent hydrocarbon group, and $Y^1$ and $X^1$ or $X^2$ may form a ring. However, in this case, the ring to be formed is a ring of a 4- or more membered ring, and can be, for example, a ring of a 4- or more membered ring and a 10- or less membered ring.

In a case where n1 is 2 or more, $X^1$ represents a hydrogen atom or a monovalent organic group, $X^2$ represents a divalent organic group, one or more $Y^1$'s each represent a branched divalent organic group, and $Y^1$ and $X^1$ or $X^2$ may form a ring. Examples of the ring to be formed can include, for example, a 3- or more membered ring or a 4- or more membered ring, and also can include a 10- or less membered ring. n1 pieces of $Y^1$ may be the same as or different from each other.

In a case where n1 is 1, the branched divalent hydrocarbon group represented by $Y^1$ is preferably an alkylene group. The number of carbon atoms in such alkylene group can be 1 or more, preferably 2 or more, and also can be, for example, 5 or less or 4 or less.

In a case where n1 is 2 or more, the divalent organic group represented by $Y^1$ is preferably a hydrocarbon group and more preferably an alkylene group. The number of carbon atoms in such alkylene group can be 1 or more, preferably 2 or more, and also can be, for example, 5 or less or 4 or less. In a case where n1 is 2 or more, one or more of the divalent organic groups represented by $Y^1$ are branched divalent organic groups, a part of $Y^1$ may be linear divalent organic groups and the other part of $Y^1$ may be branched divalent organic groups, all of $Y^1$ may be branched divalent organic groups, and it is preferable that all of $Y^1$ are branched divalent organic groups.

In both of a case where n1 is 1 and a case where n1 is 2 or more, in a case where $X^1$ represents a monovalent organic group, such organic group can be, for example, a hydrocarbon group and can be a linear or branched alkyl group, and the number of carbon atoms of the alkyl group can be, for example, 1 or more and 15 or less, 1 or more and 10 or less, or 1 or more and 5 or less. In an aspect, $X^1$ can be a methyl group.

In both of a case where n1 is 1 and a case where n1 is 2 or more, examples of the divalent organic group represented by $X^2$ can include a carbonyl group (—C(=O)—) and the like.

In the polymer structure represented by $P^1$, the partial structure represented by General Formula (2) can be included in a side chain part of the polymer chain. Examples of such polymer chain can include a vinyl polymer chain.

In the present invention and the present specification, the "vinyl polymer chain" is a polymer chain containing a plurality of repeating units each represented by General Formula (4). In General Formula (4), $R^{40}$ to $R^{43}$ each independently represent a hydrogen atom or a substituent. For specific examples of the substituent, the description described later regarding General Formula (4-1) can be referred to. One or more of $R^{40}$ to $R^{43}$ can be the partial structure represented by General Formula (2), or can include the partial structure represented by General Formula (2). The vinyl polymer chain includes a vinyl polymer chain containing only a homopolymer structure in which a plurality of the same repeating units are linked, and a vinyl polymer chain containing two or more types of different homopolymer structures.

General Formula (4)

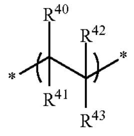

Specific examples of the repeating unit represented by General Formula (4) can include a repeating unit in which $R^{40}$ and $R^{41}$ in General Formula (4) represent a hydrogen atom, $R^{42}$ represents a hydrogen atom or a methyl group, and $R^{43}$ is a partial structure represented by General Formula (2), that is, a repeating unit represented by General Formula (4-1).

General Formula (4-1)

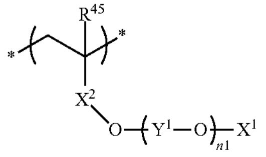

In an aspect, the polymer structure represented by $P^1$ can be a polymer structure represented by General Formula (4-2).

General Formula (4-2)

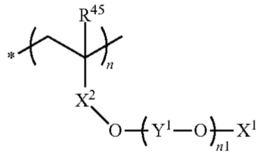

In General Formula (4-1) and General Formula (4-2), $R^{45}$ represents a hydrogen atom or a methyl group, and $X^1$, $X^2$, $Y^1$, and n1 each have the same definitions as $X^1$, $X^2$, $Y^1$, and n1 in General Formula (2). In General Formula (4-2), n is 1 or more, and can be, for example, 50 or less or 30 or less.

In addition, in an aspect, in the repeating unit represented by General Formula (4-1), $X^2$ can represent a carbonyl group. Such repeating unit is represented by General Formula (4-3).

General Formula (4-3)

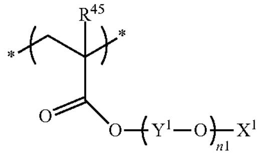

In an aspect, the polymer structure represented by $P^1$ can be a polymer structure represented by General Formula (4-4).

General Formula (4-4)

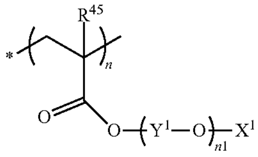

In General Formula (4-3) and General Formula (4-4), $R^{45}$ represents a hydrogen atom or a methyl group, and $X^1$, $Y^1$, and n1 each have the same definitions as $X^1$, $Y^1$, and n1 in General Formula (2). In General Formula (4-4), n is 1 or more, and can be, for example, 50 or less or 30 or less.

In an aspect, in General Formula (1), the polymer structure represented by $P^1$ can include a polyalkylene glycol chain. In the present invention and the present specification, the "polyalkylene glycol chain" is a polymer chain containing a plurality of repeating units each represented by General Formula (5). The polyalkylene glycol chain includes a polyalkylene glycol chain containing only a homopolymer structure in which a plurality of the same repeating units are linked, and a polyalkylene glycol chain containing two or more types of different homopolymer structures.

In General Formula (5), $R^{50}$ represents a linear alkylene group or a branched alkylene group. The number of carbon atoms in such alkylene group can be 1 or more, preferably 2 or more, and also can be, for example, 5 or less or 4 or less. In addition, the alkylene group may be unsubstituted or may further have a substituent.

$$*\!-\!\left(R^{50}—O\right)\!-\!* \quad \text{General Formula (5)}$$

In the aspect, the polyalkylene glycol chain can be a polypropylene glycol chain. The polypropylene glycol chain can be a homopolymer structure in which a plurality of the following repeating units are linked.

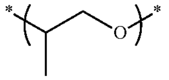

In an aspect, the polymer structure represented by $P^1$ can include a polyalkylene glycol chain in the partial structure represented by General Formula (2). In this case, in General Formula (2), the partial structure represented by $$*\!-\!\left(Y^1—O\right)_{n1}\!-\!*$$

can represent a polyalkylene glycol chain, and for example, such partial structure can be a polypropylene glycol chain or can include a polypropylene glycol chain.

In the compound represented by General Formula (1), from the viewpoint of further improving dispersibility, the proportion (that is, the content on a mass basis) of the partial structure represented by General Formula (2) (provided that in a case where n1 is 2 or more, a moiety in which $Y^1$ is a branched divalent organic group) in the polymer structure represented by $P^1$ is preferably 30% by mass or more, more preferably 50% by mass or more, and still more preferably 70% by mass or more. Hereinafter, the proportion is also referred to as a "branched partial structure content". In the polymer structure represented by $P^1$, the branched partial structure content can be, for example, less than 100% by mass, 95% by mass or less, 90% by mass or less, 85% by mass or less, or 80% by mass or less. The branched partial structure content can be calculated from the structure of the compound.

In a case where n1 is 2 or more, in the partial structure represented by General Formula (2), the moiety in which $Y^1$ is a branched divalent organic group refers to, for example, a moiety excluding the moiety represented by "$—(Y^{11}—O)_{n11}—$" in a case where the partial structure represented by General Formula (2) is the following partial structure ($Y^{11}$ represents a linear divalent organic group, $Y^{12}$ represents a branched divalent organic group, n11 and n12 are each independently 1 or more, and n11+n12=n1).

[0090]

$$*—X^2—O—(Y^{11}—O)_{n11}—(Y^{12}—O)_{n12}—X^1$$

From the viewpoint of further improving the solubility, the proportion (that is, the content on a mass basis) of the partial structure represented by General Formula (2), in which $$*—(Y^1—O)_{n1}—*$$

represents a polypropylene glycol chain, in the polymer structure represented by $P^1$ is preferably in the above range.

(Weight-Average Molecular Weight)

In the present invention and the present specification, the "weight-average molecular weight" refers to a weight-average molecular weight obtained by polystyrene conversion of the measured value measured by gel permeation chromatography (GPC). As the measurement conditions of GPC, for example, the following conditions can be adopted. The weight-average molecular weight shown in Examples which will be described later is a value obtained under the following conditions. In addition, in the present invention and the present specification, the molecular weight refers to a weight-average molecular weight for a polymer (including a homopolymer and a copolymer).

GPC device: HLC-8120 (manufactured by Tosoh Corporation)

Column: TSK gel Multipore HXL-M (manufactured by Tosoh Corporation, 7.8 mm inner diameter (ID)×30.0 cm)

The weight-average molecular weight of the compound represented by General Formula (1) can be, for example, 3,000 or more, and from the viewpoint of further improving dispersibility, is preferably 4,000 or more and more preferably 5,000 or more.

In addition, the weight-average molecular weight of the compound represented by General Formula (1) can be, for example, 20,000 or less, 19,000 or less, or 18,000 or less, and from the viewpoint of further improving dispersibility, is preferably 17,000 or less, more preferably 16,000 or less, still more preferably 15,000 or less, and even still more preferably 14,000 or less.

(Acid Value)

In the present invention and the present specification, the "acid value" is the number in mg of potassium hydroxide required to neutralize 1 g of the sample, and is a value measured according to JIS K 2501:2003.

From the viewpoint of further improving dispersibility, the acid value of the compound represented by General Formula (1) is preferably 5 mgKOH/g or more and more preferably 10 mgKOH/g or more.

On the other hand, from the viewpoint of further improving solubility, the acid value of the compound represented by General Formula (1) is preferably 100 mgKOH/g or less and more preferably 90 mgKOH/g or less.

(Synthesis Method)

A synthesis method of the compound represented by General Formula (1) is not particularly limited, and a known method can be adopted. For the synthesis method, reference can be made to, for example, paragraphs [0114] to [0140] of JP2007-277514A (paragraphs [0145] to [0173] in the corresponding US2010/0233595A) and paragraphs [0266] to [0348] of JP2007-277514A (paragraphs [0289] to [0429] in the corresponding US2010/0233595A).

[Polymerizable composition] One aspect of the present invention relates to a polymerizable composition comprising the above-described compound, inorganic particles, and a polymerizable compound.

Details of the compound are as described above. The compound can function as a dispersant for enhancing the dispersibility of the inorganic particles in the polymerizable composition. The polymerizable composition can be used for various applications in which an enhancement in the dispersibility of inorganic particles is desired. As an example, the cured product obtained by curing the polymerizable composition can be included in a wavelength conversion member. This point will be described later in detail.

<Inorganic Particles>

In the present invention and the present specification, the "inorganic particles" refers to particles containing an inorganic substance as a main component, and the "organic particles" refers to particles containing an organic substance as a main component. The main component refers to a component occupying the largest proportion of the particles on a mass basis among the components composing the particles, and for example, the content of the main component in the particles can be 50% by mass or more, 60% by mass or more, 70% by mass or more, 80% by mass or more, 90% by mass or more, 95% by mass or more, or 99% by mass or more, and also can be 100% by mass or less or less than 100% by mass. The inorganic particles can be particles composed of only an inorganic substance. Here, the particles composed of only an inorganic substance refers to particles containing only an inorganic substance, excluding impurities that are unavoidably incorporated during the production process.

In an aspect, the composition can include the compound and inorganic particles having an average particle diameter of 0.10 μm or more. The present inventors presume that the inorganic particles having an average particle diameter of 0.10 μm or more tend to easily precipitate, and thus the dispersibility is easily decreased, whereas the compound can enhance the dispersibility by suppressing the precipitation.

In the present invention and the present specification, the "average particle diameter" of the particle such as inorganic particles is a value obtained by the following method. Hereinafter, the particles before being used for preparing a composition are referred to as "powder".

The particles to be measured are observed with a scanning electron microscope (SEM) and imaged at a magnification of 5,000. The powder is observed for particles present as a powder. For particles contained in the composition (polymerizable composition) containing a polymerizable compound, a cross section of a cured product obtained by curing the polymerizable composition is observed. For example, regarding particles in a cured product included in a wavelength conversion member which will be described later, a cross section of this cured product can be observed. The primary particle diameter is measured from the captured image. In addition, for particles having a non-spherical shape, an average value of a length of a major axis and a length of a minor axis is obtained, and the thus obtained value is adopted as the primary particle diameter. In the captured image, an arithmetic average of the primary particle diameters of 20 randomly selected particles is taken as the average particle diameter. The average particle diameter of the inorganic particles shown in Examples which will be described later is a value obtained by observing and measuring a cross section of the cured product obtained by curing the polymerizable composition, using S-3400N (manufactured by Hitachi High-Tech Corporation) as a scanning electron microscope.

Examples of the inorganic substance composing the inorganic particles, for example, inorganic particles having an average particle diameter of 0.10 μm or more can include alumina particles, titanium oxide particles, silica particles, zirconium oxide particles, zinc oxide particles, and the like, and also can include particles of inorganic lamellar compound such as mica and talc. The "alumina particles" are particles containing alumina as a main component in the same manner as the above description regarding the inorganic particles. The same is applied to the above-described various particles. The main component is as described above.

Regarding the inorganic particles having an average particle diameter of 0.10 μm or more, from the viewpoint of further improving the brightness (hereinafter, also simply referred to as "brightness") of the wavelength conversion member including the cured product obtained by curing the polymerizable composition, the average particle diameter is, for example, preferably 0.20 μm or more and more preferably 0.30 μm or more, 0.40 μm or more, 0.50 μm or more, 0.60 μm or more, 0.70 μm or more, 0.80 μm or more, 0.90 μm or more, or 1.00 μm or more in this order. On the other hand, from the viewpoint of further improving dispersibility, the average particle diameter is preferably 5.00 μm or less, more preferably 4.00 μm or less, and still more preferably 3.00 μm or less.

In the polymerizable composition, from the viewpoint of further improving the brightness, the content of the inorganic particles having an average particle diameter of 0.10 μm or more is, for example, with respect to the total amount of the composition, preferably 3% by mass or more and more preferably 5% by mass or more. In addition, for example, from the viewpoint of further improving brightness, the content of the inorganic particles having an average particle diameter of 0.10 μm or more is, with respect to the total amount of the composition, preferably 40% by mass or less and more preferably 20% by mass or less.

<Polymerizable Compound>

In the present invention and the present specification, the "polymerizable composition" is a composition containing at least one type of polymerizable compound, and has a property of being cured by being subjected to a polymerization treatment such as light irradiation or heating. In addition, the "polymerizable compound" is a compound containing one or more polymerizable groups in one molecule. The "polymerizable group" is a group that can participate in a polymerization reaction. The compound represented by General Formula (1) can exhibit high solubility in a polymerizable compound.

Examples of the polymerizable group can include a (meth)acryloyl group. In the present invention and the present specification, the term "(meth)acryloyl" is used to indicate either or both of acryloyl and methacryloyl. The "(meth)acrylate" refers to a compound containing one or more (meth)acryloyl groups in one molecule. The functionality in "(meth)acrylate" which will be described later refers to the number of (meth)acryloyl groups contained in one (meth)acrylate molecule. With regard to (meth)acrylate, the "monofunctional" refers that the number of (meth)acryloyl groups contained in one molecule is one, and the "polyfunctional" refers that the number of (meth)acryloyl groups contained in one molecule is two or more. In addition, the (meth)acryloyl group can be included in the (meth)acrylate in the form of a (meth)acryloyloxy group. The term "(meth) acryloyloxy group" shall be used to refer to either or both of an acryloyloxy group and a methacryloyloxy group.

In the present invention and the present specification, the term "(meth)allyl" is used to indicate either or both of allyl and metaallyl. The "(meth)allyl compound" refers to a compound including one or more (meth)allyl groups in one molecule. The functionality in "(meth)allyl compound" which will be described later refers to the number of (meth)allyl groups contained in one (meth)allyl compound molecule. With regard to (meth)allyl compound, the "monofunctional" refers that the number of (meth)allyl groups contained in one molecule is one, and the "polyfunctional" refers that the number of (meth)allyl groups contained in one molecule is two or more.

In an aspect, the polymerizable composition can include one or two or more types of polymerizable compounds including one or more polymerizable groups selected from the group consisting of a (meth)acryloyl group and a (meth) allyl group in one molecule. Among a (meth)acryloyl group and a (meth)allyl group, such polymerizable compound may include only a (meth)acryloyl group, may include only a (meth)allyl group, or may include a (meth)acryloyl group and a (meth)allyl group.

((Meth)Acrylate)

First (Meth)Acrylate

In the case where the polymerizable composition contains one or more types of (meth)acrylates, at least a polyfunctional (meth)acrylate is preferably contained as the (meth) acrylate. The polyfunctional (meth)acrylate is also referred to as "first (meth)acrylate". However, a polyfunctional (meth)acrylate corresponding to a second (meth)acrylate which will be described later is interpreted as the second (meth)acrylate. The polyfunctional (meth)acrylate that can be contained in the polymerizable composition is one or two or more types of bi- or higher functional (meth)acrylates, and can be one or two or more types selected from the group consisting of bifunctional to octafunctional polyfunctional (meth)acrylates, bifunctional to heptafunctional polyfunctional (meth)acrylates, bifunctional to hexafunctional polyfunctional (meth)acrylates, bifunctional to pentafunctional polyfunctional (meth)acrylates, and bifunctional to tetrafunctional polyfunctional (meth)acrylates.

Specific examples of the bifunctional (meth)acrylate include neopentyl glycol di(meth)acrylate, 1,9-nonanediol di(meth)acrylate, dipropylene glycol di(meth)acrylate, tripropylene glycol di(meth)acrylate, tetraethylene glycol di(meth)acrylate, hydroxypivalic acid neopentyl glycol di(meth)acrylate, polyethylene glycol di(meth)acrylate, dicyclopentenyl (meth)acrylate, dicyclopentenyloxyethyl (meth)acrylate, dicyclopentanyl di(meth)acrylate, and tricyclodecanedimethanol di(meth)acrylate.

Specific examples of the tri- or higher functional (meth) acrylate can include epichlorohydrin (ECH)-modified glycerol tri(meth)acrylate, ethylene oxide (EO)-modified glycerol tri(meth)acrylate, propylene oxide (PO)-modified glycerol tri(meth)acrylate, trimethylolpropane tri(meth) acrylate, pentaerythritol tetra (meth)acrylate, caprolactone-modified trimethylolpropane tri(meth)acrylate, EO-modified trimethylolpropane tri(meth)acrylate, PO-modified trimethylolpropane tri(meth)acrylate, tris(acryloxyethyl) isocyanurate, dipentaerythritol hexa(meth)acrylate, caprolactone-modified dipentaerythritol hexa(meth)acrylate, and dipentaerythritol poly(meth)acrylate.

The molecular weight of the polyfunctional (meth)acrylate contained as the first (meth)acrylate in the polymerizable composition can be, for example, 200 or more. From the viewpoint of the viscosity of the polymerizable composition, the molecular weight of the polyfunctional (meth) acrylate is preferably 1000 or less and more preferably 500 or less.

From the viewpoint of suppressing a decrease in brightness, that is, improving the durability, the content of the first (meth)acrylate in the polymerizable composition is preferably 10.0% by mass or more, more preferably 20.0% by mass or more, and still more preferably 30.0% by mass or more with respect to the total amount of the composition. The polymerizable composition may contain only one type of (meth)acrylate which is the first (meth)acrylate, or may contain two or more types of (meth)acrylates.

Second (Meth)Acrylate

Examples of the (meth)acrylate that can be contained in the polymerizable composition can include a mono- or higher functional (meth)acrylates having a functional group selected from the group consisting of a carboxy group, a hydroxy group, a phosphoric acid group, and an amino group. Such a (meth)acrylate is also referred to as "second (meth)acrylate". It is presumed that the inclusion of the second (meth)acrylate in the polymerizable composition contributes to the improvement of the brightness of the wavelength conversion member containing the cured product obtained by curing the polymerizable composition.

The second (meth)acrylate has one or more functional groups selected from the group consisting of a carboxy group, a hydroxy group, a phosphoric acid group, and an amino group in one molecule. The number of such functional groups can be 1 to 3 in one molecule, and is preferably 1 or 2 and more preferably 1 in one molecule. In a case where the second (meth)acrylate contains two or more of the above-mentioned functional groups in one molecule, these two or more functional groups may be the same functional groups or different functional groups. The carboxy group may be contained in the form of —COOH or may be contained in the form of a salt. The salt of the carboxy group is a salt represented by $—COO-M^+$. The phosphoric acid group is a monovalent functional group represented by $—P{=}O(OH)_2$, and may be contained in the form of $—P{=}O(OH)_2$ or may be contained in the form of a salt. The salt of phosphoric acid group is a salt represented by $—P{=}O(O^- M^+)_2$. In the above, $M^+$ represents a cation such as an alkali metal ion. The amino group may be a primary amino group, a secondary amino group, or a tertiary amino group. From the viewpoint of further improving the brightness, the functional group is preferably a carboxy group, a hydroxy group, or a phosphoric acid group and more preferably a carboxy group.

The second (meth)acrylate is a mono- or higher functional (meth)acrylate. From the viewpoint of further improving the brightness, the second (meth)acrylate is preferably a monofunctional, bifunctional or trifunctional (meth)acrylate, more preferably a monofunctional or bifunctional (meth) acrylate, and still more preferably a monofunctional (meth) acrylate. The monofunctional (meth)acrylate can be represented by, for example, the formula: A-L-X. In the formula, A represents any of the above-mentioned functional groups, L represents a divalent linking group, and X represents a (meth)acryloyl group or a (meth)acryloyloxy group. The divalent linking group represented by L can be, for example, one of or a combination of two or three or more of divalent groups selected from the group consisting of an alkylene group, a cycloalkylene group, and an ester group (—O—C(═O)—). Examples of the alkylene group can include linear or branched alkylene groups having 1 to 3 carbon atoms (for example, a methylene group, an ethylene group, and a propylene group). Examples of the cycloalkylene group can include cycloalkylene groups having 5 to 8 carbon atoms (for example, a cyclopentylene group, a cyclohexylene group, a cycloheptylene group, and a cyclooctylene group). The alkylene group may have or may not have a substituent, and is preferably an unsubstituted alkylene group. This point is also the same for the cycloalkylene group. An acrylic acid can be mentioned as an example of the monofunctional (meth)acrylate having a carboxy group. The acrylic acid is a carboxylic acid represented by $CH_2{=}CHCOOH$, and the carbonyl group (—C(═O)—) is both part of the carboxy group and part of the acryloyl group.

Specific examples of the second (meth)acrylate can include carboxy group-containing (meth)acrylates such as acrylic acid, β-carboxyethyl acrylate, 2-acryloyloxyethyl succinate, and 2-acryloyloxyethyl hexahydrophthalate, phosphoric acid group-containing (meth)acrylates such as 2-acryloyloxyethyl acid phosphate, and hydroxy group-containing (meth)acrylates such as 2-hydroxyethyl acrylate.

The molecular weight of the (meth)acrylate contained as the second (meth)acrylate in the polymerizable composition can be, for example, 50 or more. From the viewpoint of further improving the durability, the molecular weight of the (meth)acrylate is preferably 70 or more and more preferably 100 or more. In addition, from the viewpoint of further improving the brightness, the molecular weight of the (meth)acrylate contained as the second (meth)acrylate in the polymerizable composition is preferably 500 or less, more preferably 400 or less, still more preferably 300 or less, and even still more preferably 200 or less.

From the viewpoint of further improving the brightness, the content of the second (meth)acrylate in the polymerizable composition is preferably 0.5% by mass or more and more preferably 3.0% by mass or more with respect to the total amount of the composition. In addition, from the viewpoint of further improving the durability, the content of the second (meth)acrylate is preferably 20.0% by mass or less with respect to the total amount of the composition. The polymerizable composition may contain only one type of (meth)acrylate which is the second (meth)acrylate, or may contain two or more types of (meth)acrylates.

((Meth)Allyl Compound)

In a case where the polymerizable composition includes one or more types of (meth)allyl compounds, the (meth)allyl compound may be a monofunctional (meth)allyl compound or may be a polyfunctional (meth)allyl compound, and preferably includes at least a polyfunctional (meth)allyl compound. As the (meth)allyl compound, one type may be used alone, two or more types may be used in combination, or one or more types of monofunctional (meth)allyl compounds and one or more types of polyfunctional (meth)allyl compounds may be used in combination.

Specific examples of the monofunctional (meth)allyl compound include a (meth)allyl acetate, a (meth)allyl n-propionate, a (meth)allyl benzoate, a (meth)allyl phenyl acetate, a (meth)allyl phenoxy acetate, a (meth)allyl methyl ether, and a (meth)allyl glycidyl ether.

The functionality of the polyfunctional (meth)allyl compound is bi- or higher functional and can be, for example, bifunctional, trifunctional, or tetrafunctional.

Specific examples of the polyfunctional (meth)allyl compound include di(meth)allyl benzenedicarboxylate, di(meth) allyl cyclohexanedicarboxylate, di(meth)allyl maleate, di(meth)allyl adipate, di(meth)allyl phthalate, di(meth)allyl isophthalate, di(meth)allyl terephthalate, glycerol di(meth) allyl ether, trimethylolpropane di(meth)allyl ether, pentaerythritol di(meth)allyl ether, 1,3-di(meth)allyl-5-glycidyl isocyanurate, tri(meth)allyl cyanurate, tri(meth)allyl isocyanurate, tri(meth)allyl trimellitate, tetra(meth)allyl pyromellitate, 1,3,4,6-tetra(meth)allyl glycoluril, 1,3,4,6-tetra(meth) allyl-3a-methyl glycoluril, 1,3,4,6-tetra(meth)allyl-3a,6a-dimethyl glycoluril, and the like.

Preferred examples of the (meth)allyl compound can include one or more selected from the group consisting of tri(meth)allyl cyanurate, tri(meth)allyl isocyanurate, di(meth)allyl phthalate, di(meth)allyl isophthalate, di(meth)allyl terephthalate, and di(meth)allyl cyclohexanedicarboxylate, and tri(meth)allyl isocyanurate is more preferable.

From the viewpoint of suppressing a decrease in brightness, that is, improving the durability, the content of the (meth)allyl compound in the polymerizable composition is preferably 10.0% by mass or more, more preferably 20.0% by mass or more, and still more preferably 30.0% by mass or more with respect to the total amount of the composition.

<Quantum Dot>

In an aspect, the polymerizable composition can further include one or more types of quantum dots. Hereinafter, the quantum dot will be described in more detail.

A flat panel display such as a liquid crystal display device (hereinafter, also referred to as LCD) is used as a space-saving image display apparatus with low power consumption, and its application is expanding year by year. In recent years, a quantum dot (also referred to as QD, quantum point, or the like) has been attracting attention as a light emitting material for flat panel displays. The liquid crystal display device is usually composed of at least a backlight unit and a liquid crystal cell. The backlight unit can include a member containing at least quantum dots and a light source. Such member is generally called a wavelength conversion member. For example, in a case where light is incident on a wavelength conversion member from a light source, quantum dots are excited by the incident light to emit fluorescence. Here, in a case of using quantum dots having different light-emitting properties, the fluorescence emitted by the quantum dots and/or each bright line light of red light, green light, and blue light as the light emitted from the light source and passed through the wavelength conversion member can be emitted from the wavelength conversion member. This makes it possible to realize white light. Since the fluorescence emitted by the quantum dots has a small half-width, the obtained white light has high brightness and excellent color reproducibility. With the progress of the three-wavelength light source technology using such quantum dots, the color reproduction range has been expanded from 72% to 100% compared to the current television (TV) standards (Full High Definition (FHD), National Television System Committee (NTSC)).

Examples of the wavelength conversion member can include a member having a cured product (generally referred to as a "wavelength conversion layer") obtained by curing a polymerizable composition containing a quantum dot and a polymerizable compound. It is considered that it is preferable to further contain inorganic particles, for example, inorganic particles having an average particle diameter of 0.10 μm or more in the polymerizable composition including the quantum dots and the polymerizable compound from the viewpoint of improving the brightness of the wavelength conversion member including the cured product obtained by curing the polymerizable composition. However, in a case where the dispersibility of the inorganic particles in the polymerizable composition is low, a decrease in brightness may be caused. On the other hand, the compound represented by General Formula (1) can function as a dispersant for enhancing the dispersibility of inorganic particles in a polymerizable composition including quantum dots, a polymerizable compound, and inorganic particles (for example, inorganic particles having an average particle diameter of 0.10 μm or more), and can also exhibit high solubility in the polymerizable compound.

In a case where the polymerizable composition contains the quantum dots, the polymerizable composition may contain only one type of quantum dot, or may contain two or more types of quantum dots having different light-emitting properties. The quantum dot can be excited by excitation light to emit fluorescence. Known quantum dots include a quantum dot (A) having a light emission center wavelength in a wavelength range of 600 nm or longer and 680 nm or shorter, a quantum dot (B) having a light emission center wavelength in a wavelength range of 500 nm or longer and shorter than 600 nm, and a quantum dot (C) having a light emission center wavelength in a wavelength range of 400 nm or longer and shorter than 500 nm. The quantum dot (A) can be excited by excitation light to emit red light, the quantum dot (B) can be excited by excitation light to emit green light, and the quantum dot (C) can be excited by excitation light to emit blue light. For example, in a case where blue light as excitation light is incident on a wavelength conversion member containing quantum dots (A) and quantum dots (B), white light can be realized by red light emitted by the quantum dots (A), green light emitted by the quantum dots (B), and blue light that has passed through the wavelength conversion member. In addition, in a case where ultraviolet light as excitation light is incident on a wavelength conversion member containing quantum dots (A), quantum dots (B), and quantum dots (C), white light can be realized by red light emitted by the quantum dots (A), green light emitted by the quantum dots (B), and blue light emitted by the quantum dots (C).

In the present invention and the present specification, the term "quantum dots" refers to particles having an average particle diameter of 0.10 μm or less. The average particle diameter of the quantum dots can be, for example, 50 nm or less, 20 nm or less, or 10 nm or less, and can also be, for example, 1 nm or more or 3 nm or more. The quantum dots can be, for example, inorganic particles or organic particles. In the present invention and the present specification, as described above, the "inorganic particles" are particles containing an inorganic substance as a main component. The "organic particles" refer to particles containing an organic substance as a main component. The main component is as described above. In an aspect, the organic particles can be particles composed of only an organic substance. Here, the particles composed of only an organic substance refer to particles containing only an organic substance, excluding impurities that are unavoidably incorporated during the production process.

In general, semiconductor particles having an average particle diameter of less than 0.10 μm (that is, less than 100 nm, for example, 1 nm or more and 90 nm or less) are referred to as semiconductor nanoparticles. Examples of the quantum dot can include a core-shell type semiconductor nanoparticle. Examples of the core can include a II-VI group semiconductor nanoparticle, a III-V group semiconductor nanoparticle, and a multicomponent semiconductor nanoparticle. Specific examples of the core can include CdSe, CdTe, CdS, ZnS, ZnSe, ZnTe, InP, InAs, and InGaP. However, the compound having a role as the core is not limited thereto. CdSe, CdTe, InP, and InGaP are preferable because these core materials can emit visible light with high efficiency. CdS, ZnS, ZnO, GaAs and/or a complex thereof can be used as the shell. However, the compound having a role as the shell is not limited thereto. For the quantum dot, reference can be made to, for example, known techniques such as paragraphs [0060] to [0066] of JP2012-169271A and paragraphs [0070] to [0076] of WO2018/186300A. As the quantum dot, a commercially available product can be used, and a quantum dot produced by a known method can also be used. The light-emitting properties of the quantum dot can usually be adjusted by the composition and/or size of the particle.

In the present invention and the present specification, the "half-width" of a peak refers to a width of the peak at a peak height of ½. In addition, light having a light emission center wavelength in a wavelength range of 400 nm or more and less than 500 nm is called blue light, light having a light emission center wavelength in a wavelength range of 500 nm or more and less than 600 nm is called green light, and light having a light emission center wavelength in a wavelength range of 600 nm or more and 680 nm or less is called red light.

In the polymerizable composition, the content of quantum dots can be in a range of, for example, 0.1% to 10.0% by mass with respect to the total amount of the composition. In the present invention and the present specification, with respect to the polymerizable composition, the content of each component with respect to the total amount of the composition is intended to refer to a content calculated assuming that a total content of all the components excluding a solvent is 100.0% by mass in a case where the polymerizable composition contains the solvent. In a case where the polymerizable composition does not contain a solvent, the content of each component with respect to the total amount of the composition is intended to refer to a content calculated assuming that a total content of all the components contained in the composition is 100.0% by mass. In addition, a certain component may be used singly or in combination of two or more types thereof. In a case where two or more types are used as the certain component, the content of the component refers to the total content thereof.

<Other Components that can be Optionally Added>

The polymerizable composition may optionally contain one or more types of components in addition to the foregoing components. Specific examples of the component which can be optionally contained include a polymerization initiator, a polymer, a viscosity adjuster, a silane coupling agent, a surfactant, an antioxidant, an oxygen getter, and a light scattering particle. For details such as specific examples of the additive, reference can be made to, for example, paragraphs [0108] to [0137], [0162], [0163], and [0165] to [0169] of WO2018/186300. In addition, the polymerizable composition may not contain a solvent, and may contain one or more types of solvents as required. The type and amount of solvent added are not limited. For example, one type of organic solvent or two or more types of organic solvents can be used as the solvent.

In addition, examples of the component which can be optionally contained in the polymerizable composition include the following components. The following components are suitable, for example, as components of a polymerizable composition for forming a cured product included in the wavelength conversion member. Examples of such component contained in the polymerizable composition can include the inorganic particles, the polymerizable compound, and the quantum dots. The compound represented by General Formula (1) can contribute to, for example, an enhancement in dispersibility of inorganic particles (for example, inorganic particles having an average particle diameter of 0.10 μm or more) in such a polymerizable composition and can exhibit high solubility in such polymerizable composition.

(Monofunctional (Meth)Acrylate)

The polymerizable composition may optionally contain one or more types of monofunctional (meth)acrylates, for example, as a diluent or the like, in addition to the foregoing components. Such monofunctional (meth)acrylate does not include the monofunctional (meth)acrylate having the above-mentioned functional group of the second (meth) acrylate. Examples of the monofunctional (meth)acrylate that can be optionally contained include isobornyl (meth) acrylate, cyclohexyl (meth)acrylate, dicyclopentanyl (meth) acrylate, and lauryl (meth)acrylate.

The content of the monofunctional (meth)acrylate may be 0% by mass, 0% by mass or more, or more than 0% by mass with respect to the total amount of the composition of the polymerizable composition. In a case where the polymerizable composition contains the monofunctional (meth)acrylate, the content thereof is preferably 50.0% by mass or less with respect to the total amount of the composition of the polymerizable composition, from the viewpoint of further improving the durability.

(Polyfunctional Thiol)

The polymerizable composition can optionally include one or more types of polyfunctional thiols. In the present invention and the present specification, the "polyfunctional thiol" is a compound having two or more thiol groups in one molecule. The functionality in thiol refers to the number of thiol groups contained in one thiol molecule. The polyfunctional thiol which can be contained in the polymerizable composition is a bi- or higher functional thiol, and preferably a tri- or higher functional thiol. The polyfunctional thiol can be, for example, an octafunctional or lower functional thiol, a heptafunctional or lower functional thiol, a hexafunctional or lower functional thiol, a pentafunctional or lower functional thiol, or a tetrafunctional or lower functional thiol. From the viewpoint of further improving the durability, the polyfunctional thiol is preferably one or two or more types selected from the group consisting of bifunctional to hexafunctional polyfunctional thiols, more preferably one or two or more types selected from the group consisting of bifunctional to tetrafunctional polyfunctional thiols, still more preferably one or two or more types selected from the group consisting of trifunctional or tetrafunctional polyfunctional thiols, and even still more preferably a trifunctional thiol.

Specific examples of the polyfunctional thiol include ethylene bis(thioglycolate), diethylene glycol bis(3-mercaptopropionate), tetraethylene glycol bis(3-mercaptopropionate), 1,2-propylene glycol bis(3-mercaptopropionate), diethylene glycol bis(3-mercaptobutyrate), 1,4-butanediol bis(3-mercaptopropionate), 1,4-butanediol bis(3-mercaptobutyrate), 1,8-octanediol bis(3-mercaptopropionate), 1,8-octanediol bis(3-mercaptobutyrate), hexanediol bisthioglycolate, trimethylolpropane tris(3-mercaptopropionate), trimethylolpropane tris(3-mercaptobutyrate), trimethylolpropane tris(3-mercaptoisobutyrate), trimethylolpropane tris (2-mercaptoisobutyrate), trimethylolpropane tristhioglycolate, trimethylolpropane tris(3-mercaptopropionate), tris-[(3-mercaptopropionyloxy)-ethyl]-isocyanurate, trimethylolethane tris(3-mercaptobutyrate), pentaerythritol tetrakis(3-mercaptopropionate), pentaerythritol tetrakis(3-mercaptobutyrate), pentaerythritol tetrakis(3-mercaptoisobutyrate), pentaerythritol tetrakis(2-mercaptoisobutyrate), dipentaerythritol hexakis(3-mercaptopropionate), dipentaerythritol hexakis(2-mercaptopropionate), dipentaerythritol hexakis(3-mercaptobutyrate), dipentaerythritol hexakis(3-mercaptoisobutyrate), dipentaerythritol hexakis (2-mercaptoisobutyrate), pentaerythritol tetrakisthioglycolate, dipentaerythritol hexakisthioglycolate, and dipentaerythritol hexakis(3-mercaptopropionate). As the polyfunctional thiol, a commercially available product can be used, and a polyfunctional thiol synthesized by a known method can also be used. Examples of the commercially available product include commercially available polyfunctional thiols such as Multhiol Y3 (trade name, manufactured by SC Organic Chemical Co., Ltd.).

The molecular weight of the polyfunctional thiol contained in the polymerizable composition can be, for example, 200 or more. From the viewpoint of further improving the durability, the molecular weight of the polyfunctional thiol is preferably 300 or more. In addition, from the viewpoint of further improving the brightness, the molecular weight of the polyfunctional thiol is preferably 1000 or less and more preferably 500 or less. With regard to the molecular weight, the molecular weight of the second (meth)acrylate is preferably equal to or less than the molecular weight of the polyfunctional thiol and more preferably less than the molecular weight of the polyfunctional thiol. It is presumed that the second (meth)acrylate having a molecular weight equal to or less than the molecular weight of the polyfunctional thiol easily approaches the vicinity of the quantum dot even in a case where the quantum dot is coordinated with the polyfunctional thiol, and easily adsorbs to the portion not covered by the polyfunctional thiol on the surface of the quantum dot. It is presumed that this can also contribute to increasing the coverage of the ligand on the surface of the quantum dot and therefore further improving the brightness. The molecular weight ratio calculated as "molecular weight ratio (unit: %)=(molecular weight of second (meth)acrylate/molecular weight of polyfunctional thiol)×100" is preferably 100% or less, more preferably 80% or less, and still more preferably 50% or less.

From the viewpoint of further improving the durability, the content of the polyfunctional thiol in the polymerizable composition is preferably 5.0% by mass or more, more preferably 10.0% by mass or more, and still more preferably 15.0% by mass or more with respect to the total amount of the composition. In addition, from the viewpoint of further improving the durability, the content of the polyfunctional thiol is preferably 40.0% by mass or less, more preferably 35.0% by mass or less, still more preferably 30.0% by mass or less, even still more preferably 25.0% by mass or less, and even still further more preferably 20.0% by mass or less with respect to the total amount of the composition. The polymerizable composition may contain only one type of polyfunctional thiol, or may contain two or more types of polyfunctional thiols.

(Phenol-Based Compound)

In an aspect, the polymerizable composition can contain a phenol-based compound. The phenol-based compound can contribute to suppressing the change in viscosity of the polymerizable composition including the compound having a (meth)acryloyl group and the polyfunctional thiol overtime, that is, improving the liquid stability. This point will be further described below. In a composition containing both a compound containing a thiol group and a compound containing a (meth)acryloyl group, an increase in viscosity over time tends to occur as the thiol-ene reaction proceeds. On the other hand, it is presumed that in a case where a phenol-based compound is added to such composition, the phenol-based compound can act as a polymerization inhibitor, so that the above-mentioned increase in viscosity can be suppressed. In addition, it is considered that the phenol-based compound can contribute to a further improvement in the brightness of the wavelength conversion member containing the cured product obtained by curing the polymerizable composition. Although it is only presumption, it is considered that the phenol-based compound may be adsorbed on the surface of the quantum dot, which may contribute to a further improvement of the brightness. However, this is merely presumption and does not limit the present invention.

In the present invention and the present specification, the term "phenol-based compound" is used in the sense of including phenol and a derivative thereof. The phenol-based compound can be represented by General Formula (6).

General Formula (6)

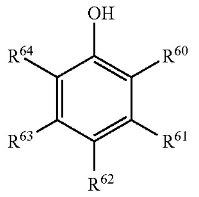

In General Formula (6), $R^{60}$ to $R^{64}$ each independently represent a hydrogen atom or a substituent. Examples of the substituent can include a hydroxy group, an alkyl group, and a carboxy group which may be substituted with an alkyl group.

Examples of the alkyl group can include linear or branched alkyl groups having 1 to 6 carbon atoms. The alkyl group includes an unsubstituted alkyl group and an alkyl group having a substituent. In a case where the alkyl group has a substituent, the number of carbon atoms is intended to refer to the number of carbon atoms in the portion excluding the substituent. Examples of the substituent capable of substituting an alkyl group can include a hydroxy group and a carboxy group. In an aspect, the alkyl group is preferably an unsubstituted alkyl group.

The same applies to the alkyl group capable of substituting the carboxy group.

The number of hydroxy groups contained in one molecule of the phenol-based compound is preferably in a range of 1 to 3, more preferably 2 or 3, and still more preferably 3. For a phenol-based compound having a plurality of hydroxy groups, the substitution position of the hydroxy group is not limited, and the hydroxy group can be substituted at any position.

Specific examples of the phenol-based compound can include pyrogallol, methyl gallate, 4-tert-butylpyrocatechol, 2,6-di-tert-butyl-p-cresol, 4-methoxy-phenol, 2-tert-butyl-4, 6-dimethylphenol, 4,4'-butylidene bis(6-tert-butyl-m- cresol), 2,6-di-tert-butylphenol, 2,2',6,6'-tetra-tert-butyl-[1,1'-biphenyl]-4,4'-diol, and 3-(3,5-di-tert-butyl-4-hydroxyphenyl)propionate.

Preferred examples of phenol-based compound can include pyrogallol. From the viewpoint of further improving the brightness and/or further improving the liquid stability, the content of pyrogallol in the polymerizable composition is preferably 0.001% by mass or more, more preferably 0.003% by mass or more, and still more preferably 0.005% by mass or more with respect to the total amount of the composition. From the viewpoint of further suppressing a decrease in brightness, that is, further improving the durability, the content of pyrogallol in the polymerizable composition is preferably 0.500% by mass or less, more preferably 0.300% by mass or less, and still more preferably 0.100% by mass or less with respect to the total amount of the composition.

In a case where the polymerizable composition contains a phenol-based compound, the polymerizable composition may contain only one type of phenol-based compound or may contain two or more types of phenol-based compounds. In a case where two or more types of phenol-based compounds are contained, the above description regarding the content of pyrogallol can be referred to for the content of each phenol-based compound.

The polymerizable composition can be prepared by mixing the above-mentioned various components at the same time or sequentially in any order.

[Cured Product]

One aspect of the present invention relates to a cured product obtained by curing the above-mentioned polymerizable composition.

The degree of curing of the cured product is not limited. The cured product may be a cured product in which the polymerization reaction of the polymerizable composition has partially progressed (generally referred to as a partially cured product, a semi-cured product, or the like), or may be a cured product in which the polymerization reaction is saturated or almost saturated (generally referred to as a completely cured product or the like).

The cured product can be used for various applications as a member containing inorganic particles.

[Wavelength Conversion Member]

According to one aspect of the present invention, a wavelength conversion member including the cured product can be provided. In an aspect, the wavelength conversion member can have a wavelength conversion layer which is a cured product obtained by curing the polymerizable composition including quantum dots (hereinafter, also referred to as a "quantum dot-containing polymerizable composition") into a film shape. For a method for manufacturing a wavelength conversion member having such wavelength conversion layer, reference can be made to, for example, paragraphs [0127] to [0155], and FIG. 2 and FIG. 3 of WO2018/016589.

In addition, in one form, the wavelength conversion member can have a wavelength conversion layer having a resin layer having a plurality of discretely arranged concave portions, and the resin layer can contain a cured product obtained by curing the quantum dot-containing polymerizable composition. Hereinafter, the wavelength conversion member having the above-described configuration will be described in more detail. In the following, the description may be made with reference to the accompanying drawings. However, the configurations shown in the drawings are examples, and the present invention is not limited to such examples.

Figure 2:
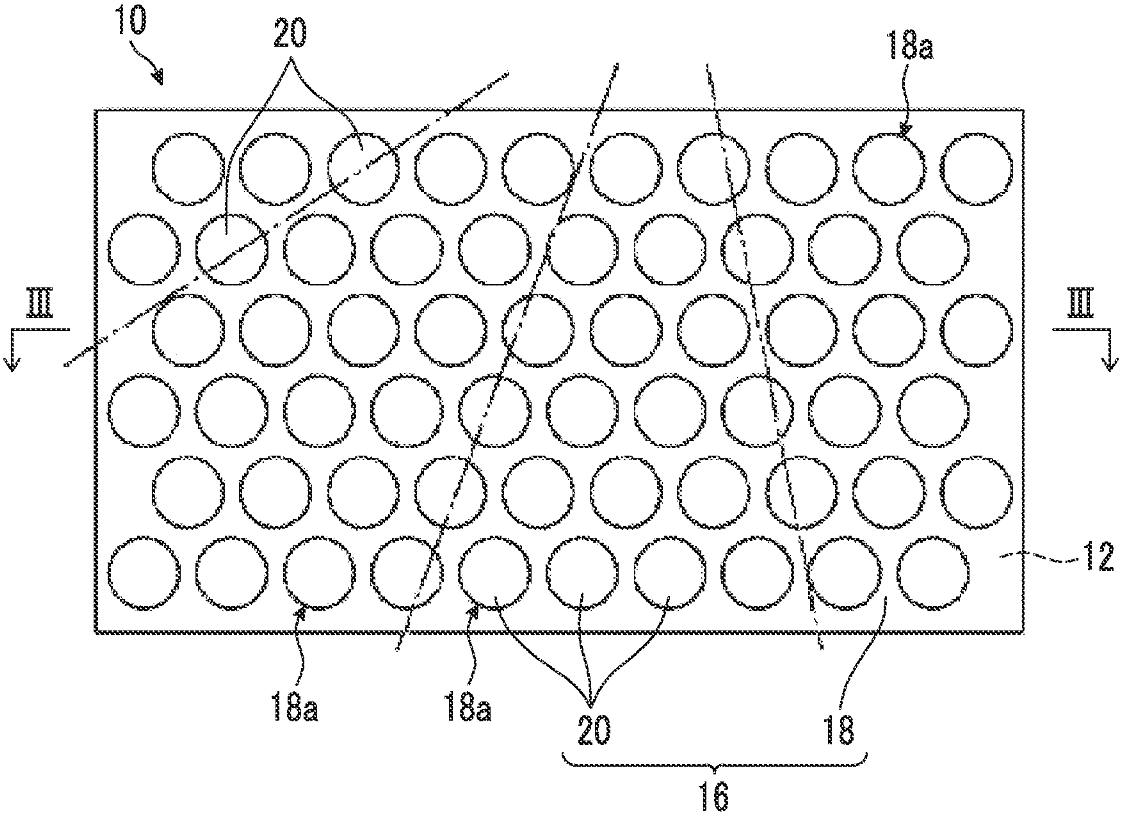
FIG. 2 is a plan view of the wavelength conversion member of FIG. 1.
Figure 3:
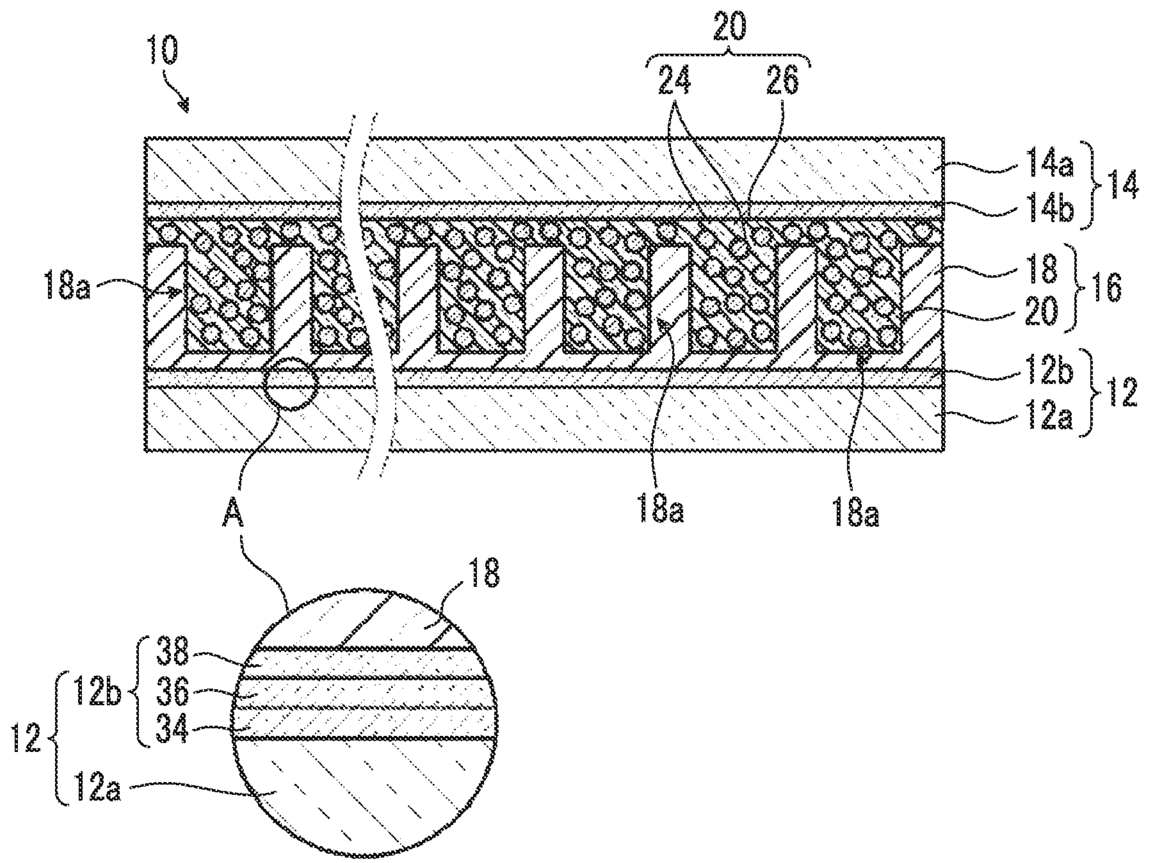
FIG. 3 is a cross-sectional view taken along line III-III of FIG. 1 and FIG. 2.

FIG. 1 is a perspective view of an example of a wavelength conversion member, FIG. 2 is a plan view of the wavelength conversion member shown in FIG. 1, and FIG. 3 is a cross-sectional view taken along line III-III of FIG. 1 and FIG. 2. The plan view of the wavelength conversion member is a view of the wavelength conversion member viewed from a direction orthogonal to a main surface (maximum surface). In the present specification, unless otherwise specified, the plan view is a view of the wavelength conversion member viewed from the second substrate film side.

As shown in FIG. 1 to FIG. 3, a wavelength conversion member 10 has a first substrate film 12, a second substrate film 14, and a wavelength conversion layer 16. In order to clearly show the configuration of the wavelength conversion member 10, the second substrate film 14 is shown by a broken line in FIG. 1, and the second substrate film 14 is omitted in FIG. 2.

As shown in FIG. 3, the first substrate film 12 has, for example, a support film 12*a* and a barrier layer 12*b*. The second substrate film 14 also has a support film 14*a* and a barrier layer 14*b*.

In addition, as shown in FIG. 3, the wavelength conversion layer 16 has a resin layer 18 (see FIG. 4) having concave portions 18*a* discretely formed in the plane direction (main surface direction) of the wavelength conversion member 10 and a cured product (hereinafter, also referred to as "quantum dot-containing portion") 20 formed by curing the quantum dot-containing polymerizable composition in the concave portions 18*a* of the resin layer 18. The quantum dot-containing portion 20 has quantum dots 24 and a matrix 26 formed by a polymerization reaction of a polymerizable compound. That is, the wavelength conversion layer 16 is provided with a plurality of quantum dot-containing portions 20 spaced apart from each other in a plane direction and containing the quantum dots 24. Specifically, the quantum dot-containing portions, which are regions containing the quantum dots 24, are spaced apart from each other in a plane direction by walls forming the concave portions 18*a* of the resin layer 18 and are then discretely arranged in the plane direction.

In the present invention and the present specification, more specifically, as shown in FIG. 1 and FIG. 2, the phrase "discretely arranged" means that a plurality of quantum dot-containing portions 20 are arranged in isolation without contacting each other in the plane direction of the first substrate film 12, in a case of observing from a direction perpendicular to the main surface of the first substrate film 12 (in a case of viewing in a plan view). In other words, the plane direction of the film is a two-dimensional direction along the film surface (main surface of the film). In the example shown in FIG. 1, the quantum dot-containing portion is cylindrical and is surrounded by the resin layer 18 in the plane direction of the first substrate film 12, and the resin layer 18 makes it difficult for oxygen to invade into the individual quantum dot-containing portions from the plane direction of the first substrate film 12.

The resin layer 18 has impermeability to oxygen preferably at least in a wall portion forming the concave portion 18*a* and more preferably in all regions of the resin layer 18. Accordingly, the wavelength conversion layer 10 can prevent deterioration of the quantum dots 24 in the quantum dot-containing portion 20. In the present invention and the present specification, the phrase "has impermeability to oxygen" means that it has an oxygen permeability of 10 $cc/(m^2 \cdot day \cdot atm)$ or less. The oxygen permeability of the resin layer 18 having impermeability to oxygen is preferably 1 cc/($m^2$·day·atm) or less and more preferably $1\times10^{-1}$ cc/($m^2$·day·atm) or less. The SI unit of the oxygen permeability is [fm/(s·Pa)]. "fm" is "femtometer" and "1 fm=$1\times10^{-15}$ m". The unit "cc/($m^2$·day·atm)" can be converted into the SI unit by the conversion formula "1 fm/(s·Pa)=8.752 cc/($m^2$·day·atm)". In addition, in the present invention and the present specification, the oxygen permeability is a value measured using an oxygen gas permeability measuring device (OX-TRAN 2/20, manufactured by MOCON, Inc.) under the conditions of a measurement temperature of 23° C. and a relative humidity of 90%. In addition, in the present invention and the present specification, the phrase "has impermeability" and the phrase "has barrier properties" are synonymous. For example, in the present invention and the present specification, the term "gas barrier properties" means having impermeability to gas, and the term "water vapor barrier properties" means having impermeability to water vapor. In addition, a layer having impermeability to both oxygen and water vapor is referred to as a "barrier layer".

In the wavelength conversion layer 16, the quantum dot-containing portions 20 are discretely arranged in a two-dimensional direction. Therefore, assuming that the wavelength conversion member 10 is a part of a long film, no matter where the wavelength conversion member 10 is cut linearly at any point, as shown by the dashed-dotted line in FIG. 2, the quantum dot-containing portions other than the quantum dot-containing portions that are cut are surrounded by the resin layer 18 and then can be kept sealed in a plane direction. In addition, the quantum dot-containing portion that has been cut and exposed to the outside air may lose its original function as a region containing the quantum dots 24. However, since the quantum dot-containing portion at the cut position, that is, the quantum dot-containing portion at the end portion in a plane direction is usually covered with a member such as a frame that constitutes a display device (display) or the like, it is not required to act as a region containing quantum dots and thus does not affect the performance of the wavelength conversion member. Furthermore, the deactivated quantum dots can serve as a resin layer that protects the quantum dot-containing portion that is not exposed to the outside air from the outside air.

In the wavelength conversion member 10, the first substrate film 12 is laminated on the main surface of the wavelength conversion layer 16 on the bottom side of the concave portion **18*a* of the resin layer 18. That is, the first substrate film 12 is laminated on the main surface on the closed surface (closed end) side of the concave portion 18*a* of the resin layer 18. In the illustrated example, the first substrate film 12 is laminated with the barrier layer 12*b* facing the resin layer 18** side.

On the other hand, the second substrate film 14 is laminated on the main surface of the resin layer 18 constituting the wavelength conversion layer 16 opposite to the first substrate film 12. That is, the second substrate film 14 is laminated on the main surface on the opening surface (opening end) side of the concave portion **18*a* of the resin layer 18. In the illustrated example, the second substrate film 14 is laminated with the barrier layer 14*b* facing the resin layer 18** side.

Depending on the method of forming the resin layer, in the wavelength conversion layer, the resin layer may have through-holes instead of concave portions, and the through-holes may be filled with quantum dot-containing portions using the substrate film as the bottom surface. In this case, one of the two substrate films sandwiching the resin layer, that is, the wavelength conversion layer, is regarded as the first substrate film, the other substrate film is regarded as the second substrate film, and the through-holes are regarded as the concave portions of the resin layer, and the first substrate film is regarded as the bottom of the concave portions of the resin layer, and on the side of the substrate film regarded as the second substrate film, the end portion of the wall portion of the resin layer 18 may be spaced apart from the second substrate film as will be described later.

Here, in the wavelength conversion layer 16, as shown in FIG. 3, the wall portion forming the concave portion **18*a* of the resin layer 18 is preferably spaced apart from the second substrate film 14 at the end portion on the second substrate film 14** side.

Furthermore, in the wavelength conversion member 10, it is preferable that the quantum dot-containing portion is also present between the second substrate film 14 and the end portion of the wall portion of the resin layer 18 spaced apart from the second substrate film 14 on the second substrate film 14 side. In a wavelength conversion member having a configuration in which a wavelength conversion layer in which a quantum dot-containing portion is divided into a plurality of regions is sealed with two substrate films, the adhesion between the wavelength conversion layer and the substrate film can be enhanced by providing a gap between the substrate film and the wall portion that divides the quantum dot-containing portion into a plurality of regions, and allowing the quantum dots to exist also in this gap.

In the following description, the second substrate film 14 side of the wavelength conversion member 10, that is, the opening side of the concave portion **18*a* of the resin layer 18 is also referred to as "upper", and the first substrate film 12 side, that is, the bottom side of the concave portion 18*a* of the resin layer 18** is also referred to as "lower".

Specifically, the wall portion forming the concave portion **18*a* of the resin layer 18 is a portion between the concave portion 18*a* and the concave portion 18*a* of the resin layer 18, in the plane direction of the substrate film and a portion that forms the plane direction outer periphery of the resin layer 18. That is, the wall portion forming the concave portion 18*a* of the resin layer 18 is, in other words, a region between the quantum dot-containing portion and the quantum dot-containing portion in the plane direction of the wavelength conversion layer 16 and a resin layer 18** in the region outside the outermost quantum dot-containing portion in the plane direction.

Figure 4:
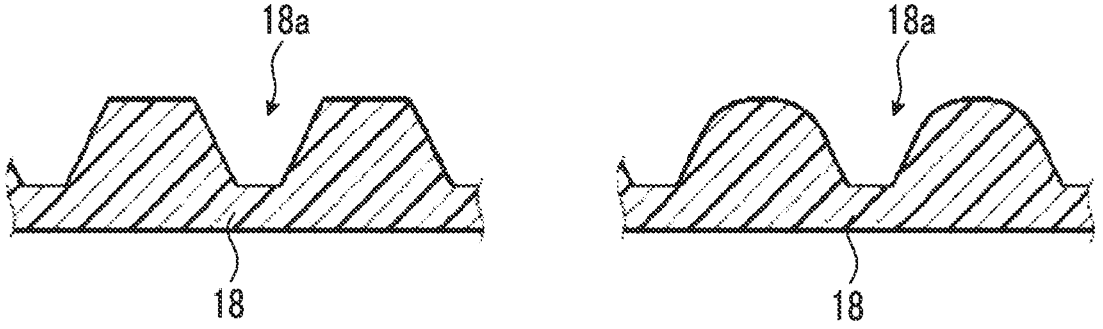
FIG. 4 is a cross-sectional view for showing an example of a shape of a resin layer of the wavelength conversion member.

In addition, in the examples shown in FIG. 1 to FIG. 3, the quantum dot-containing portion (quantum dot-containing portion in the concave portion **18*a*) is cylindrical, and the wall portion forming the concave portion 18*a* of the resin layer 18 has a rectangular cross-sectional shape. However, the present invention is not limited thereto, and the cross-sectional shape of the wall portion can be of various shapes. For example, the wall portion forming the concave portion 18*a* of the resin layer 18 may have a trapezoidal cross-sectional shape as conceptually shown on the left side of FIG. 4, or may have a cross-sectional shape in which the corner portions on the upper bottom side of the trapezoid are chamfered into a curved surface as conceptually shown on the right side of FIG. 4. As shown in FIG. 4, the cross-sectional shape of the wall portion of the resin layer 18 is preferably a shape that gradually widens downward from the top, at least in part, preferably from the upper end to the lower end. Here, "downward from the top" means from the end portion on the second substrate film 14 side toward the first substrate film 12 side. Above all, as shown on the right side of FIG. 4**, a shape in which the corner portion of the upper surface on the second substrate film side is chamfered is preferable.

Such shape is advantageous in terms of ease of manufacturing a mold for forming the resin layer 18, ease of removal of the mold in a case of forming the resin layer 18, prevention of damage to the resin layer 18 to be formed, and the like.

The upper end of the wavelength conversion layer 16 is spaced apart from the second substrate film 14 at the wall portion forming the concave portion 18*a* of the resin layer 18. In addition, the quantum dot-containing portion is provided not only in the concave portion 18*a* of the resin layer 18 but also between the second substrate film 14 and the upper end of the wall portion spaced apart from the second substrate film 14. In the wavelength conversion member 10 of the illustrated example, as shown in FIG. 3, all the wall portions are spaced apart from the second substrate film 14 at the upper ends, and a quantum dot-containing portion is provided between the wall portion and the second substrate film 14. Having such a configuration makes it possible to improve the adhesion between the wavelength conversion layer 16 containing the quantum dots 24 and the second substrate film on the upper side, that is, on the opening side of the concave portion 18*a* of the resin layer 18.

As will be described later, in the manufacture of the wavelength conversion member, as an example, a mold having concavities and convexities corresponding to concave portions and wall portions of the resin layer is filled with a coating liquid that will form a resin layer (composition for forming a resin layer), the first substrate film is laminated to cover the coating liquid filled in the mold, the coating liquid that will form a resin layer is cured, and the mold is removed to thereby form a laminate of the first substrate film and the resin layer. Next, the concave portions of the resin layer are filled with the quantum dot-containing polymerizable composition, the second substrate film is laminated on the resin layer to seal the quantum dot-containing polymerizable composition filled in the resin layer, and then the quantum dot-containing polymerizable composition is cured to produce a wavelength conversion member in which a wavelength conversion layer having a resin layer and a quantum dot-containing portion is sandwiched between the first substrate film and the second substrate film.

The first substrate film and the resin layer can be laminated with sufficient adhesion since the resin layer is laminated in the state of a coating liquid and then the coating liquid is cured. In addition, the resin layer and the quantum dot-containing portion can also be laminated with sufficient adhesion since the concave portions are filled with the quantum dot-containing polymerizable composition which is then cured. Here, regarding the wavelength conversion layer and the second substrate film, the region corresponding to the concave portion of the resin layer which is filled with the quantum dot-containing polymerizable composition is filled with a fluorescent material in the state of a coating liquid which is then cured, and therefore favorable adhesion can be obtained. Furthermore, the adhesion between the wavelength conversion layer 16 and the second substrate film 14 can be increased by a configuration where, in the resin layer 18, the upper end of at least a part of the wall portion constituting the concave portion 18*a* is spaced apart from the second substrate film 14, and the quantum dot-containing portions are present not only in the concave portion 18*a* but also between the second substrate film 14 and the upper end of the wall portion spaced apart from the second substrate film 14. In the present invention and the present specification, the phrase "between the second substrate film 14 and the upper end of the wall portion spaced apart from the second substrate film 14" includes not only a region directly above the wall portion whose upper end is spaced apart from the second substrate film 14 but also a region between the second substrate film 14 and the concave portion 18*a* (the upper end portion thereof) adjacent to the wall portion whose upper end is spaced apart from the second substrate film 14 in a plane direction.

In the wavelength conversion member 10, the wall portion of the resin layer 18 spaced apart from the second substrate film 14 is not limited to a configuration in which, as shown in FIG. 3, the upper ends of all the wall portions are spaced apart from the second substrate film 14 and the quantum dot-containing portions are provided therebetween. A greater number of wall portions of the resin layer 18 spaced apart from the second substrate film 14 can lead to higher adhesion between the wavelength conversion layer 16 and the second substrate film 14.

Considering this point, in the wavelength conversion layer 16, it is preferable that the upper end of the wall portion of the portion corresponding to the area of 30% or more of the area of a display unit of a display device in which the wavelength conversion member 10 is used is spaced apart from the second substrate film 14, and in the wall portion, it is more preferable that the upper ends of all the wall portions are spaced apart from the second substrate film 14, and the quantum dot-containing portion and the second substrate film 14 are in contact with each other over the entire surface.

Figure 5:
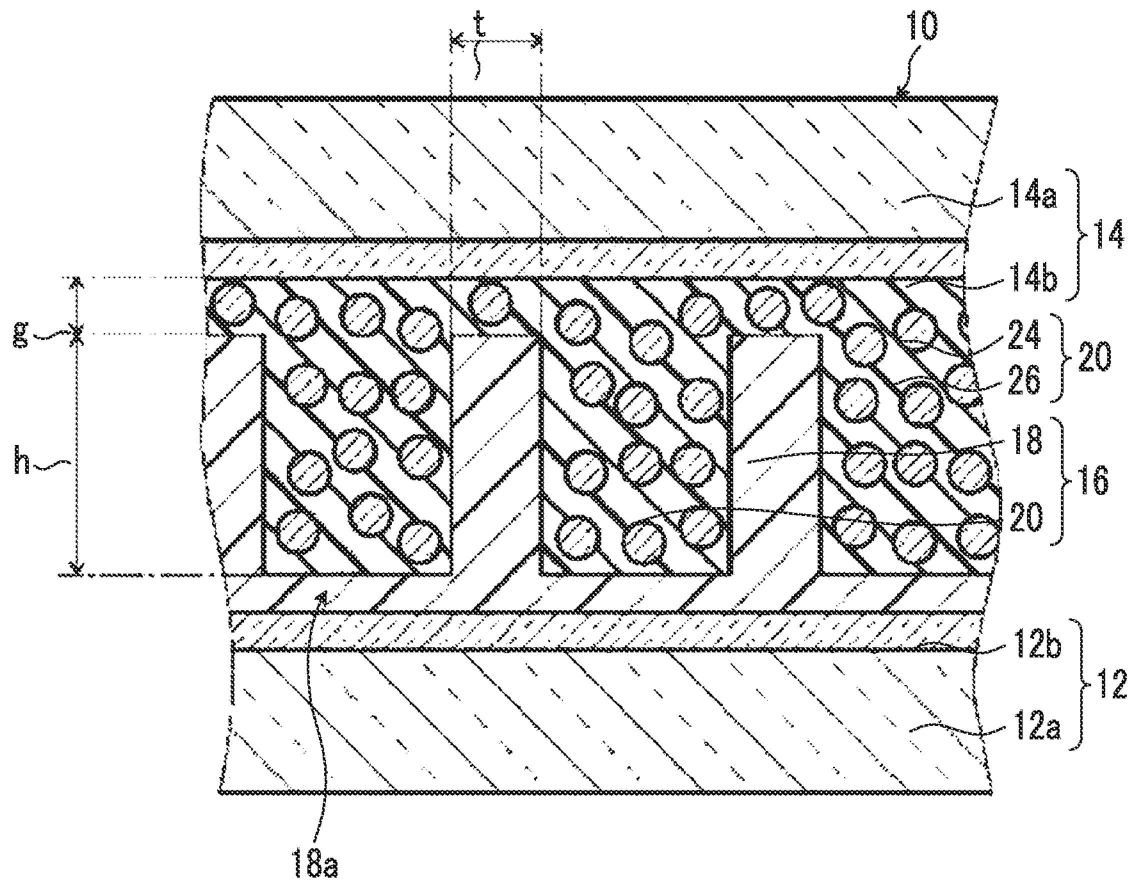
FIG. 5 is a partially enlarged view of FIG. 3.

With regard to the wavelength conversion layer 16, in the wall portion whose upper end is spaced apart from the second substrate film, a gap g (shortest distance) between the upper end (uppermost portion) of the wall portion and the second substrate film 14 is not particularly limited as long as both are spaced apart from each other (see FIG. 5). Here, the gap g between the upper end of the wall portion and the second substrate film 14 is preferably 0.01 to 10 μm, more preferably 0.05 to 4 μm, and still more preferably 0.1 to 4 μm. By setting the gap g between the upper end of the wall portion and the second substrate film 14 to 0.01 μm or more, the effect of the presence of the quantum dot-containing portion between the upper end of the wall portion and the second substrate film 14 is sufficiently exhibited, and the adhesion between the wavelength conversion layer 16 and the second substrate film 14 can be sufficiently increased. In addition, the quantum dot-containing portion is more permeable to oxygen than the resin layer 18 and therefore, in a case where the gap g between the upper end of the wall portion and the second substrate film 14 is too large, oxygen may permeate through the gap between the upper end of the wall portion and the second substrate film 14 and then the quantum dots 24 may deteriorate. On the other hand, by setting the gap g between the upper end of the wall portion and the second substrate film 14 to 10 μm or less, it is possible to sufficiently suppress the permeation of oxygen in the gap between the upper end of the wall portion and the second substrate film 14 and prevent the deterioration of the quantum dots 24 due to oxygen. On the other hand, in a case where a mixed layer 28 or an impermeable layer 30 which will be described later is provided between the upper end of the wall portion and the second substrate film 14, setting the gap g between the upper end of the wall portion and the second substrate film 14 to 10 μm or less makes it possible to prevent a decrease in light emission brightness due to the mixed layer 28 or the impermeable layer 30 being too thick.

The gap g between the upper end of the wall portion and the second substrate film 14 may be obtained, for example, by cutting a portion of the wall portion of the wavelength conversion member 10 with a microtome or the like to form a cross section, and observing the section with a scanning electron microscope (SEM) or the like. The "portion of the wall portion of the wavelength conversion member 10" is "a portion of the wavelength conversion member 10 that is not the concave portion 18*a*". The gap g can be obtained as an arithmetic average of the measured values at 10 randomly selected locations.

In the wavelength conversion layer 16, a depth h of the concave portion 18*a* of the resin layer 18 and a distance t between the adjacent quantum dot-containing portions (the quantum dot-containing portions in the adjacent concave portions 18*a*) are not particularly limited. The depth h of the concave portion of the resin layer 18 is preferably a depth that allows the thickness of the quantum dot-containing portion from the bottom of the concave portion 18*a* to the second substrate film 14 (that is, "depth h+gap g") to be 1 to 100 μm. In addition, the distance t between the adjacent quantum dot-containing portions is preferably 5 to 300 μm.

The thickness (which can also be referred to as height) of the quantum dot-containing portion is preferably 1 μm or more from the viewpoint of easiness of reaching the target chromaticity. On the other hand, in a case where the quantum dot-containing portion becomes thicker, the amount of light absorbed by the quantum dot-containing portion increases. Considering these points, the thickness of the quantum dot-containing portion from the bottom of the concave portion 18*a* to the second substrate film 14 is preferably 1 to 100 μm, more preferably 5 to 80 μm, and still more preferably 10 to 50 μm. The depth h of the concave portion 18*a* formed in the resin layer 18 and the thickness of the quantum dot-containing portion from the bottom of the concave portion 18*a* to the second substrate film 14 may be obtained by cutting a portion of the concave portion 18*a* of the wavelength conversion member 10 with a microtome or the like to form a cross section, and observing the cross section with a confocal laser microscope or the like in a state where the wavelength conversion layer 16 is irradiated with excitation light to cause the quantum dots to emit light. For the depth h and the thickness of the quantum dot-containing portion, an arithmetic average of the measured values of 10 randomly selected quantum dot-containing portions can be adopted.

In addition, the distance t between the adjacent quantum dot-containing portions, that is, the thickness of the wall portion of the resin layer 18 between the adjacent quantum dot-containing portions (between the adjacent concave portions 18*a*) is preferably short (thin wall portion) in order to make the resin layer 18 invisible. On the other hand, from the viewpoint of strength and durability, the distance t between the adjacent quantum dot-containing portions is preferably a value equal to or greater than a certain value. From these viewpoints, the distance t between the adjacent quantum dot-containing portions is preferably 5 to 300 μm, more preferably 10 to 200 μm, and still more preferably 15 to 100 μm. The distance t between the adjacent quantum dot-containing portions is the shortest distance between the adjacent quantum dot-containing portions. This distance t can be obtained by observing the surface from one surface of the wavelength conversion member 10 using a confocal laser microscope or the like, in a state where the wavelength conversion layer 16 is irradiated with excitation light to cause the quantum dots to emit light, and measuring the thickness of the wall portion of the resin layer 18 between the adjacent quantum dot-containing portions. In addition, an arithmetic average of the distances of 20 randomly selected locations can be adopted as the distance t between the adjacent quantum dot-containing portions.

The shape, size, arrangement pattern, and the like of the quantum dot-containing portion are not particularly limited and may be appropriately designed. In the design, it is possible to consider the geometrical constraint for arranging the quantum dot-containing portions spaced apart from each other in a plan view, the allowable value of the width of the non-light emitting region generated at the time of cutting, and the like. In addition, for example, in a case where a printing method is used as one of methods for forming a quantum dot-containing portion as will be described later, it is preferable that each occupied area is equal to or larger than a certain size from the viewpoint of ease of printing. In addition, the occupied area in this case is an occupied area in plan view. Furthermore, from the viewpoint of improving the mechanical strength of the wavelength conversion member, it is preferable that the shortest distance between the adjacent quantum dot-containing portions, that is, the thickness of the wall portion is large. The shape, size, and arrangement pattern of the quantum dot-containing portion may be designed in consideration of these points.

The ratio of a volume Vp of the quantum dot-containing portion to a volume Vb of the resin layer 18 can be any ratio. In an aspect, for the ratio "$Vp/(Vp+Vb)$", $0.1 \le Vp/(Vp+Vb) < 0.9$ is preferable, $0.2 \le Vp/(Vp+Vb) < 0.85$ is more preferable, and $0.3 \le Vp/(Vp+Vb) < 0.8$ is still more preferable. Here, the volume Vp of the quantum dot-containing portion and the volume Vb of the resin layer 18 are defined as the products of the respective areas and thicknesses in a case of observing from a direction orthogonal to the main surface of the wavelength conversion member 10.

Figure 6:
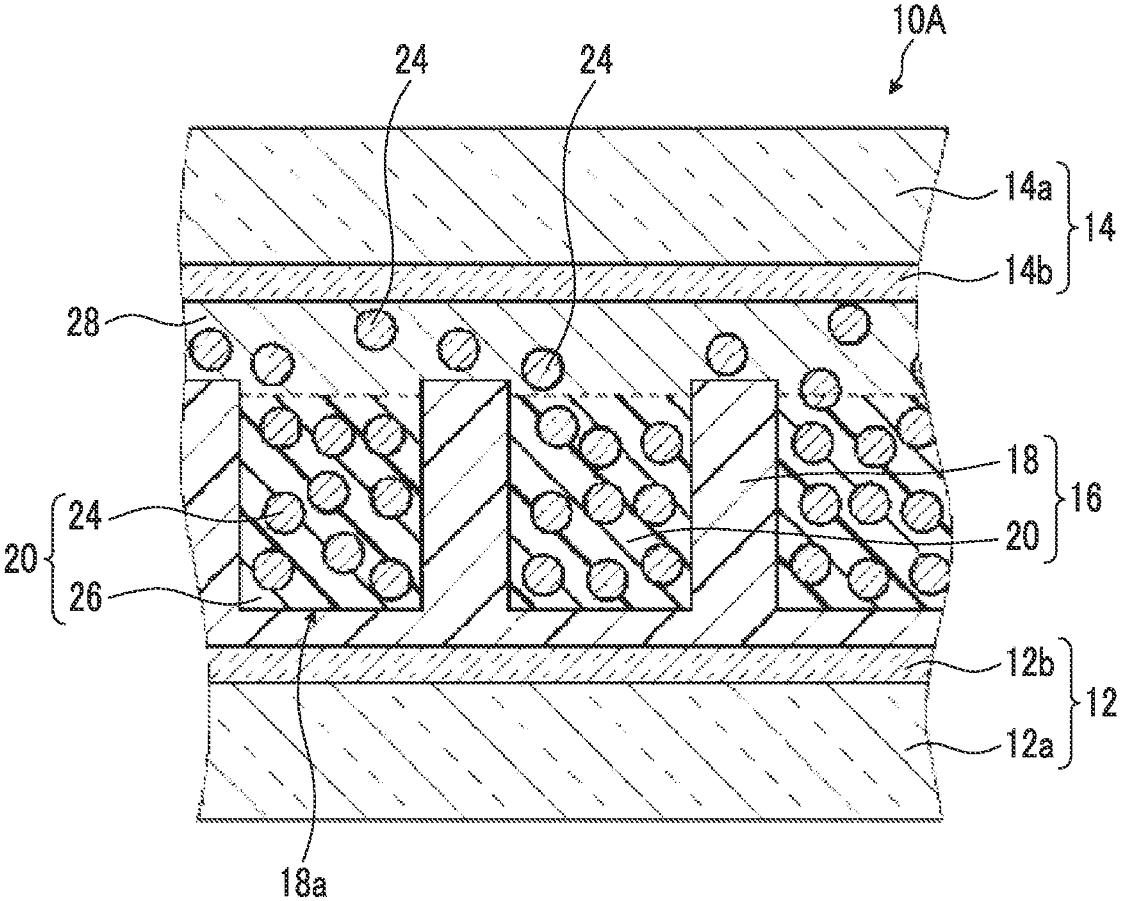
FIG. 6 is a cross-sectional view conceptually showing another example of the wavelength conversion member.

In the wavelength conversion layer, the quantum dot-containing portion between the upper end of the wall portion forming the concave portion 18*a* and the second substrate film 14 and between the concave portion 18*a* (the upper end portion thereof) and the second substrate film 14 may contain a material impermeable to oxygen in addition to the quantum dot-containing portion. FIG. 6 conceptually shows an example thereof with a cross-sectional view of the wavelength conversion member. Since the wavelength conversion member shown in FIG. 6 includes the same members as in the wavelength conversion member 10, the same members are designated by the same reference numerals, and the description thereof will be given mainly for different parts. The same applies to other drawings in this regard.

In a wavelength conversion member 10A shown in FIG. 6, the mixed layer 28 contains quantum dots and a material having impermeability to oxygen. In the following description, the "material having impermeability to oxygen" is also referred to as "oxygen-impermeable material". Having such a mixed layer 28 makes it possible for the wavelength conversion member 10A to prevent permeation of oxygen into the quantum dot-containing portion between the upper end of the wall portion forming the concave portion 18*a* and the second substrate film 14, and therefore deterioration of the quantum dots 24 due to oxygen can be suppressed. In the present invention and the present specification, the term "oxygen-impermeable material" preferably refers to a material that, in a case of being formed into a film having a thickness of 50 μm, has an oxygen permeability of 200 cc/($m^2$ day atm) or less. The oxygen-impermeable material is more preferably a material that, in a case of being formed into a film having a thickness of 50 μm, has an oxygen permeability of 20 cc/($m^2$·day·atm) or less, and still more preferably a material that, in a case of being formed into a film having a thickness of 50 μm, has an oxygen permeability of 2 cc/($m^2$·day·atm) or less. Specific examples of the oxygen-impermeable material include various materials exemplified later as a material for forming the resin layer 18. Above all, the mixed layer 28 preferably contains a material containing the same components as in the material for forming the resin layer 18 as the oxygen-impermeable material.

The mixed layer 28 is not limited to the configuration formed between the upper end of the wall portion and the second substrate film 14 and above the concave portion 18*a*, as shown in FIG. 6. For example, the mixed layer 28 may not be formed in the concave portion 18*a*, and may be formed only between the upper end of the wall portion forming the concave portion 18*a* and the second substrate film 14, or may have a configuration in which the upper portion is the mixed layer 28 and the lower portion is the quantum dot-containing portion between the upper end of the wall portion forming the concave portion 18*a* and the second substrate film 14.

The content of the oxygen-impermeable material in the mixed layer 28 is not particularly limited. A higher content of the oxygen-impermeable material in the mixed layer 28 makes it possible to further prevent deterioration of the quantum dots 24 due to oxygen. On the other hand, in a case where the content of the oxygen-impermeable material in the mixed layer 28 increases, the content of the quantum dots 24 relatively decreases, so the optical characteristics of the mixed layer 28, in other words, the optical characteristics of the wavelength conversion member 10A decrease. Considering these points, the content of the oxygen-impermeable material in the mixed layer 28 is preferably, for example, 40% to 90% by mass and more preferably 50% to 80% by mass.

In addition, the thickness of the mixed layer 28 is not particularly limited. In the mixed layer 28, the content of the quantum dots 24 is usually lower than that of the quantum dot-containing portion. Therefore, considering the optical characteristics of the wavelength conversion member 10A, it is preferable that the thickness (vertical size) of the mixed layer 28 is thin. On the other hand, from the viewpoint of preventing deterioration of the quantum dots 24, it is preferable that the mixed layer 28 is thick. Considering these points, for example, in a case where it is important to prevent deterioration of the quantum dots 24, it is preferable that the entire area between the upper end of the wall portion forming the concave portion 18*a* and the second substrate film 14 is a mixed layer.

Furthermore, as in a wavelength conversion member 10B conceptually shown in FIG. 7, the wavelength conversion member may have, in addition to the mixed layer 28, a layer (hereinafter, referred to as "impermeable layer") 30 containing no quantum dots 24 and containing the same oxygen-impermeable material as the oxygen-impermeable material contained in the mixed layer 28, between the mixed layer 28 and the second substrate film 14. Having the impermeable layer 30 makes it possible to further prevent deterioration of the quantum dots 24 due to oxygen that permeates between the upper end of the wall portion and the second substrate film 14.

The thickness of the impermeable layer 30 in the wavelength conversion member 10B is not particularly limited. The impermeable layer 30 can be a layer that does not contain the quantum dots 24 and is formed only of an oxygen-impermeable material. Therefore, similarly to the mixed layer 28, a thicker impermeable layer 30 is advantageous for preventing deterioration of the quantum dots 24 due to oxygen. On the other hand, from the viewpoint of optical characteristics of the wavelength conversion member, the impermeable layer 30 is preferably thin. In a case where the wavelength conversion member 10B has the impermeable layer 30, the thickness of the impermeable layer 30 may be appropriately set in consideration of these points.

The mixed layer 28 and the impermeable layer 30 can be formed by various methods. As described above, the wavelength conversion member 10 can be manufactured in such a manner that the resin layer 18 is formed on the surface of the first substrate film 12, the concave portion 18*a* of the resin layer 18 is filled with the quantum dot-containing polymerizable composition, the second substrate film 14 is laminated on the resin layer 18 to seal the polymerizable composition filled in the resin layer 18, and then the quantum dot-containing polymerizable composition to be the quantum dot-containing portion is cured. As an example, in this manufacturing method, before laminating the second substrate film 14, a coating liquid containing an oxygen-impermeable material is applied to the surface of the second substrate film 14 on the resin layer 18 side. Then, the second substrate film 14 is laminated on the resin layer 18 with the coating liquid containing an oxygen-impermeable material facing the resin layer 18. As a result, the quantum dot-containing polymerizable composition which is cured to become a quantum dot-containing portion and the coating liquid containing an oxygen-impermeable material are mixed between the upper end of the wall portion and the second substrate film 14. Then, by curing the mixture of the coating liquid containing an oxygen-impermeable material and the quantum dot-containing polymerizable composition, the mixed layer 28 containing the oxygen-impermeable material in addition to the quantum dots can be formed between the upper end of the wall portion and the second substrate film 14. At this time, by adjusting the coating thickness of the coating liquid containing an oxygen-impermeable material to be applied to the second substrate film 14, it is possible to set whether only the mixed layer 28 is formed or both the mixed layer 28 and the impermeable layer 30 are formed. Specifically, by increasing the coating thickness of the coating liquid containing an oxygen-impermeable material, the impermeable layer 30 can be formed in addition to the mixed layer 28. The impermeable layer 30 becomes thicker as the coating thickness of the coating liquid is increased. This point will be described later.

The wavelength conversion member 10 (10A, 10B) can have a configuration in which the resin layer 18 and the wavelength conversion layer 16 having a quantum dot-containing portion are sandwiched between the first substrate film 12 and the second substrate film 14. Furthermore, the wavelength conversion member 10 may have the mixed layer 28 and/or the impermeable layer 30 in addition to the resin layer 18 and the quantum dot-containing portion.

It is preferable that both the first substrate film 12 and the second substrate film 14 are films that are impermeable to oxygen. In the wavelength conversion member 10, in an aspect, the first substrate film 12 has a configuration in which the barrier layer 12*b* is laminated on the support film 12*a*, and the barrier layer 12*b* is laminated on the wavelength conversion layer 16 with the barrier layer 12*b* facing the wavelength conversion layer 16. Similarly, the second substrate film 14 also has a configuration in which the barrier layer 14*b* is laminated on the support film 14*a*, and the barrier layer 14*b* is laminated on the wavelength conversion layer 16 with the barrier layer 14*b* facing the wavelength conversion layer 16.

Various known barrier layers can be used for the barrier layer 12*b* of the first substrate film 12 as long as those layers have oxygen impermeability. Similarly, various known barrier layers can be used for the barrier layer 14*b* of the second substrate film 14 as long as those layers have oxygen impermeability. The first substrate film 12 and the second substrate film 14 can have the same configuration except that the lamination positions of layers are different. Therefore, except for a case where it is necessary to distinguish between the first substrate film 12 and the second substrate film 14, the following description will refer to the first substrate film 12 as a representative example.

Various known barrier layers can be used as the barrier layer 12*b* of the first substrate film 12. It is preferable to have at least one inorganic layer, and an organic/inorganic lamination type barrier layer having one or more combinations of an inorganic layer and an organic layer serving as an underlayer of the inorganic layer is more preferable.

In the wavelength conversion member 10 of the illustrated example, the barrier layer 12*b* of the first substrate film (and the barrier layer 14*b* of the second substrate film 14) has, as shown in the partially enlarged view A of FIG. 3, a configuration in which three layers of an underlying organic layer 34 formed on the surface of the support film 12*a* (the support film 14*a*), an inorganic layer 36 formed on the underlying organic layer 34, and a protective organic layer 38 formed on the inorganic layer 36 are laminated.

The surface of the support film 12*a*, that is, the underlying organic layer 34 under the inorganic layer 36 is an underlayer (undercoat layer) for properly forming the inorganic layer 36. In the organic/inorganic lamination type barrier layer, the portion that mainly exhibits the barrier properties is the inorganic layer 36. Therefore, by forming the underlying organic layer 34 and forming the inorganic layer 36 thereon, the surface on which the inorganic layer 36 is formed can be made appropriate and the inorganic layer 36 in which occurrence of defects is suppressed can be formed, and therefore high barrier properties can be obtained. The barrier layer 12*b* in the illustrated example has only one combination of the underlying organic layer 34 and the inorganic layer 36. However, this is merely an example, and the barrier layer may have a plurality of combinations of the underlying organic layer 34 and the inorganic layer 36. The greater the number of combinations of the underlying organic layer 34 and the inorganic layer 36, the higher the barrier properties can be obtained.

The protective organic layer 38 formed on the surface of the inorganic layer 36 is a protective layer (overcoat layer) that protects the inorganic layer 36 that mainly exhibits barrier properties. Having the protective organic layer 38 makes it possible to prevent breakage and chipping of the inorganic layer 36 and prevent deterioration of the barrier properties of the barrier layer 12*b* due to damage to the inorganic layer 36.

Figure 8:
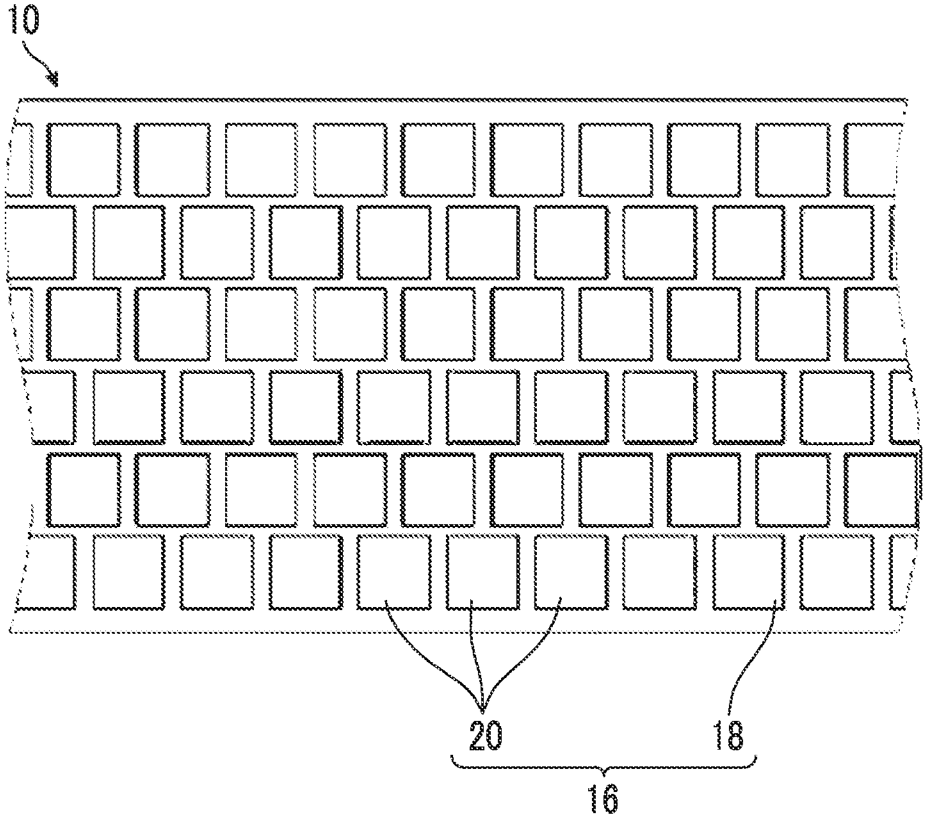
FIG. 8 is a plan view showing an example of a pattern of a quantum dot-containing portion.
Figure 9:
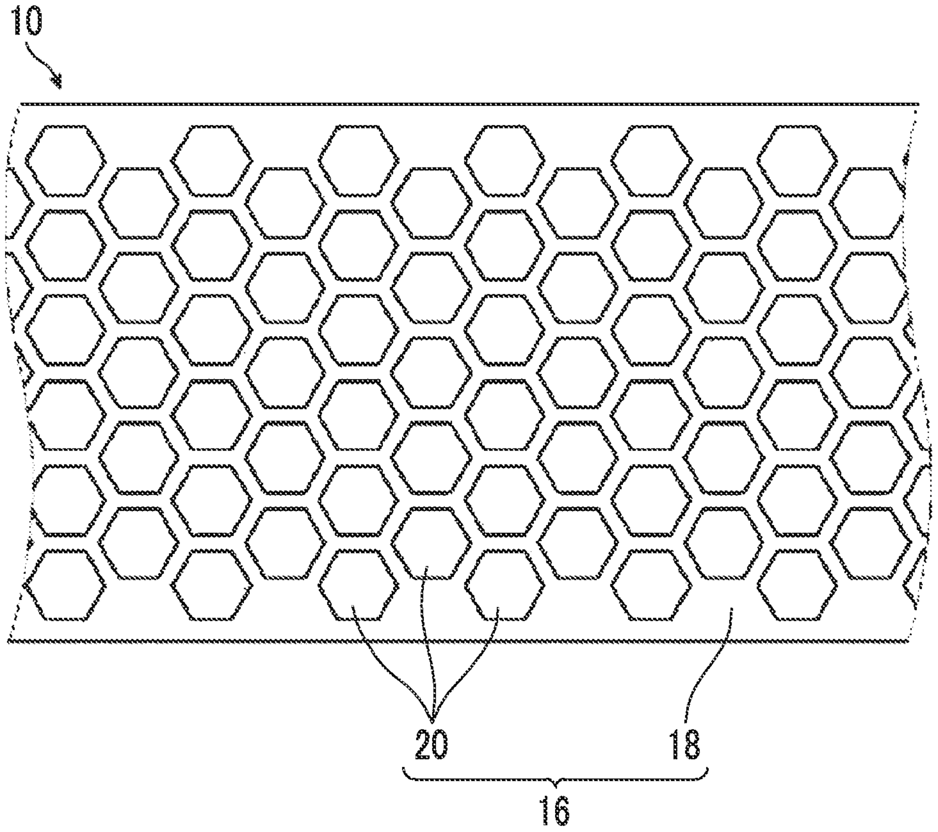
FIG. 9 is a plan view showing another example of the pattern of the quantum dot-containing portion.

In the wavelength conversion member 10 shown in FIG. 1 to FIG. 3, the quantum dot-containing portion (concave portion 18*a*) is cylindrical and is circular in a plan view. In this regard, the shape of the quantum dot-containing portion is not particularly limited. For example, the quantum dot-containing portion may be a polygonal prism, such as a quadrangle in a plan view as shown in FIG. 8, or a hexagon (honeycomb structure) in a plan view as shown in FIG. 9, or may be a regular polygonal prism. In addition, in the above-mentioned example, the bottom surface of the cylinder or polygonal prism is arranged parallel to the substrate film surface. In this regard, the bottom surface does not necessarily have to be arranged parallel to the substrate film surface. In addition, the shape of each quantum dot-containing portion may be irregular.

Figure 10:
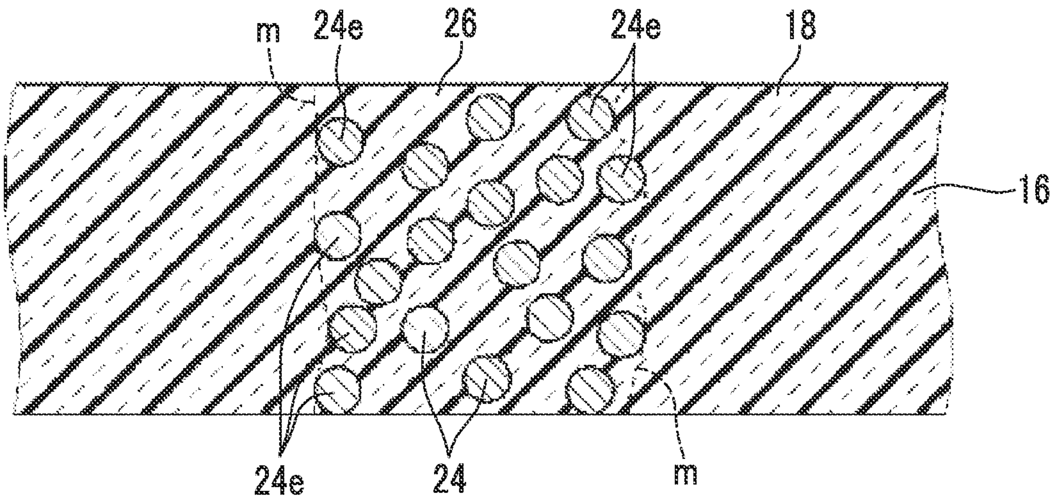
FIG. 10 is a conceptual diagram for showing a method of specifying a contour of the quantum dot-containing portion.

In a case where the boundary between the matrix 26 of the quantum dot-containing portion and the resin layer 18 is not clear, a line connecting points outside (side where the quantum dots 24 are not arranged) the quantum dots 24*e* located in the outermost portion of the region where the quantum dots 24 are arranged close to each other is regarded as a contour m of the quantum dot-containing portion (boundary between the quantum dot-containing portion and the resin layer 18), as shown in FIG. 10. The position of the quantum dot can be specified by irradiation of the wavelength conversion layer with excitation light to cause the quantum dots to emit light and observation with, for example, a confocal laser microscope, whereby the contour m of the quantum dot-containing portion can be specified. In the present invention and the present specification, with respect to the sides of a cylinder, a polygonal prism, or the like, a meandering shape such as the contour of FIG. 10 is also allowed. In addition, in the above-described form, the quantum dot-containing portions are periodically arranged in a pattern. In this regard, as long as a plurality of quantum dot-containing portions are discretely arranged, the arrangement of the quantum dot-containing portions may be aperiodic as long as the desired performance is not impaired.

It is preferable that the quantum dot-containing portions 20 are uniformly distributed over the entire wavelength conversion layer 16 because the in-plane distribution of brightness is uniform.

In order to make an amount of fluorescence sufficient, it is preferable that the region occupied by the quantum dot-containing portion is large. The quantum dots 24 in the quantum dot-containing portion may be one type or a plurality of types. In addition, the quantum dots 24 in one quantum dot-containing portion are one type, and among a plurality of quantum dot-containing portions, a region containing first quantum dots and a region containing second quantum dots different from the first quantum dots may be arranged periodically or aperiodically. The number of types of quantum dots may be three or more. The details of the quantum dots are as described above.

As described above, the wavelength conversion layer is not particularly limited in the shape of the quantum dot-containing portion, the arrangement pattern of the quantum dot-containing portions, and the like. In any case, the quantum dot-containing portions are discretely arranged on the film surface, and therefore the quantum dots in the quantum dot-containing portion at the cut end portion may deteriorate. However, since the quantum dots in the portion other than the cut end portion are surrounded and sealed by the resin in the direction along the film surface, it is possible to suppress the deterioration of the performance due to the invasion of oxygen from the direction along the film surface.

Each constituent element of the wavelength conversion layer will be described below.

As described above, the wavelength conversion member 10 shown in FIG. 1 to FIG. 3 has a configuration in which the wavelength conversion layer 16 is laminated on one film surface of the first substrate film 12, and the second substrate film 14 is further laminated on the wavelength conversion layer 16, so that the wavelength conversion layer 16 is sandwiched between the two substrate films.

<Resin Layer>

The resin layer 18 can be formed, for example, by preparing a composition for forming a resin layer containing a polymerizable compound similar to the polymerizable compound forming the matrix 26, applying the composition, and curing the composition. The resin layer 18 is preferably impermeable to oxygen. It is preferable that the resin layer 18 satisfies an oxygen permeability of 10 cc/($m^2$·day·atm) or less at the shortest distance between the adjacent quantum dot-containing portions with the wall portion forming the concave portion 18*a* interposed therebetween. The oxygen permeability of the resin layer 18 at the shortest distance between the adjacent quantum dot-containing portions is preferably 10 cc/($m^2$·day·atm) or less, more preferably 1 cc/($m^2$·day·atm) or less, and still more preferably $1\times10^{-1}$ cc/($m^2$·day·atm) or less.

The desired shortest distance between the quantum dot-containing portions, that is, the desired distance t between the quantum dot-containing portions (concave portions 18*a*) varies depending on the composition of the resin layer 18. The shortest distance between the adjacent quantum dot-containing portions of the resin layer 18 means the shortest distance in the film surface between the adjacent quantum dot-containing portions in a case of observing from the main surface of the wavelength conversion member.

The elastic modulus of the resin layer 18 is preferably 0.5 to 10 GPa, more preferably 1 to 7 GPa, and still more preferably 3 to 6 GPa. It is preferable to set the elastic modulus of the resin layer within the above range in order to prevent defects during the formation of the resin layer while maintaining the desired oxygen permeability. The elastic modulus of the resin layer is measured by a method exemplified by Japanese Industrial Standards (JIS) K 7161 or the like.

For the composition for forming a resin layer, for example, reference can be made to paragraphs [0174] to [0179] of WO2018/186300.

The composition for forming a resin layer can contain a compound having a bi- or higher functional photopolymerizable crosslinking group. Examples of the compound having a bi- or higher functional photopolymerizable crosslinking group can include polymerizable compounds such as (meth)acrylate, a (meth)allyl compound, an allyl ether compound, a vinyl compound, and a vinyl ether compound. Since polymerizable compounds such as a (meth)allyl compound, an allyl ether compound, a vinyl compound, and a vinyl ether compound tend to have poor homopolymerizability as compared with (meth)acrylate, it is preferable to form a resin layer including a thiol-ene resin in a composition for forming a resin layer using these polymerizable compounds.

Specific examples of the polymerizable compound that can be contained in the composition for forming a resin layer can include, in addition to various polymerizable compounds described in paragraph [0174] of WO2018/186300A and (meth)acrylate described above for the polymerizable composition, diallylamine, diallyl ether, diallyl sulfide, diallyl fumarate, diallyl isophthalate, diallylpropyl isocyanurate, 1,5-hexadiene-3,4-diol, diethylene glycol divinyl ether, triallylamine, triallyl citrate, triallyl cyanurate, triallyl isocyanurate, triallyl 1,3,5-benzenetricarboxylate, 2,4,6-tris(allyloxy) 1,3,5-triazine, 2,4,6-trimethyl-2,4,6-trivinylcyclotrisiloxane, pentaerythritol tetraallyl ether, N,N, N',N',N",N"-hexaallyl-1,3,5-triazine-2,4,6-triamine, and the like. For the polyfunctional thiol, the above description regarding the polymerizable composition can be referred to. Since the thiol-ene resin is generally a flexible resin as compared with the (meth)acrylate crosslinked substance, it is preferable to use a component having a rigid ring structure such as isocyanurate and triazine as a component for obtaining the thiol-ene resin in order to enhance a modulus of elasticity and/or oxygen impermeability.

<Substrate Film>

As described above, the first substrate film 12 (and the second substrate film 14) can have a configuration in which the barrier layer 12*b* is laminated on the support film 12*a*. In addition, the barrier layer 12*b* (and the barrier layer 14*b*) can have the underlying organic layer 34, the inorganic layer 36, and the protective organic layer 38. Such a first substrate film 12 is laminated on the wavelength conversion layer 16 with the barrier layer 12*b* facing the wavelength conversion layer 16. In this configuration, the strength of the wavelength conversion member 10 can be improved by the support film 12*a*, and the film formation can be easily carried out. However, in the present invention and the present specification, the first substrate film (and the second substrate film) is not limited to such a configuration having the support film 12*a* and the barrier layer 12*b*, and various film-like materials (sheet-like materials) can be used as long as those materials can ensure the necessary impermeability to oxygen. For example, the first substrate film may be composed only of a support film having sufficient barrier properties. In addition, a first substrate film in which only one inorganic layer is formed on the surface of the support film can also be used.

The first substrate film 12 preferably has a total light transmittance of 80% or more and more preferably 85% or more in the visible light range. The visible light range is a wavelength range of 380 to 780 nm, and the total light transmittance indicates an arithmetic average of the light transmittance over the visible light range.

The oxygen permeability of the first substrate film 12 is preferably 1 cc/($m^2$·day·atm) or less. The oxygen permeability of the first substrate film 12 is more preferably 0.1 cc/($m^2$·day·atm) or less, still more preferably 0.01 cc/($m^2$·day·atm) or less, and even still more preferably 0.001 cc/($m^2$·day·atm) or less.

The first substrate film 12 preferably has water vapor barrier properties that block water (water vapor) in addition to gas barrier properties that block oxygen. The moisture permeability (water vapor permeability) of the first substrate film 12 is preferably 0.10 g/($m^2$·day·atm) or less and more preferably 0.01 g/($m^2$·day·atm) or less.

<Support Film>

A strip-shaped support film having flexibility and being transparent to visible light is preferable as the support film 12*a* (and the support film 14*a*). The phrase "transparent to visible light" as used herein refers to a light transmittance in the visible light region of 80% or more and preferably 85% or more. The light transmittance used as a measure of transparency can be calculated by measuring the total light transmittance and the amount of scattered light using the method described in JIS K 7105, that is, an integrating sphere type light transmittance measuring device, and subtracting the diffuse transmittance from the total light transmittance. For the support film having flexibility, reference can be made to paragraphs [0046] to [0052] of JP2007-290369A and paragraphs [0040] to [0055] of JP2005-096108A.

Specific examples of the support film 12*a* include a polyethylene terephthalate (PET) film, a film consisting of a polymer having a cyclic olefin structure, and a polystyrene film.

The thickness of the support film 12*a* is preferably 10 to 500 μm, more preferably 20 to 400 μm, and still more preferably 30 to 300 μm from the viewpoint of improving the impact resistance of the wavelength conversion member. In a form in which the retroreflection of light is increased, such as in a case where the concentration of quantum dots contained in the wavelength conversion layer 16 is reduced and in a case where the thickness of the wavelength conversion layer 16 is reduced, it is more preferable that the absorbance of light having a wavelength of 450 nm is lower. From this point of view, the thickness of the support film 12*a* is preferably 40 m or less and more preferably 25 μm or less.

<Barrier Layer>

The first substrate film 12 (and the second substrate film 14) has the barrier layer 12*b* on one surface of the support film 12*a*. As described above, various known barrier layers can be used as the barrier layer 12*b*. It is preferable to have at least one inorganic layer, and an organic/inorganic lamination type barrier layer having one or more combinations of an inorganic layer and an organic layer serving as an underlayer of the inorganic layer is more preferable. In the wavelength conversion member 10 of the illustrated example, the barrier layer 12*b* of the first substrate film has, as shown in the partially enlarged view A of FIG. 3, a configuration in which three layers of the underlying organic layer 34 formed on the surface of the support film 12*a*, the inorganic layer 36 formed on the underlying organic layer 34, and the protective organic layer 38 formed on the inorganic layer 36 are laminated. In the following description, in a case where it is not necessary to distinguish between the underlying organic layer 34 and the protective organic layer 38, both are collectively referred to as an "organic layer".

In the present invention and the present specification, the "inorganic layer" is a layer containing an inorganic substance as a main component. The main component refers to a component that accounts for the largest amount on a mass basis among the components constituting the layer. The same also applies to the following organic layers. The inorganic layer can be a layer in which the content of the inorganic substance is 50% by mass or more, 60% by mass or more, 70% by mass or more, 80% by mass or more, 90% by mass or more, 95% by mass or more, or 99% by mass or more. Alternatively, the inorganic layer can be a layer composed of only an inorganic substance. Here, the layer composed of only an inorganic substance refers to a layer containing only an inorganic substance, excluding impurities unavoidably incorporated in the manufacturing process. In the inorganic layer, only one type of the inorganic substance may be contained, or two or more types of the inorganic substances may be contained.

The inorganic layer 36 is preferably a layer having gas barrier properties that block oxygen. Specifically, the oxygen permeability of the inorganic layer is preferably 1 cc/($m^2$·day·atm) or less. The inorganic layer also preferably has water vapor barrier properties that block water vapor.

The thickness of the inorganic layer 36 is preferably 1 to 500 nm, more preferably 5 to 300 nm, and still more preferably 10 to 150 nm. This is because, in a case where the thickness of the inorganic layer 36 is within the above range, reflection in the inorganic layer 36 can be suppressed while achieving favorable barrier properties, and a laminated film having a higher light transmittance can be provided.

In the present invention and the present specification, the "organic layer" is a layer containing an organic substance as a main component. The organic layer can be a layer having an organic substance content of 50% by mass or more, 60% by mass or more, 70% by mass or more, 80% by mass or more, 90% by mass or more, 95% by mass or more, or 99% by mass or more. Alternatively, the organic layer can be a layer composed of only an organic substance. Here, the layer composed of only an organic substance refers to a layer containing only an organic substance, excluding impurities that are unavoidably incorporated during the production process. The organic layer may contain only one type of organic substance, or may contain two or more types of organic substances.

For the organic layer (the underlying organic layer 34 and the protective organic layer 38), reference can be made to paragraphs [0020] to [0042] of JP2007-290369A and paragraphs [0074] to [0105] of JP2005-096108A. In an aspect, the organic layer preferably contains a cardo polymer. This is because the adhesion between the organic layer and the adjacent layer, particularly the adhesion with the inorganic layer, becomes stronger and therefore further excellent gas barrier properties can be achieved. For details of the cardo polymer, reference can be made to paragraphs [0085] to [0095] of JP2005-096108A.

The thickness of the organic layer is preferably 0.05 to 10 μm and more preferably 0.5 to 10 μm. In a case where the organic layer is formed by a wet coating method, the thickness of the organic layer is preferably 0.5 to 10 μm and more preferably 1 to 5 μm. On the other hand, in a case where the organic layer is formed by a dry coating method, the thickness of the organic layer is preferably 0.05 to 5 μm and more preferably 0.05 to 1 μm. In a case where the thickness of the organic layer formed by the wet coating method or the dry coating method is within the above range, the adhesion with the inorganic layer can be further strengthened.

For details of the inorganic layer, reference can also be made to paragraphs [0193] to [0196] of WO2018/186300. In addition, for other details of the inorganic layer and the organic layer, reference can be made to the description of JP2007-290369A, JP2005-096108A, and further US2012/0113672A1.

In the wavelength conversion member, the organic layer may be laminated as an underlayer of the inorganic layer between the support film and the inorganic layer, or may be laminated as a protective layer of the inorganic layer between the inorganic layer and the wavelength conversion layer. In addition, in a case where two or more inorganic layers are provided, the organic layer may be laminated between the inorganic layers.

The first substrate film 12 (and the second substrate film 14) may be provided with a concavity-convexity imparting layer that imparts a concave-convex structure, on a surface opposite to the surface on the wavelength conversion layer 16 side. It is preferable that the first substrate film 12 has the concavity-convexity imparting layer because it is possible to improve the blocking properties and/or sliding properties of the substrate film. The concavity-convexity imparting layer is preferably a layer containing particles. Examples of the particles include inorganic particles such as silica, alumina and metal oxide, and organic particles such as crosslinked polymer particles. In addition, the concavity-convexity imparting layer is preferably provided on the surface of the substrate film opposite to the wavelength conversion layer, and may be provided on both surfaces of the substrate film.

The wavelength conversion member 10 can have a light scattering function in order to efficiently extract the fluorescence of the quantum dots to the outside. The light scattering function may be provided inside the wavelength conversion layer 16, or a layer having a light scattering function may be separately provided as a light scattering layer. The light scattering layer may be provided on the surface of the first substrate film 12 and/or the second substrate film 14 on the wavelength conversion layer 16 side, or may be provided on the surface of the first substrate film 12 and/or the second substrate film 14 opposite to the wavelength conversion layer 16. In a case where the concavity-convexity imparting layer is provided, it is preferable that the concavity-convexity imparting layer is a layer that can also be used as the light scattering layer.

<Mixed Layer and Impermeable Layer>

As described above, the mixed layer 28 contains the quantum dots 24 contained in the quantum dot-containing portion 20. In addition, the impermeable layer 30 can be a layer consisting of an oxygen-impermeable material and not containing the quantum dots 24. Various materials that can be used as the material for forming the resin layer 18 can be used as the oxygen-impermeable material. Above all, the mixed layer 28 and the impermeable layer 30 preferably contain the same polymerizable compound as the polymerizable compound used for forming the resin layer 18 as the oxygen-impermeable material.

<Manufacturing Method of Wavelength Conversion Member>

Next, an example of the manufacturing process of the wavelength conversion member will be described with reference to the conceptual diagrams of FIG. 11 and FIG. 12.

First, a composition L1 for forming a resin layer for forming the resin layer 18 is prepared by mixing various components such as a polymerization initiator, inorganic particles, and light scattering particles, if necessary, in addition to the polymerizable compound.

In addition, the quantum dot-containing polymerizable composition L2 containing quantum dots is prepared.

Furthermore, a mold M having a concave-convex pattern corresponding to the concave portion 18*a* and the wall portion of the resin layer 18 for forming the resin layer 18, and the first substrate film 12 and the second substrate film 14 are prepared.

Figure 11:
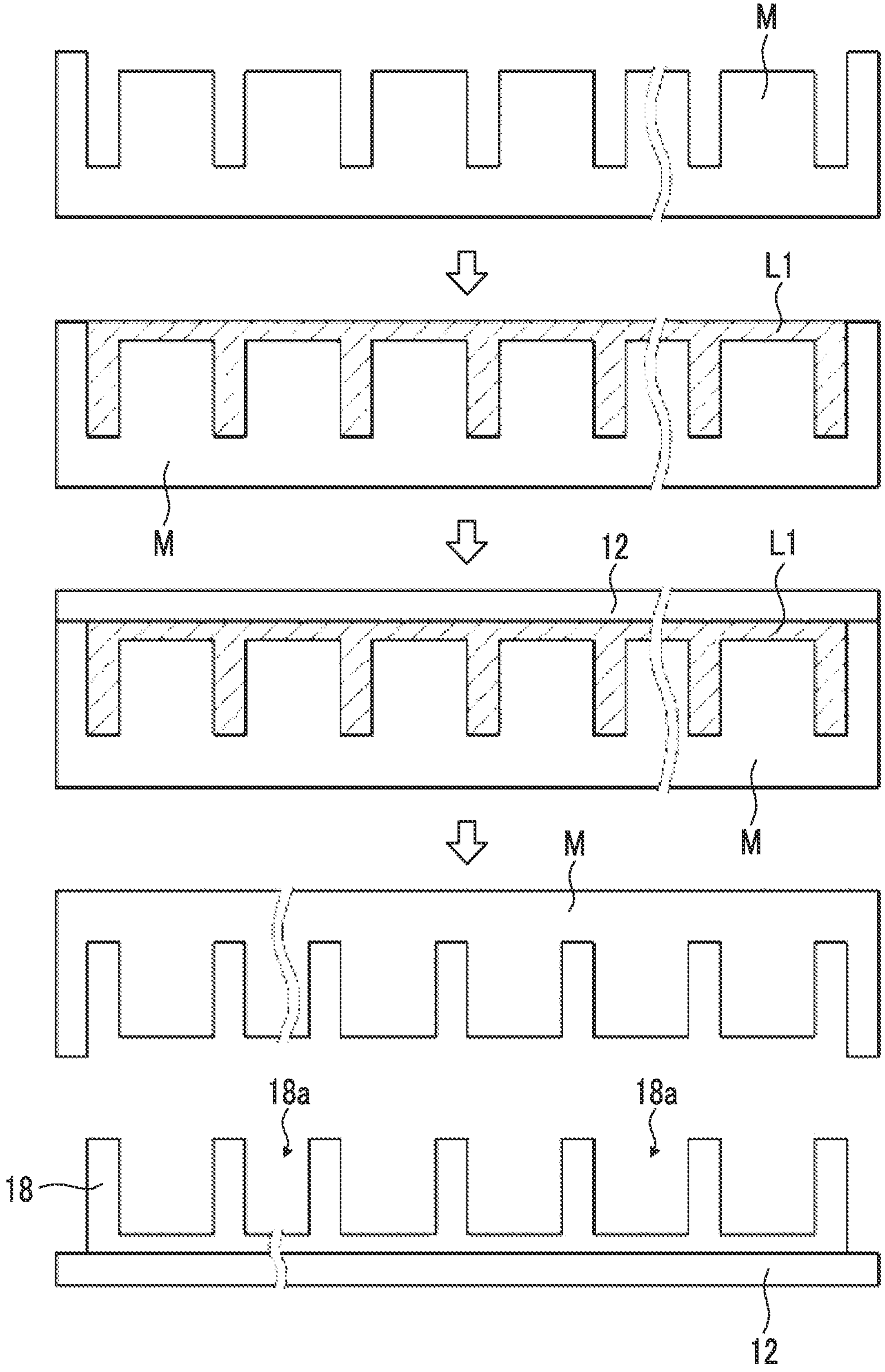
FIG. 11 is a conceptual diagram for showing an example of a method for manufacturing the wavelength conversion member.

After preparing these, first, as shown in the first and second stages of FIG. 11, the prepared mold M is filled with the prepared composition L1 for forming a resin layer, and as shown in the third stage of FIG. 11, the first substrate film 12 is laminated on the mold M to cover the entire surface of the composition L1 for forming a resin layer.

Next, the composition L1 for forming a resin layer is cured by, for example, irradiation with ultraviolet rays to form the resin layer 18, and as shown in the fourth stage of FIG. 11, the mold M is removed from the resin layer 18. As a result, a laminate is formed in which the resin layer 18 with the bottom of the concave portion 18*a* facing the first substrate film 12 is laminated on one surface of the first substrate film 12.

Figure 12:
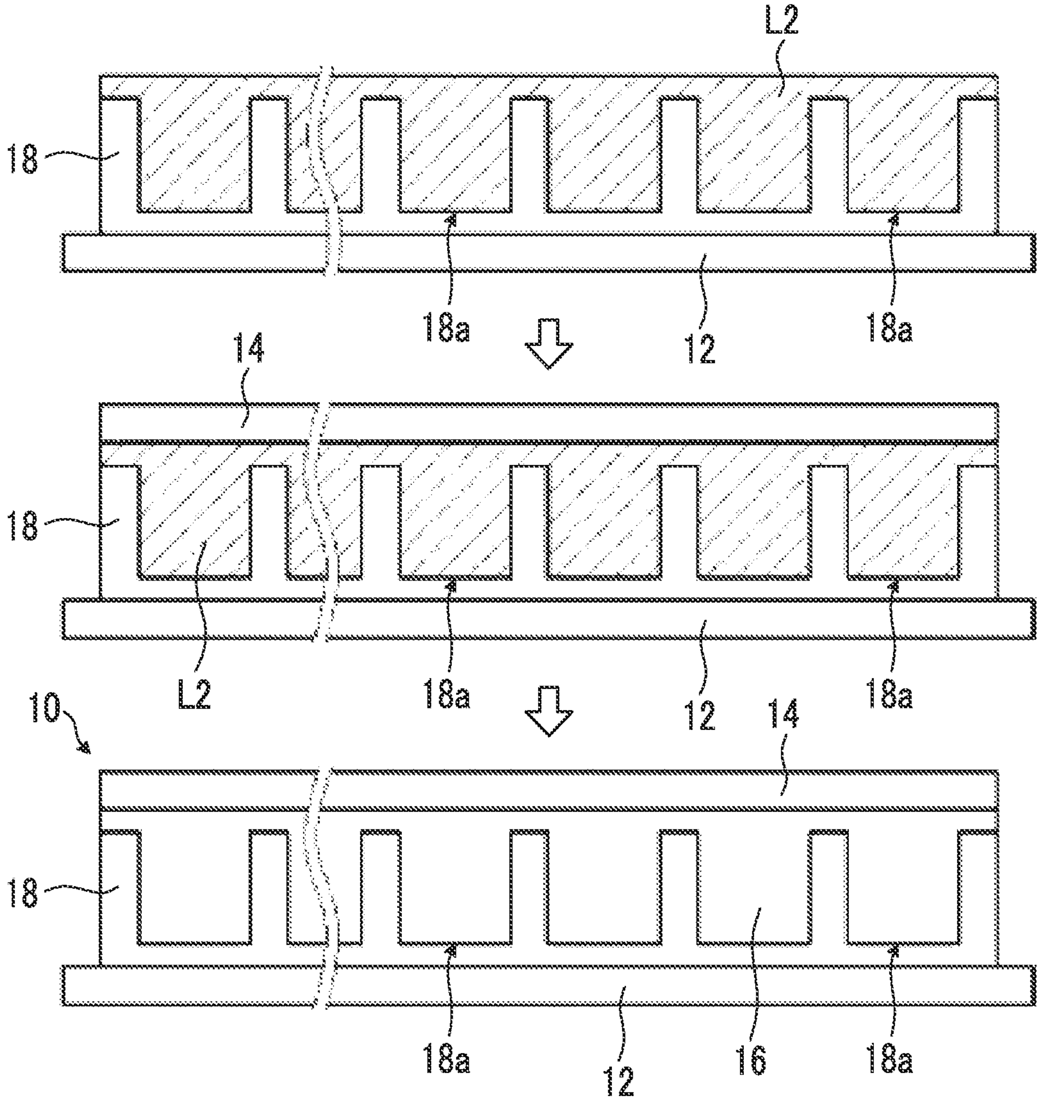
FIG. 12 is a conceptual diagram for showing an example of the method for manufacturing the wavelength conversion member.

After forming the laminate of the first substrate film 12 and the resin layer 18, the concave portion 18*a* is filled with the quantum dot-containing polymerizable composition L2, as shown in the first stage of FIG. 12. At this time, utilizing the surface tension and viscosity of the quantum dot-containing polymerizable composition L2, the concave portion 18*a* is filled with the quantum dot-containing polymerizable composition L2 so that the quantum dot-containing polymerizable composition L2 rises above the upper end of the wall portion of the resin layer 18.

Next, as shown in the second stage of FIG. 12, the second substrate film 14 is laminated to cover and seal the entire surface of the quantum dot-containing polymerizable composition L2. By adjusting the pressing force of the second substrate film 14 at this time, the gap between the upper end of the wall portion of the resin layer 18 and the second substrate film 14 can be adjusted. For example, in a case where the second substrate film 14 is laminated with a laminator, the gap between the upper end of the wall portion of the resin layer 18 and the second substrate film 14 can be adjusted by adjusting the pressure of the laminator.

Then, the quantum dot-containing polymerizable composition L2 is cured by, for example, irradiation with light to form a quantum dot-containing portion, and as shown in the third stage of FIG. 12, the wavelength conversion member 10 is produced in which the wavelength conversion layer 16 having the quantum dot-containing portions and the resin layer 18 is sandwiched between the first substrate film 12 and the second substrate film 14.

Figure 7:
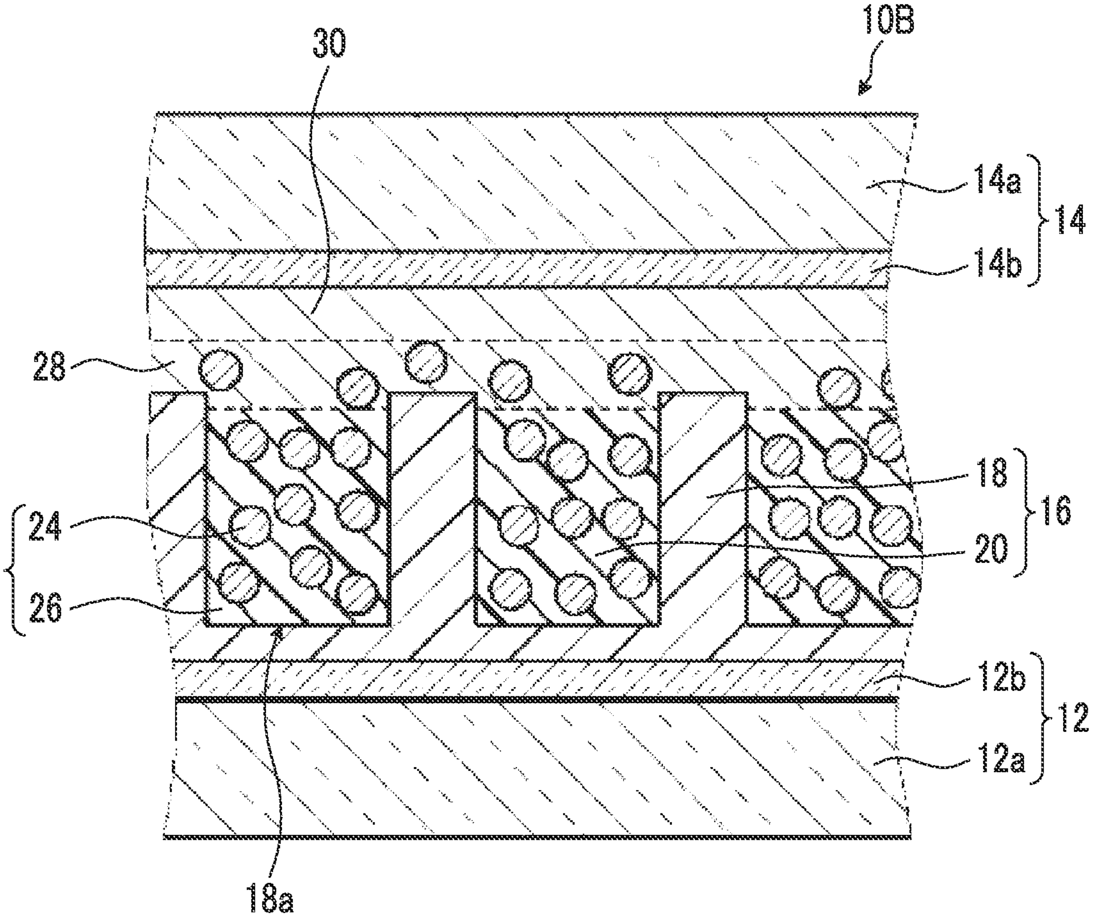
FIG. 7 is a cross-sectional view conceptually showing another example of the wavelength conversion member.
Figure 13:
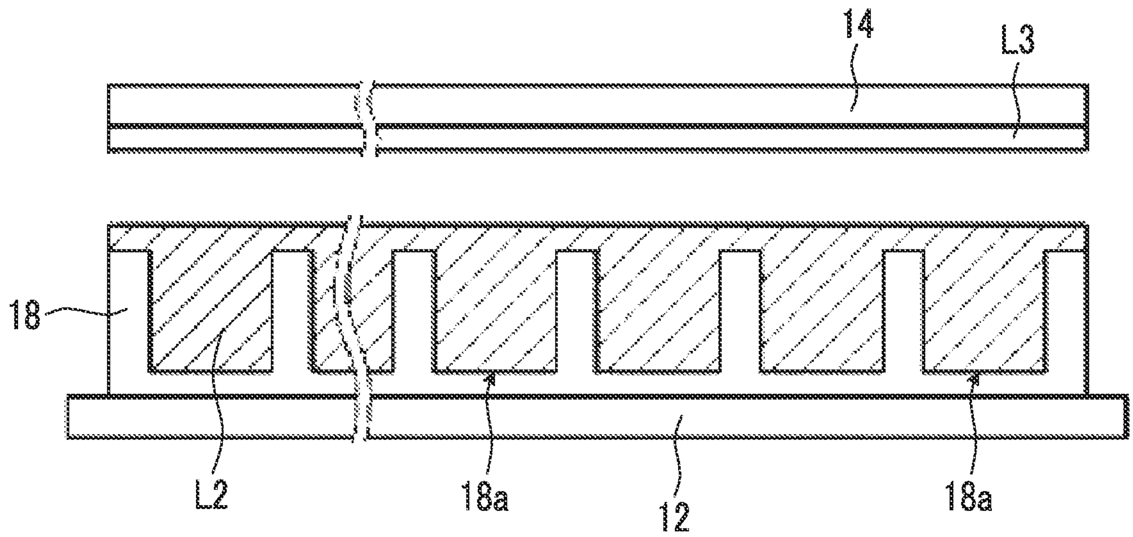
FIG. 13 is a conceptual diagram for showing another example of the method for manufacturing the wavelength conversion member.

In a case where the mixed layer 28 or the impermeable layer 30 is formed as in the wavelength conversion member 10A shown in FIG. 6 and the wavelength conversion member 10B shown in FIG. 7, a coating liquid L3 containing an oxygen-impermeable material is applied onto one surface of the second substrate film 14, as conceptually shown in FIG. 13, prior to lamination of the second substrate film 14 shown in the second stage of FIG. 12.

Then, with the coated surface of the coating liquid L3 facing the quantum dot-containing polymerizable composition L2 and as shown in the second stage of FIG. 12, the second substrate film 14 is laminated to cover and seal the entire surface of the quantum dot-containing polymerizable composition L2. As a result, the quantum dot-containing polymerizable composition L2 and the coating liquid L3 containing an oxygen-impermeable material are mixed.

Then, a wavelength conversion member having the mixed layer 28 or the impermeable layer 30 together with the quantum dot-containing portion can be manufactured by curing the quantum dot-containing polymerizable composition L2 and the coating liquid L3 containing an oxygen-impermeable material.

At this time, as described above, by adjusting the coating thickness of the coating liquid L3 containing an oxygen-impermeable material to the second substrate film 14, it is possible to set whether only the mixed layer 28 is formed or both the mixed layer 28 and the impermeable layer 30 are formed. Specifically, in a case where the coating thickness of the coating liquid L3 containing an oxygen-impermeable material to the second substrate film 14 is thin, only the mixed layer 28 can be formed, and in a case where the coating thickness of the coating liquid L3 containing an oxygen-impermeable material to the second substrate film 14 is thick, both the mixed layer 28 and the impermeable layer 30 can be formed. In addition, the thicker the coating thickness of the coating liquid L3, the thicker the impermeable layer 30 becomes.

In the wavelength conversion layer, the method for forming the concave portion 18*a* of the resin layer 18 is not limited to the method shown in FIG. 11, and various known methods for forming a sheet-like material having concavities and convexities can be used. For example, there is a method in which the composition L1 for forming a resin layer is first applied to the first substrate film 12, the mold M is pressed against the composition L1 for forming a resin layer, and then the composition L1 for forming a resin layer is cured, or a method in which the first substrate film 12 and the mold M are laminated, the composition L1 for forming a resin layer is filled between the first substrate film 12 and the mold M, and then the composition L1 for forming a resin layer is cured. In addition to these methods, a method of forming a planar resin layer and then etching the resin layer to form the resin layer 18 having the concave portion 18*a*, a method of forming the resin layer 18 having the concave portion 18*a* using a printing method such as an ink jet method or a dispenser method, and the like can also be used.

[Backlight Unit]

According to one aspect of the present invention, a backlight unit including the wavelength conversion member and a light source can be provided.

Figure 14:
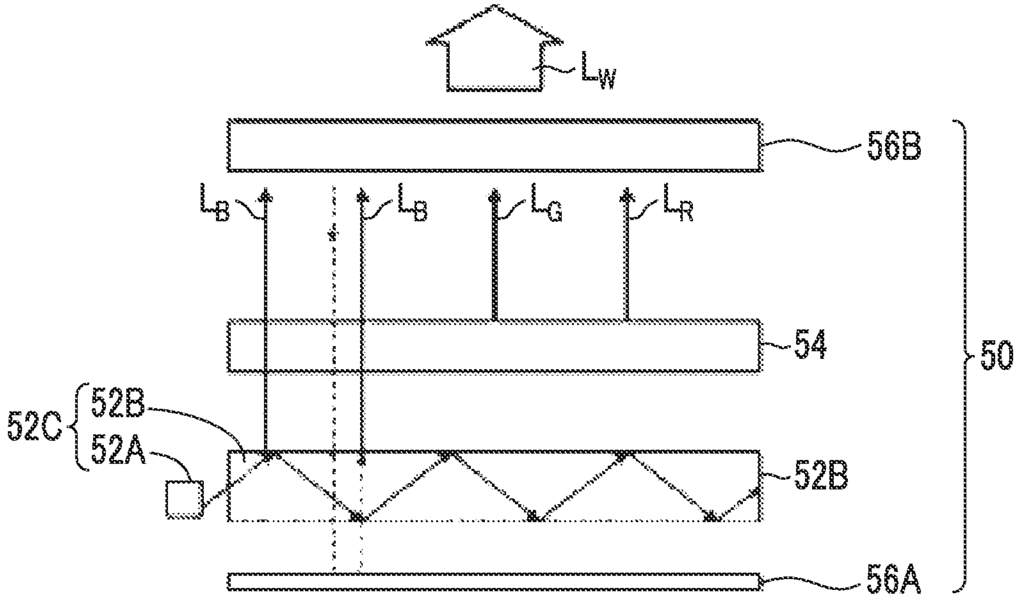
FIG. 14 is a diagram conceptually showing a configuration of an example of a backlight unit.

Hereinafter, an example of the backlight unit will be described with reference to the accompanying drawings. FIG. 14 is a schematic diagram showing a schematic configuration of the backlight unit.

As shown in FIG. 14, a backlight unit 50 includes a planar light source 52C consisting of a light source 52A that emits primary light (blue light $L_B$) and a light guide plate 52B that guides and emits the primary light emitted from the light source 52A, a wavelength conversion member 54 arranged on the planar light source 52C, a reflecting plate 56A arranged opposite to the wavelength conversion member 54 with the planar light source 52C interposed therebetween, and a retroreflective member 56B. In FIG. 14, the reflecting plate 56A, the light guide plate 52B, the wavelength conversion member 54, and the retroreflective member 56B are spaced apart from one another, but in reality these members may be formed in intimate attachment with one another.

The wavelength conversion member 54 emits fluorescence by using at least a part of primary light $L_B$ emitted from the planar light source 52C as excitation light and emits secondary light (green light $L_G$ and red light $L_R$) consisting of the fluorescence and primary light $L_B$ passed through the wavelength conversion member 54. For example, the wavelength conversion member 54 is a wavelength conversion member 10 which is configured such that a wavelength conversion layer 16 containing the quantum dots that emit the green light $L_G$ and the quantum dots that emit the red light $L_R$ upon irradiation with the blue light $L_B$ is sandwiched between a first substrate film 12 and a second substrate film 14.

In FIG. 14, $L_B$, $L_G$, and $L_R$ emitted from the wavelength conversion member 54 are incident on the retroreflective member 56B, and each incident light repeats reflection between the retroreflective member 56B and the reflecting plate 56A and can pass through the wavelength conversion member 54 many times. As a result, in the wavelength conversion member 54, a sufficient amount of excitation light (blue light $L_B$) is absorbed by quantum dots 24 in the wavelength conversion layer 16 and a sufficient amount of fluorescence ($L_G$ and $L_R$) is emitted, and white light $L_W$ is realized from the retroreflective member 56B and is emitted.

From the viewpoint of realizing high brightness and high color reproducibility, it is preferable to use a backlight unit having a multi-wavelength light source as the backlight unit 50. For example, preferred is a backlight unit which emits blue light having a light emission center wavelength in a wavelength range of 430 to 480 nm and having a luminescence intensity peak with a half-width of 100 nm or less, green light having a light emission center wavelength in a wavelength range of 500 to 600 nm and having a luminescence intensity peak with a half-width of 100 nm or less, and red light having a light emission center wavelength in a wavelength range of 600 to 680 nm and having a luminescence intensity peak with a half-width of 100 nm or less.

From the viewpoint of further improving brightness and color reproducibility, the wavelength range of the blue light emitted from the backlight unit 50 is more preferably 440 to 460 nm.

From the same viewpoint, the wavelength range of the green light emitted from the backlight unit 50 is preferably 520 to 560 nm and more preferably 520 to 545 nm.

In addition, from the same viewpoint, the wavelength range of the red light emitted from the backlight unit 50 is more preferably 610 to 640 nm.

In addition, from the same viewpoint, all the half-widths of the respective luminescence intensities of the blue light, the green light, and the red light emitted from the backlight unit 50 are preferably 80 nm or less, more preferably 50 nm or less, still more preferably 40 nm or less, and particularly preferably 30 nm or less. Above all, the half-width of the luminescence intensity of the blue light is particularly preferably 25 nm or less.

The light source 52A can be, for example, a blue light emitting diode that emits blue light having a light emission center wavelength in a wavelength range of 430 to 480 nm. Alternatively, an ultraviolet light emitting diode that emits ultraviolet light may be used. As the light source 52A, a laser light source or the like may be used in addition to light emitting diodes. In a case where a light source that emits ultraviolet light is provided, the wavelength conversion layer 16 of the wavelength conversion member 54 may contain quantum dots that emit blue light, quantum dots that emit green light, and quantum dots that emit red light, upon irradiation with ultraviolet light.

As shown in FIG. 14, the planar light source 52C may be a planar light source consisting of the light source 52A and the light guide plate 52B that guides and emits the primary light emitted from the light source 52A, or may be a planar light source in which the light source 52A and the wavelength conversion member 54 are arranged parallel to each other on the plane, and a diffusion plate is provided in place of the light guide plate 52B. The former planar light source is generally referred to as an edge light mode, and the latter planar light source is generally referred to as a direct backlight mode. In the above description, a case where a planar light source is used as the light source has been described as an example. In this regard, a light source other than the planar light source can also be used as the light source.

<Configuration of Backlight Unit>

In FIG. 14, an edge light mode backlight unit including a light guide plate, a reflecting plate, and the like as constituent members has been illustrated as the configuration of the backlight unit. In this regard, the configuration of the backlight unit may be a direct backlight mode. A known light guide plate can be used as the light guide plate.

In addition, the reflecting plate 56A is not particularly limited and a known reflecting plate can be used, for which reference can be made to JP3416302B, JP3363565B, JP4091978B, JP3448626B, and the like.

The retroreflective member 56B may be composed of a known diffusion plate, diffusion sheet, prism sheet (for example, BEF series manufactured by Sumitomo 3M Limited), light guide, or the like. For the configuration of the retroreflective member 56B, reference can be made to JP3416302B, JP3363565B, JP4091978B, JP3448626B, and the like.

[Liquid Crystal Display Device]

According to one aspect of the present invention, a liquid crystal display device including the backlight unit and a liquid crystal cell can be provided.

Figure 15:
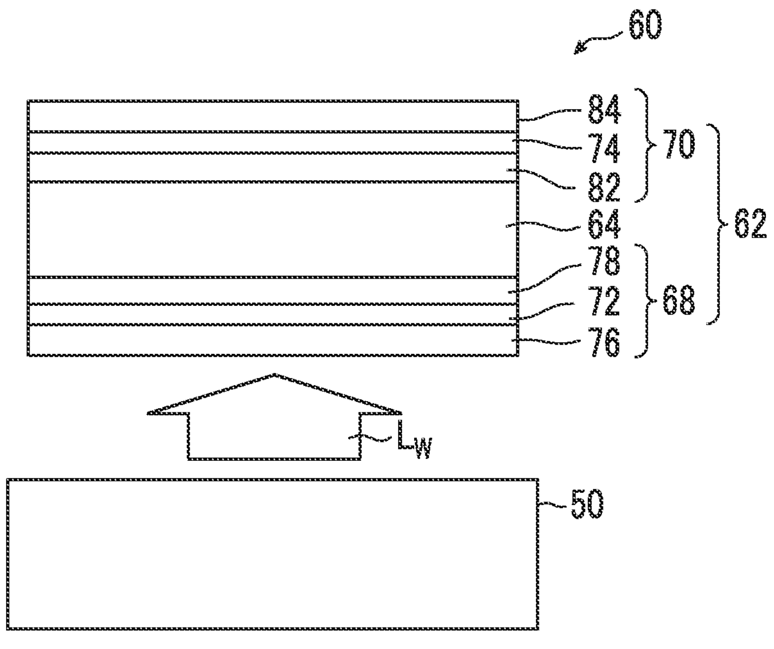
FIG. 15 is a diagram conceptually showing a configuration of an example of a liquid crystal display device.

Hereinafter, an example of the liquid crystal display device will be described with reference to the accompanying drawings. FIG. 15 is a schematic diagram showing a schematic configuration of the liquid crystal display device.

As shown in FIG. 15, a liquid crystal display device 60 includes a backlight unit 50 and a liquid crystal cell unit 62 arranged opposite to the retroreflective member side of the backlight unit.

As shown in FIG. 15, the liquid crystal cell unit 62 has a configuration in which a liquid crystal cell 64 is sandwiched between a polarizing plate 68 and a polarizing plate 70, in which the polarizing plate 68 and the polarizing plate 70 are each configured such that both main surfaces of each of polarizers 72 and 74 are protected by polarizing plate protective films 76 and 78, and polarizing plate protective films 82 and 84, respectively.

The liquid crystal cell 64, polarizing plates 68 and 70, and constituent elements thereof constituting the liquid crystal display device 60 are not particularly limited, and products produced by a known method, commercially available products, and the like can be used. In addition, it is of course possible to provide a known interlayer such as an adhesive layer between the layers.

A driving mode of the liquid crystal cell 64 is not particularly limited, and various modes such as a twisted nematic (TN) mode, a super twisted nematic (STN) mode, a vertical alignment (VA) mode, an in-plane switching (IPS) mode, and an optically compensated bend cell (OCB) mode can be used. The liquid crystal cell is preferably any of VA mode, OCB mode, IPS mode, or TN mode. However, the liquid crystal cell is not limited thereto. Examples of a configuration of the liquid crystal display device in the VA mode include a configuration shown in FIG. 2 of JP2008-262161A. Here, a specific configuration of the liquid crystal display device is not particularly limited, and a known configuration can be adopted.

The liquid crystal display device 60 can further have an optical compensation member for carrying out optical compensation, or an accompanying functional layer such as an adhesive layer, if necessary. In addition, in the liquid crystal display device 60, a surface layer such as a forward scattering layer, a primer layer, an antistatic layer, or an undercoat layer may be arranged together with (or instead of) a color filter substrate, a thin layer transistor substrate, a lens film, a diffusion sheet, a hard coat layer, an antireflection layer, a low reflective layer, an antiglare layer, and the like.

The polarizing plate 68 on the backlight unit 50 side may have a phase difference film as the polarizing plate protective film 78 on the liquid crystal cell 64 side. A known cellulose acylate film or the like can be used as such a phase difference film.

EXAMPLES

Hereinafter, the present invention will be described in more detail with reference to Examples. The materials, amounts used, ratios, treatment details, treatment procedures, and the like shown in the Examples below can be changed as appropriate without departing from the spirit of the present invention. Accordingly, the scope of the present invention is not limited to the following specific examples. Unless otherwise specified, "%" described hereinafter indicates "% by mass".

"Room temperature" described hereinafter is 25° C.

In the following description, "PGME" is an abbreviation for "propylene glycol monomethyl ether", and is specifically 1-methoxy-2-propanol.

Example 1

Synthesis of Compound (P-1)

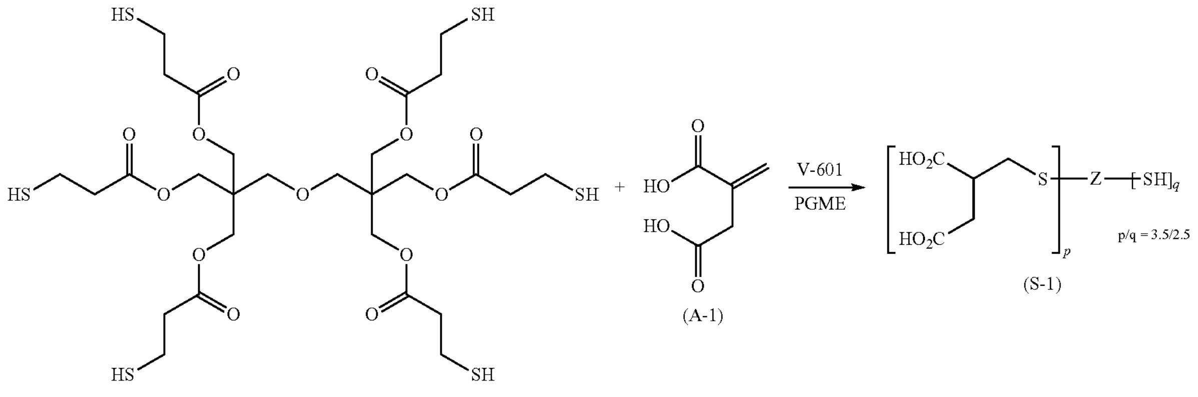

(Z-1) (A-1) (S-1)

Z =

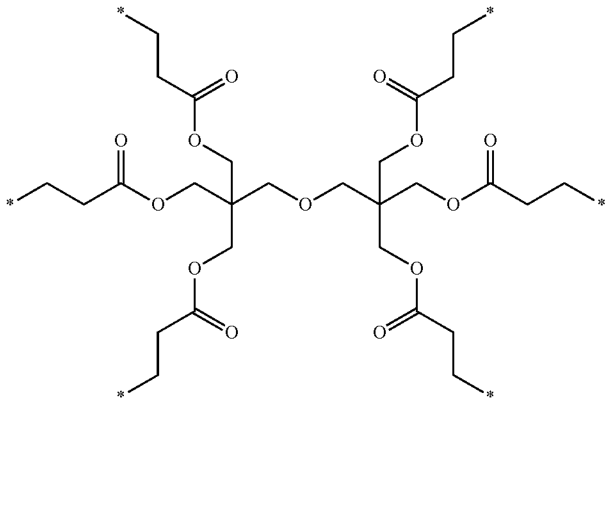

A compound (P-1) was synthesized based on the synthesis methods described in paragraphs [0266] to [0348] of JP2007-277514A (paragraphs [0289] to [0429] in the corresponding US2010/233595A). Specifically, it is as follows.

25.29 g of dipentaerythritol hexakis(3-mercaptopropionate) [(Z-1); manufactured by FUJIFILM Wako Pure Chemical Corporation] and 14.71 g of itaconic acid (A-1) were dissolved in 93.33 g of 1-methoxy-2-propanol, and heated to a liquid temperature of 90° C. under a nitrogen stream. The feed ratio at this time was 1.0:3.5 in terms of molar ratio.

65 mg of dimethyl 2,2'-azobis(2-methylpropionate) [V-60i, manufactured by FUJIFILM Wako Pure Chemical Corporation] was added thereto and heated for 2 hours. 65 mg of V-60i was further added thereto, followed by reaction at a liquid temperature of 90° C. for 2 hours under a nitrogen stream. By cooling to room temperature, a 300% by mass solution of a mercaptan compound (S-1) in which Compound (A-1) was added to a part of sulfur atoms of Compound (Z-1) was obtained.

In the structure shown below, in a case where two n's are included, n's are the same as or different from each other.

In Compound (P-1), the branched partial structure content is 90% by mass.

<Evaluation of Solubility>

The following components were injected into a tank and mixed to prepare a liquid mixture A.

Tricyclodecane dimethanol diacrylate (product name A-DCP (manufactured by Shin-Nakamura Chemical Co., Ltd.)): 45 parts by mass Isobornyl acrylate (product name IBXA, manufactured by Osaka Organic Chemical Industry Ltd.)): 30 parts by mass Trimethylolpropane tris(3-mercaptopropionate) (product name TMMP (manufactured by SC Organic Chemical Co., Ltd.)): 20 parts by mass β-Carboxyethyl acrylate (product name β-CEA (manufactured by Daicel-Allnex Ltd.)): 5 parts by mass While stirring the liquid mixture A (liquid temperature: 25° C.) prepared as described above, a predetermined amount of Compound (P-1) was added to the liquid mixture

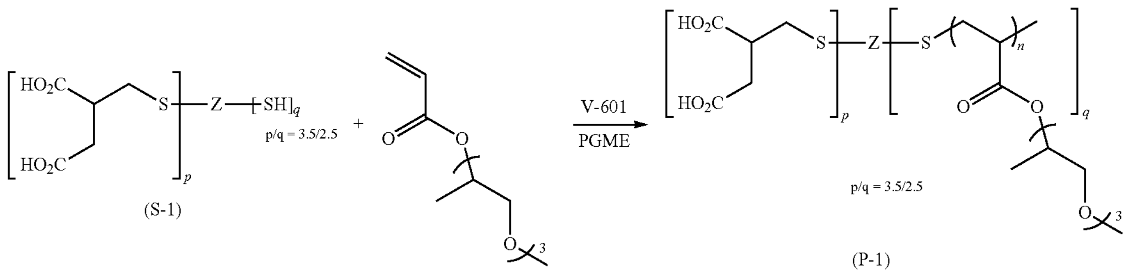

(S-1) (M-1) (P-1)

Z =
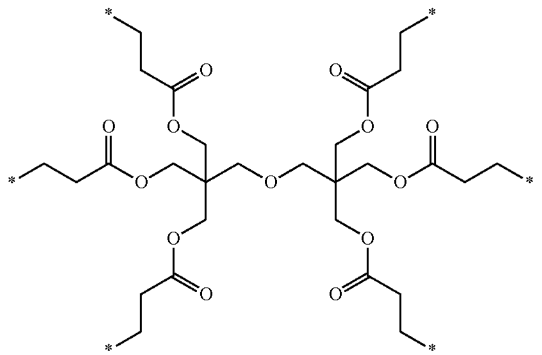

Z =
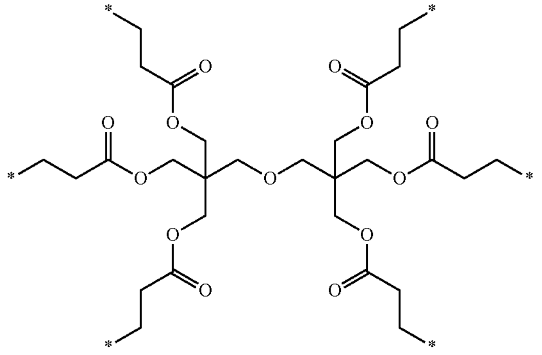

16.71 g of 1-methoxy-2-propanol was heated to 80° C. under a nitrogen stream. A solution obtained by dissolving 8.69 g of 30% by mass solution of the mercaptan compound (S-1), 27.39 g of methoxytripropylene glycol acrylate (M-1), and 73 mg of dimethyl 2,2'-azobis(2-methylpropionate) [V-601, manufactured by FUJIFILM Wako Pure Chemical Corporation] in 27.35 g of 1-methoxy-2-propanol was added dropwise thereto for 2.5 hours, and the mixture was heated at a liquid temperature of 80° C. for 2.5 hours. 73 mg of V-601 was further added thereto, followed by reaction at a liquid temperature of 90° C. for 2 hours under a nitrogen stream. After cooling to room temperature, 1-methoxy-2-propanol was distilled off by an evaporator to obtain Compound (P-1) (weight-average molecular weight: see Table 1, acid value: 28 mgKOH/g). In the structure of Compound (P-1), n is the number of repeating units, and is a value that can be calculated from the weight-average molecular weight and the structure. The same also applies to n described later.

A, and in a case where complete dissolution was visually confirmed, the same compound was further added repeatedly.

The concentration of the same compound at the maximum addition amount at which undissolved residues were not visually confirmed was calculated, and the solubility was evaluated based on the calculated concentration according to the following evaluation standards.

(Evaluation Standard)

A: an amount of 20% by mass or more was dissolved with respect to 100% by mass of the liquid mixture A.

B: an amount of 5% by mass or more and less than 20% was dissolved with respect to 100% by mass of the liquid mixture A.

C: an amount of less than 5% by mass was dissolved or insoluble, with respect to 100% by mass of the liquid mixture A.

<Evaluation of Dispersibility 1>

The following components were injected into a tank and mixed to prepare a liquid mixture B containing inorganic particles.

Compound (P-1): 0.1 parts by mass or 1 part by mass

Inorganic particles (alumina particles, product name Sumicorundum AA-1.5 (manufactured by SUMITOMO CHEMICAL COMPANY, LIMITED), average particle diameter: 1.50 μm): 7.5 parts by mass The liquid mixture A: 92.5 parts by mass The sedimentation velocity of the inorganic particles in the liquid mixture B prepared as described above was measured by the following method.

(Measuring Method of Sedimentation Velocity)

The liquid mixture B (30 g) was put into a 30 mL vial and stirred, and then the vial was allowed to stand in a horizontal place. At this time, it was visually confirmed that the inorganic particles (alumina particles) were uniformly dispersed in the entire liquid. After standing for 24 hours, the inorganic particles (alumina particles) were sedimented, and the presence of a supernatant portion having no inorganic particles was visually confirmed. The thickness of the supernatant portion after standing for 24 hours was measured with a ruler, and this was taken as the sedimentation velocity (unit: mm/day) of the inorganic particles.

The dispersibility was evaluated based on the following evaluation standards. The dispersibility was evaluated as OK in a case where the sedimentation velocity of the inorganic particles is less than 5 mm/day, and as NG in a case where 5 mm/day or more.

The evaluation result for the liquid mixture B prepared by the method described above except that Compound (P-1) was not added was C.

(Evaluation Standard)

A: dispersibility OK in both cases where the amount of Compound (P-1) was 0.1 parts by mass and 1 part by mass B: dispersibility NG in either cases where the amount of Compound (P-1) was 0.1 parts by mass or 1 part by mass C: dispersibility NG in both cases where the amount of Compound (P-1) was 0.1 parts by mass and 1 part by mass <Evaluation of Dispersibility 2>

The liquid mixture C containing quantum dots was prepared by putting the following components into a tank and mixing them.

In the preparation of the liquid mixture C, the toluene dispersion liquid of quantum dots 1 (emission maximum: 520 nm) and the toluene dispersion liquid of quantum dots 2 (emission maximum: 630 nm) were mixed and used in such an amount that the total content of quantum dots in the mixture was 2.0%.

Quantum dots 1 and 2 are the following semiconductor nanoparticles having a core-shell structure (core: InP/shell: ZnS).

Quantum dots 1: INP 530-10 manufactured by NN-Labs, LLC (average particle diameter: 5 to 7 nm)

Quantum dots 2: INP 620-10 manufactured by NN-Labs, LLC (average particle diameter: 7.5 to 9.5 nm)

Liquid Mixture C

Toluene dispersion liquid of quantum dots: 2.0 parts by mass in terms of quantum dots Tricyclodecane dimethanol diacrylate (product name A-DCP (manufactured by Shin-Nakamura Chemical Co., Ltd.)): 35.9 parts by mass Isobornyl acrylate (product name IBXA, manufactured by Osaka Organic Chemical Industry Ltd.)): 31.3 parts by mass Trimethylolpropane tris(3-mercaptopropionate) (product name TMMP (manufactured by SC Organic Chemical Co., Ltd.)): 18.5 parts by mass β-Carboxyethyl acrylate (product name j-CEA (manufactured by Daicel-Allnex Ltd.)): 4.63 parts by mass Pyrogallol (product name Pyrogallol (manufactured by Tokyo Chemical Industry Co., Ltd.): 0.01 parts by mass Photopolymerization initiator (product name IRGACURE TPO (manufactured by BASF SE)): 0.16 parts by mass The following components were injected into a tank and mixed to prepare a liquid mixture D containing inorganic particles.

Compound (P-1): 0.1 parts by mass or 1 part by mass

Inorganic particles (alumina particles, product name Sumicorundum AA-1.5 (manufactured by SUMITOMO CHEMICAL COMPANY, LIMITED), average particle diameter: 1.50 μm): 7.5 parts by mass The liquid mixture C: 92.5 parts by mass The sedimentation velocity of the inorganic particles in the liquid mixture D prepared as described above was measured by the following method.

(Measuring Method of Sedimentation Velocity)

The liquid mixture D (30 g) was put into a 30 mL vial and stirred, and then the vial was allowed to stand in a horizontal place. At this time, it was visually confirmed that the inorganic particles (alumina particles) were uniformly dispersed in the entire liquid. After standing for 24 hours, the inorganic particles (alumina particles) were sedimented, and the presence of a supernatant portion having no inorganic particles (alumina particles) was visually confirmed. The thickness of the supernatant portion after standing for 24 hours was measured with a ruler, and this was taken as the sedimentation velocity (unit: mm/day) of the inorganic particles. The difference between the alumina particles and the quantum dots can be distinguished by the color of the particles (alumina particles: white, quantum dots: brown).

The dispersibility was evaluated based on the following evaluation standards. The dispersibility was evaluated as OK in a case where the sedimentation velocity of the inorganic particles is less than 5 mm/day, and as NG in a case where 5 mm/day or more.

The evaluation result for the liquid mixture D prepared by the method described above except that Compound (P-1) was not added was C.

(Evaluation Standard)

A: dispersibility OK in both cases where the amount of Compound (P-1) was 0.1 parts by mass and 1 part by mass B: dispersibility NG in either cases where the amount of Compound (P-1) was 0.1 parts by mass or 1 part by mass C: dispersibility NG in both cases where the amount of Compound (P-1) was 0.1 parts by mass and 1 part by mass <Production of Wavelength Conversion Member>

(Production of Barrier Film)

As the first substrate film and the second substrate film, a barrier film in which an inorganic layer and an organic layer were formed on a support film consisting of polyethylene terephthalate (PET) was produced as follows.

A PET film (COSMOSHINE A4300, manufactured by Toyobo Co., Ltd., thickness: 23 μm) was used as the support film, and an organic layer and an inorganic layer were sequentially formed on one side of the support film by the following procedure.

Formation of underlying organic layer Trimethylolpropane triacrylate (TMPTA, manufactured by Daicel-Allnex Ltd.) and a photopolymerization initiator (ESACURE KTO46, manufactured by Lamberti S.p.A.) were prepared, weighed to have a mass ratio of 95:5, and dissolved in methyl ethyl ketone to prepare a coating liquid having a concentration of solid contents of 15% for forming an underlying organic layer.

This coating liquid was applied onto the support film (PET film) by roll-to-roll using a die coater, followed by passing through a drying zone at a temperature of 50° C. for 3 minutes. Then, the coating liquid was cured by irradiation with ultraviolet rays (integrated irradiation amount of about 600 mJ/$cm^2$) in a nitrogen atmosphere, and the film was wound up. The thickness of the organic layer formed on the support film was 1 μm.

Formation of Inorganic Layer

Next, a silicon nitride film was formed as an inorganic layer on the surface of the underlying organic layer by using a chemical vapor deposition (CVD) apparatus for forming a film by roll-to-roll.

Silane gas (flow rate: 160 standard cubic centimeter per minute (sccm)), ammonia gas (flow rate: 370 sccm), hydrogen gas (flow rate: 590 sccm), and nitrogen gas (flow rate: 240 sccm) were used as source gases. A high frequency power source having a frequency of 13.56 MHz was used as a power source. The film forming pressure was 40 Pa (Pascal), and the ultimate film thickness was 50 nm.

Formation of Protective Organic Layer

Further, a protective organic layer was laminated on the surface of the inorganic layer. 5.0 parts by mass of a photopolymerization initiator (IRGACURE 184, manufactured by BASF SE) was weighed with respect to 95.0 parts by mass of a urethane skeleton acrylate polymer (ACRIT 8BR930, manufactured by Taisei Fine Chemical Co., Ltd.), and these were dissolved in methyl ethyl ketone to prepare a coating liquid having a concentration of solid contents of 15% for forming a protective organic layer.

This coating liquid was applied directly onto the surface of the inorganic layer by roll-to-roll using a die coater, followed by passing through a drying zone at a temperature of 100° C. for 3 minutes. Then, while being wound around a heat roll heated to a surface temperature of 60° C. and transported, the coating liquid was cured by irradiation with ultraviolet rays (integrated irradiation amount of about 600 mJ/$cm^2$) and the film was wound up. The thickness of the protective organic layer formed on the support film was 0.1 μm.

In this manner, a barrier film with a protective organic layer was produced as the first substrate film and the second substrate film.

In a case where the oxygen permeability of this barrier film was measured using OX-TRAN 2/20 (manufactured by MOCON, Inc.) under the conditions of a measurement temperature of 23° C. and a relative humidity of 90%, the oxygen permeability was $4.0\times10^{-3}$ cc/($m^2$·day·atm) or less.

(Formation of Resin Layer)

Preparation of Composition for Forming Resin Layer

A composition for forming a resin layer was prepared by putting the following components into a tank and mixing them.

Triallyl isocyanurate (TAIC manufactured by Mitsubishi Chemical Corporation): 27.8 parts by mass Pentaerythritol tetrakis(3-mercaptopropionate) (PEMP manufactured by SC Organic Chemical Co., Ltd.): 41.8 parts by mass Light scattering particles (Advanced Alumina AA-1.5 manufactured by SUMITOMO CHEMICAL COMPANY, LIMITED): 30.0 parts by mass Photopolymerization initiator (IRGACURE TPO manufactured by BASF SE): 0.35 parts by mass Pyrogallol (Pyrogallol manufactured by Tokyo Chemical Industry Co., Ltd.): 0.035 parts by mass.

Formation of Resin Layer

As a mold for forming the resin layer, a mold having a convex portion corresponding to the concave portion of the resin layer and a concave portion corresponding to the wall portion of the resin layer was prepared.

Here, the concave portion of the resin layer (convex portion of the mold) was of a regular hexagonal shape with a side of 125 μm and had a honeycomb pattern. The depth h of the concave portion (height of the convex portion of the mold) was 40 μm, and the distance between the concave portions (distance between the convex portions of the mold (distance t between the quantum dot-containing portions, that is, the thickness of the wall portion)) was 50 μm (See FIG. 5). In the concave portion of the mold M which serves as the wall portion, a corner portion of the bottom was made to have a curved surface having a curvature radius of 10 μm.

The composition for forming a resin layer prepared above was filled to completely fill the concave portions of the mold. Next, the first substrate film (barrier film) was laminated on the mold to completely cover the composition for forming a resin layer, and the composition for forming a resin layer was photocured in a state of being in pressure contact at a pressure of 0.5 MPa with a laminator. The photocuring of the composition for forming a resin layer was carried out by irradiation with ultraviolet rays at a dose of 500 mJ/$cm^2$ from the first substrate film side using a 200 W/cm air-cooling metal halide lamp (manufactured by Eye Graphics Co., Ltd.). Then, the mold was removed to produce a laminate in which the resin layer was laminated on the first substrate film (see FIG. 11).

Using the composition for forming a resin layer, a film having a thickness of 50 μm was formed under exactly the same conditions. That is, this film corresponds to a wall portion having a thickness of 50 μm in the resin layer. As a result of measuring the oxygen permeability of this film in the same manner as before, the oxygen permeability was 1 cc/($m^2$·day·atm). In addition, as a result of measuring the elastic modulus of the resin layer after curing in accordance with JIS K 7161, the elastic modulus was 2.5 GPa.

(Production of Wavelength Conversion Member)

Preparation of Quantum Dot-Containing Polymerizable Composition

The quantum dot-containing polymerizable composition was prepared by putting the following components into a tank and mixing them.

Toluene dispersion liquid of quantum dots described in the column of evaluation of dispersibility 2: 2.0 parts by mass in terms of quantum dots Tricyclodecane dimethanol diacrylate (product name A-DCP (manufactured by Shin-Nakamura Chemical Co., Ltd.)): 35.9 parts by mass Isobornyl acrylate (product name IBXA, manufactured by Osaka Organic Chemical Industry Ltd.)): 31.3 parts by mass Trimethylolpropane tris(3-mercaptopropionate) (product name TMMP (manufactured by SC Organic Chemical Co., Ltd.)): 18.5 parts by mass β-Carboxyethyl acrylate (product name j-CEA (manufactured by Daicel-Allnex Ltd.)): 4.63 parts by mass Pyrogallol (product name Pyrogallol (manufactured by Tokyo Chemical Industry Co., Ltd.): 0.01 parts by mass Photopolymerization initiator (product name IRGACURE TPO (manufactured by BASF SE)): 0.16 parts by mass Compound (P-1): 1 part by mass Inorganic particles (alumina particles, product name Sumicorundum AA-1.5 (manufactured by SUMITOMO CHEMICAL COMPANY, LIMITED), average particle diameter: 1.50 μm): 7.5 parts by mass Production of Wavelength Conversion Member The quantum dot-containing polymerizable composition was filled in the concave portions of the resin layer to completely fill the concave portions of the resin layer of the laminate of the first substrate film and the resin layer produced above. Next, the second substrate film (barrier film) was laminated on the resin layer to completely cover the quantum dot-containing polymerizable composition, and the quantum dot-containing polymerizable composition was photocured, in a state of being in pressure contact at a pressure of 0.3 MPa with a laminator, to form a wavelength conversion layer in which quantum dot-containing portions (cured product obtained by curing the quantum dot-containing polymerizable composition) were formed in the concave portions discretely formed in the resin layer, thus producing a wavelength conversion member (see FIG. 12). The photocuring of the quantum dot-containing polymerizable composition was carried out by irradiation with ultraviolet rays at a dose of 500 mJ/cm$^2$ from the first substrate film side using a 200 W/cm air-cooling metal halide lamp (manufactured by Eye Graphics Co., Ltd.).

The produced wavelength conversion member was cut with a microtome, and the cross section of the section was observed with SEM. As a result, this wavelength conversion member had a gap of 0.5 μm between the upper end of the wall portion of the resin layer and the second substrate film. In addition, the cross section was irradiated with excitation light having a wavelength of 405 nm, and the distribution of luminescent particles in the cross section was observed with a confocal laser microscope (TCS SP5, manufactured by Leica Camera AG) using an objective lens having a magnification of 50 times. As a result, it was confirmed for the wavelength conversion member that a layer having a thickness of 0.5 μm and containing quantum dots (a layer containing quantum dots) similar to the quantum dot-containing portion formed in the concave portion of the resin layer was formed between the upper end of the wall portion of the resin layer and the second substrate film.

In addition, as a reference wavelength conversion member, a wavelength conversion member was produced by the above-described method except that Compound (P-1) was not added to the quantum dot-containing polymerizable composition.

<Evaluation of Brightness of Wavelength Conversion Member>

A commercially available tablet terminal (Kindle Fire HDX 7, manufactured by Amazon) equipped with a blue light source in a backlight unit was disassembled, and the backlight unit was taken out. Instead of Quantum Dot Enhancement Film (QDEF), the wavelength conversion film incorporated in the backlight unit, a wavelength conversion member produced as described above was cut out into a rectangle and incorporated into the backlight unit. In this manner, a liquid crystal display device was produced.

The produced liquid crystal display device was turned on so that the entire surface was displayed in white, the brightness was measured by a brightness meter (SR3, manufactured by Topcon Corporation) installed at a position of 520 mm in a direction perpendicular to the surface of a light guide plate, and the brightness (relative brightness) was obtained as a relative value with respect to the brightness measured using a reference liquid crystal display device described below.

A reference liquid crystal display device was produced using the above-described method, except that the above-described reference wavelength conversion member was used. The brightness of the reference liquid crystal display device was measured using the above-described method.

Based on the relative brightness obtained as described above, the brightness was evaluated according to the following evaluation standards. In a case where the evaluation result is A or B, it can be said that the wavelength conversion member is capable of emitting light with high brightness.

(Evaluation Standard)

A: relative brightness >100%

B: 97%≤relative brightness≤100%

C: relative brightness<97%

Example 2

Various evaluations were performed by the method described in Example 1, except that Compound (P-2) synthesized by the method described below was used.

Synthesis of Compound (P-2)

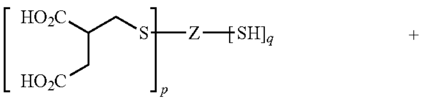

(S-1)
p/q = 3.5/2.5

Z =

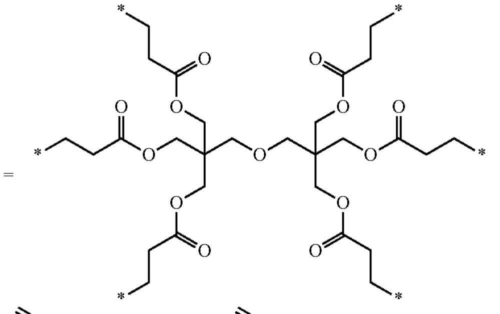

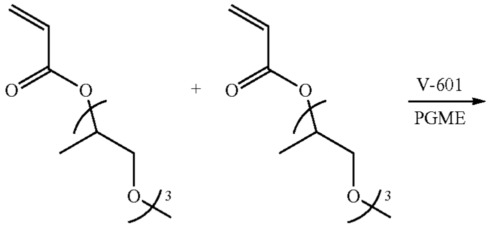

(M-1) (M-2)

-continued

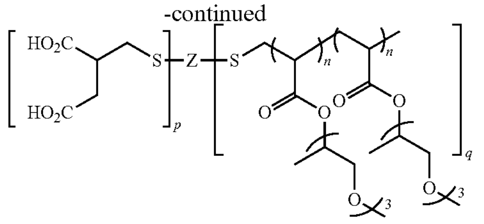

(P-2)
p/q = 3.5/2.5

Z =

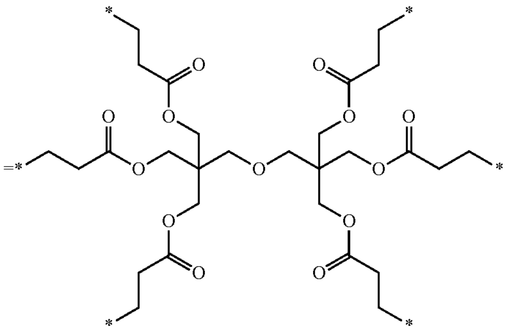

8.36 g of 1-methoxy-2-propanol was heated to a liquid temperature of 80° C. under a nitrogen stream. A solution obtained by dissolving 4.72 g of 30% by mass solution of the mercaptan compound (S-1), 10.6 g of methoxytripropylene glycol acrylate (M-1), 3.03 g of methoxytriethylene glycol acrylate (M-2), and 40 mg of dimethyl 2,2'-azobis(2-methylpropionate) [V-601, manufactured by FUJIFILM Wako Pure Chemical Corporation] in 13.41 g of 1-methoxy-2-propanol was added dropwise thereto for 2.5 hours, and the mixture was heated at a liquid temperature of 80° C. for 2.5 hours. 40 mg of V-601 was further added thereto, followed by reaction at a liquid temperature of 90° C. for 2 hours under a nitrogen stream. After cooling to room temperature, 1-methoxy-2-propanol was distilled off by an evaporator to obtain Compound (P-2) (weight-average molecular weight: see Table 1, acid value: 30 mgKOH/g).

In Compound (P-2), the branched partial structure content is 70% by mass.

Example 3

Various evaluations were performed by the method described in Example 1, except that Compound (P-3) synthesized by the method described below was used.

Synthesis of Compound (P-3)

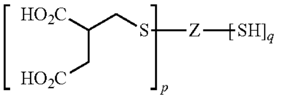

+

(S-1)
p/q = 3.5/2.5

Z =

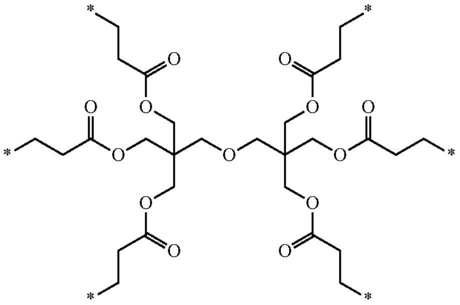

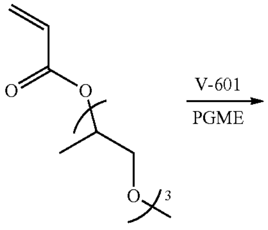

(M-1)

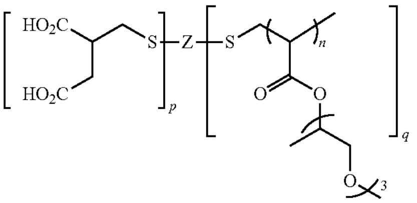

(P-3)
p/q = 3.5/2.5

Z =

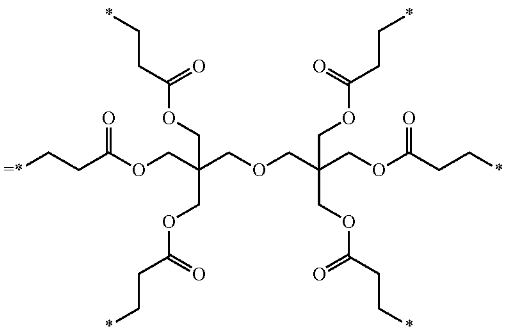

8.36 g of 1-methoxy-2-propanol was heated to a liquid temperature of 80° C. under a nitrogen stream. A solution obtained by dissolving 2.03 g of 30% by mass solution of the mercaptan compound (S-1), 14.39 g of methoxytripropylene glycol acrylate (M-1), 38 mg of dimethyl 2,2'-azobis(2-methylpropionate) [V-601, manufactured by FUJIFILM Wako Pure Chemical Corporation] in 15.29 g of 1-methoxy-2-propanol was added dropwise thereto for 2.5 hours, and the mixture was heated at a liquid temperature of 80° C. for 2.5 hours. 38 mg of V-601 was further added thereto, followed by reaction at a liquid temperature of 90° C. for 2 hours under a nitrogen stream. After cooling to room temperature, 1-methoxy-2-propanol was distilled off by an evaporator to obtain Compound (P-3) (weight-average molecular weight: see Table 1, acid value: 13 mgKOH/g).

In Compound (P-3), the branched partial structure content is 90% by mass.

Example 4

Various evaluations were performed by the method described in Example 1, except that Compound (P-4) synthesized by the method described below was used.

Synthesis of Compound (P-4)

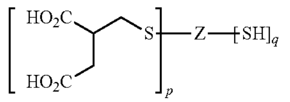

+

(S-1)
p/q = 3.5/2.5

Z =

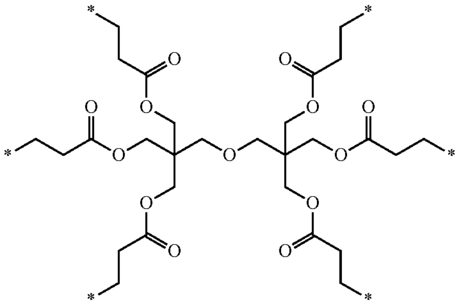

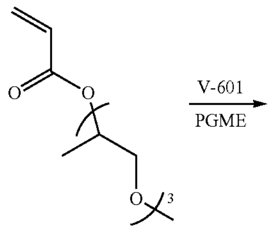

(M-1)

-continued

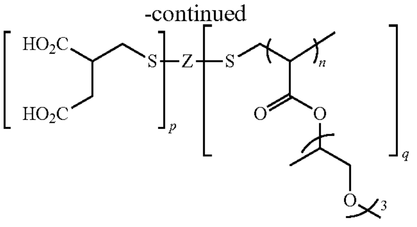

(P-4)
p/q = 3.5/2.5

Z =

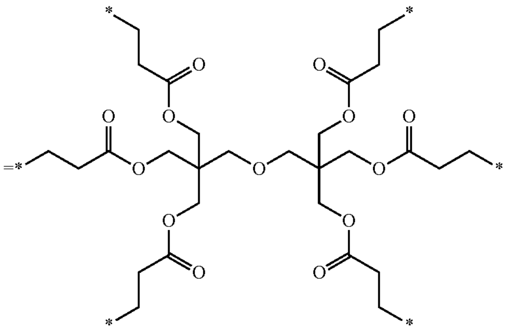

8.36 g of 1-methoxy-2-propanol was heated to a liquid temperature of 80° C. under a nitrogen stream. A solution obtained by dissolving 12.04 g of 30% by mass solution of the mercaptan compound (S-1), 11.39 g of methoxytripropylene glycol acrylate (M-1), and 30 mg of dimethyl 2,2'-azobis(2-methylpropionate) [V-601, manufactured by FUJIFILM Wako Pure Chemical Corporation] in 8.29 g of 1-methoxy-2-propanol was added dropwise thereto for 2.5 hours, and the mixture was heated at a liquid temperature of 80° C. for 2.5 hours. 30 mg of V-601 was further added thereto, followed by reaction at a liquid temperature of 90° C. for 2 hours under a nitrogen stream. After cooling to room temperature, 1-methoxy-2-propanol was distilled off by an evaporator to obtain Compound (P-4) (weight-average molecular weight: see Table 1, acid value: 76 mgKOH/g).

In Compound (P-4), the branched partial structure content is 90% by mass.

Example 5

Various evaluations were performed by the method described in Example 1, except that Compound (P-5) synthesized by the method described below was used.

Synthesis of Compound (P-5)

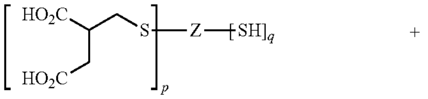

(S-1)
p/q = 3.5/2.5

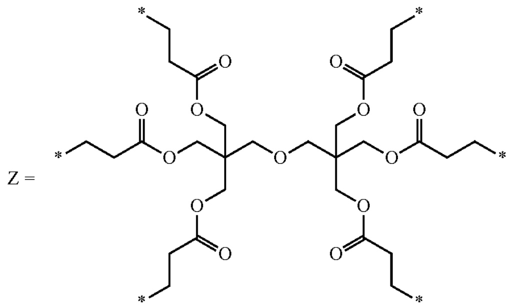

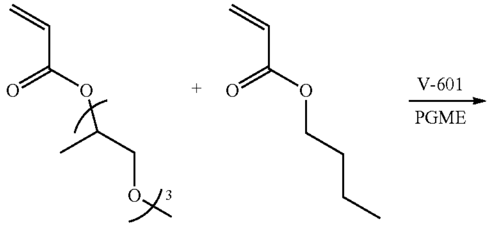

(M-1) (M-3)

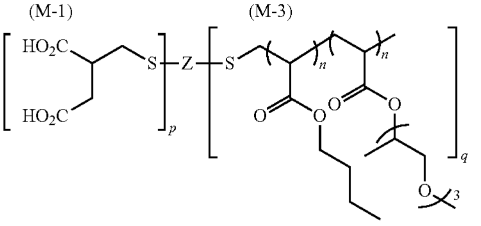

(P-5)
p/q = 3.5/2.5

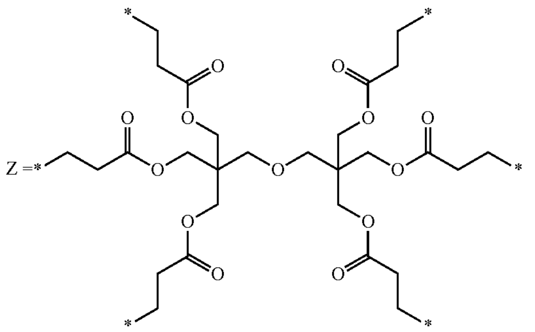

8.36 g of 1-methoxy-2-propanol was heated to a liquid temperature of 80° C. under a nitrogen stream. A solution obtained by dissolving 6.30 g of 30% by mass solution of the mercaptan compound (S-1), 7.28 g of methoxytripropylene glycol acrylate (M-1), 5.82 g of butylacrylate (M-3), and 53 mg of dimethyl 2,2'-azobis(2-methylpropionate) [V-601, manufactured by FUJIFILM Wako Pure Chemical Corporation] in 12.30 g of 1-methoxy-2-propanol was added dropwise thereto for 2.5 hours, and the mixture was heated at a liquid temperature of 80° C. for 2.5 hours. 53 mg of V-601 was further added thereto, followed by reaction at a liquid temperature of 90° C. for 2 hours under a nitrogen stream. After cooling to room temperature, 1-methoxy-2-propanol was distilled off by an evaporator to obtain Compound (P-5) (weight-average molecular weight: see Table 1, acid value: 40 mgKOH/g).

In Compound (P-5), the branched partial structure content is 50% by mass.

Example 6

Various evaluations were performed by the method described in Example 1, except that Compound (P-6) synthesized by the method described below was used.

Synthesis of Compound (P-6)

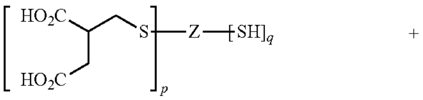

(S-1)
p/q = 3.5/2.5

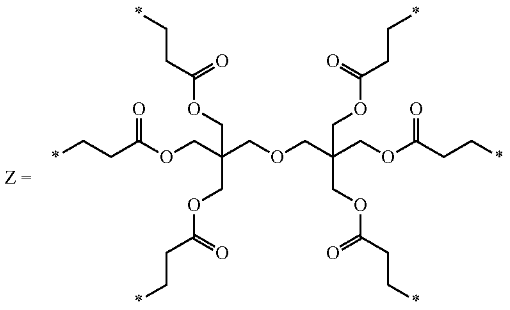

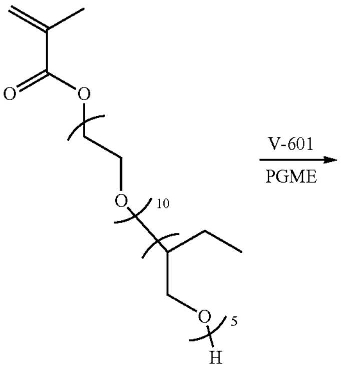

(M-4)

-continued

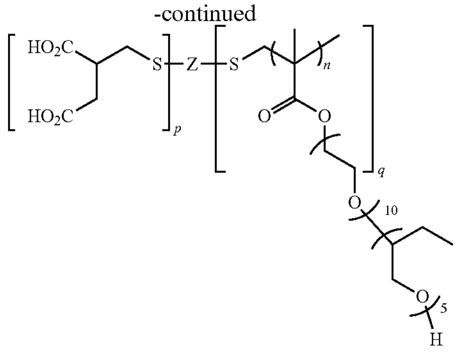

(P-6)
p/q = 3.5/2.5

Z =

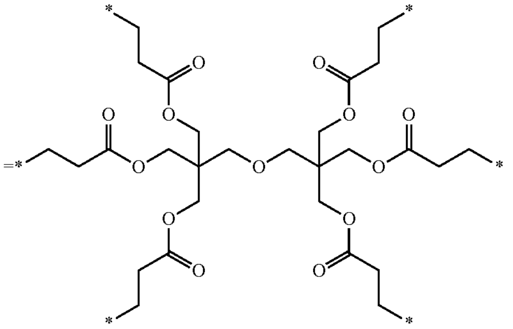

8.36 g of 1-methoxy-2-propanol was heated to a liquid temperature of 80° C. under a nitrogen stream. A solution obtained by dissolving 5.02 g of 30% by mass solution of the mercaptan compound (S-1), 13.49 μg of polyethylene glycol-polybutylene glycol monomethacrylate (M-4, 55PET-800 manufactured by NOF CORPORATION), and 11 mg of dimethyl 2,2'-azobis(2-methylpropionate) [V-601, manufactured by FUJIFILM Wako Pure Chemical Corporation] in 13.2 g of 1-methoxy-2-propanol was added dropwise thereto for 2.5 hours, and the mixture was heated at a liquid temperature of 80° C. for 2.5 hours. 11 mg of V-601 was further added thereto, followed by reaction at a liquid temperature of 90° C. for 2 hours under a nitrogen stream. After cooling to room temperature, 1-methoxy-2-propanol was distilled off by an evaporator to obtain Compound (P-6) (weight-average molecular weight: see Table 1, acid value: 32 mgKOH/g).

In Compound (P-6), the branched partial structure content is 45% by mass.

Example 7

Various evaluations were performed by the method described in Example 1, except that Compound (P-7) synthesized by the method described below was used.

Synthesis of Compound (P-7)

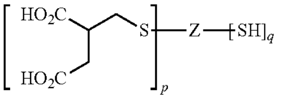

+

(S-1)
p/q = 3.5/2.5

Z =

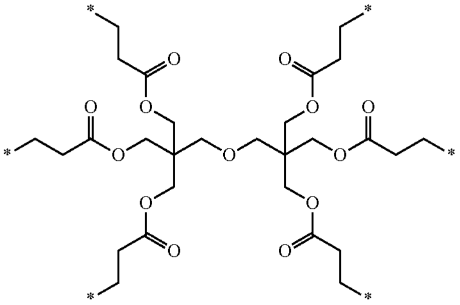

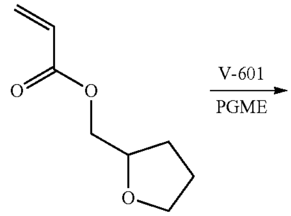

(M-5)

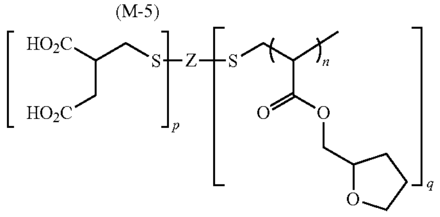

(P-7)
p/q = 3.5/2.5

Z =

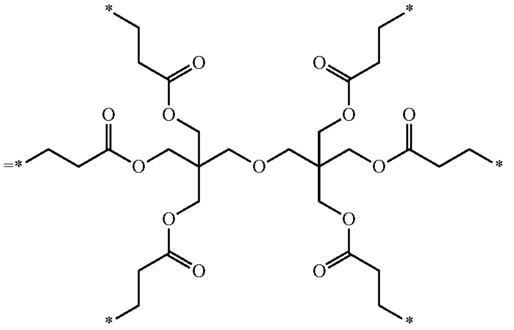

7.52 g of 1-methoxy-2-propanol was heated to a liquid temperature of 80° C. under a nitrogen stream. A solution obtained by dissolving 6.84 g of 30% by mass solution of the mercaptan compound (S-1), 12.95 g of tetrahydrofurfuryl acrylate (M-5), and 57 mg of dimethyl 2,2'-azobis(2-methylpropionate) [V-601, manufactured by FUJIFILM Wako Pure Chemical Corporation] in 11.92 g of 1-methoxy-2-propanol was added dropwise thereto for 2.5 hours, and the mixture was heated at a liquid temperature of 80° C. for 2.5 hours. 57 mg of V-601 was further added thereto, followed by reaction at a liquid temperature of 90° C. for 2 hours under a nitrogen stream. After cooling to room temperature, 1-methoxy-2-propanol was distilled off by an evaporator to obtain Compound (P-7) (weight-average molecular weight: see Table 1, acid value: 43 mgKOH/g).

In Compound (P-7), the branched partial structure content is 83% by mass.

Example 8

Various evaluations were performed by the method described in Example 1, except that Compound (P-8) synthesized by the method described below was used.

Synthesis of Compound (P-8)

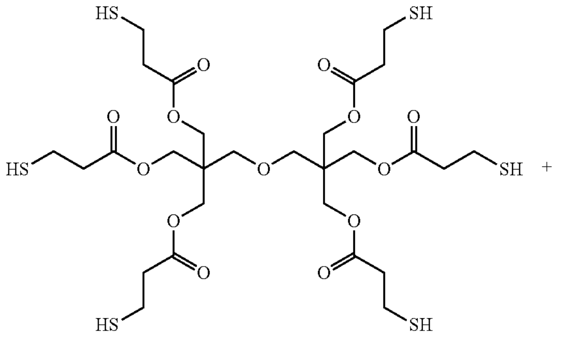

(Z-1)

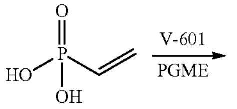

(A-2)

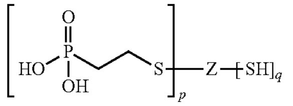

(S-2)
p/q = 3.5/2.5

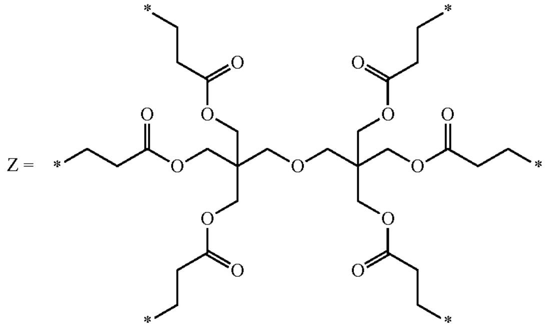

20.23 g of dipentaerythritol hexakis(3-mercaptopropionate) [(Z-1); manufactured by FUJIFILM Wako Pure Chemical Corporation] and 9.77 g of vinylphosphonic acid (A-2) were dissolved in 70 g of 1-methoxy-2-propanol, and heated to a liquid temperature of 90° C. under a nitrogen stream. The feed ratio at this time was 1.0:3.5 in terms of molar ratio.

52 mg of dimethyl 2,2'-azobis(2-methylpropionate) [V-601, manufactured by FUJIFILM Wako Pure Chemical Corporation] was added thereto and heated for 2 hours. 52 mg of V-601 was further added thereto, followed by reaction at a liquid temperature of 90° C. for 2 hours under a nitrogen stream. By cooling to room temperature, a 30% by mass solution of a mercaptan compound (S-2) in which Compound (A-2) was added to a part of sulfur atoms of Compound (Z-1) was obtained.

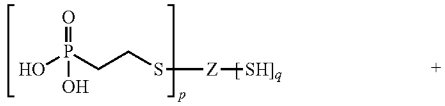

(S-2)
p/q = 3.5/2.5

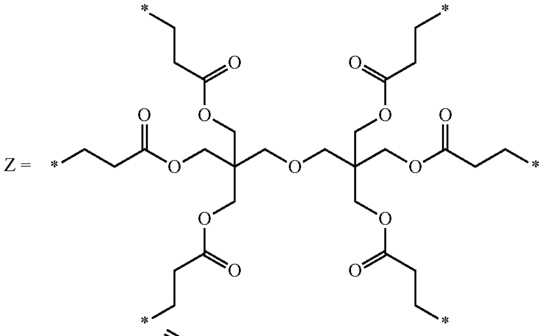

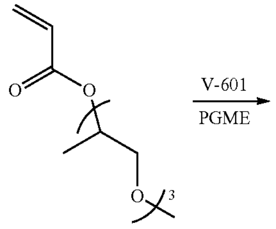

(M-1)

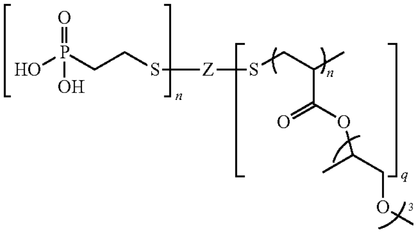

(P-8)
p/q = 3.5/2.5

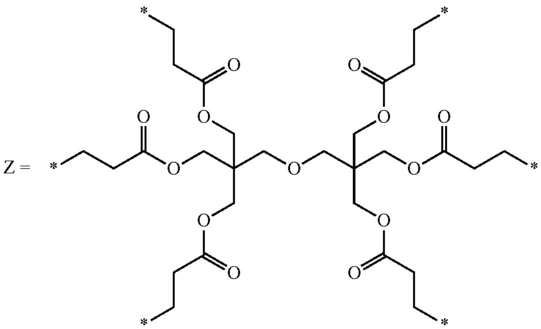

16.71 g of 1-methoxy-2-propanol was heated to a liquid temperature of 80° C. under a nitrogen stream. A solution obtained by dissolving 8.19 g of 30% by mass solution of the mercaptan compound (S-2), 27.54 g of methoxytripropylene glycol acrylate (M-1), and 73 mg of dimethyl 2,2'-azobis(2- methylpropionate) [V-601, manufactured by FUJIFILM Wako Pure Chemical Corporation] in 27.70 g of 1-methoxy-2-propanol was added dropwise thereto for 2.5 hours, and the mixture was heated at a liquid temperature of 80° C. for 2.5 hours. 73 mg of V-601 was further added thereto, followed by reaction at a liquid temperature of 90° C. for 2 hours under a nitrogen stream. After cooling to room temperature, 1-methoxy-2-propanol was distilled off by an evaporator to obtain Compound (P-8) (weight-average molecular weight: see Table 1, acid value: 14 mgKOH/g).

In Compound (P-8), the branched partial structure content is 90% by mass.

Example 9

Various evaluations were performed by the method described in Example 1, except that Compound (P-9) synthesized by the method described below was used.

Synthesis of Compound (P-9)

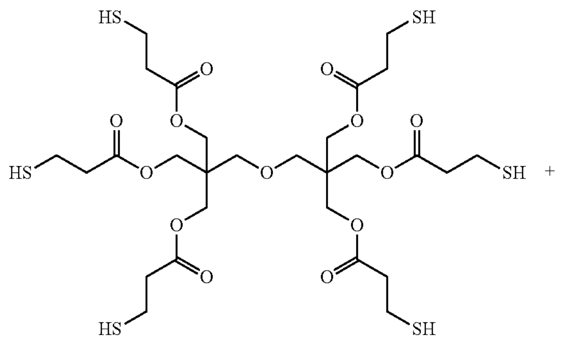

(Z-1)

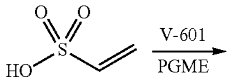

(A-3)

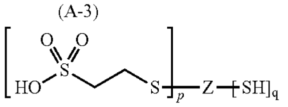

(S-3)
p/q = 3.5/2.5

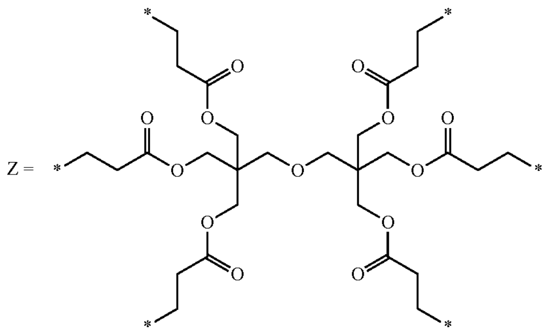

20.23 g of dipentaerythritol hexakis(3-mercaptopropionate) [(Z-1); manufactured by FUJIFILM Wako Pure Chemical Corporation] and 9.77 g of vinylsulfonic acid (A-3) were dissolved in 70 g of 1-methoxy-2-propanol, and heated to a liquid temperature of 90° C. under a nitrogen stream. The feed ratio at this time was 1.0:3.5 in terms of molar ratio. 52 mg of dimethyl 2,2'-azobis(2-methylpropionate) [V-601, manufactured by FUJIFILM Wako Pure Chemical Corporation] was added thereto and heated for 2 hours. 52 mg of V-601 was further added thereto, followed by reaction at a liquid temperature of 90° C. for 2 hours under a nitrogen stream. By cooling to room temperature, a 30% by mass solution of a mercaptan compound (S-3) in which Compound (A-2) was added to a part of sulfur atoms of Compound (Z-1) was obtained.

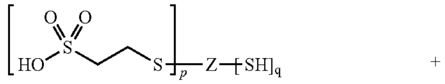

(S-3)
p/q = 3.5/2.5

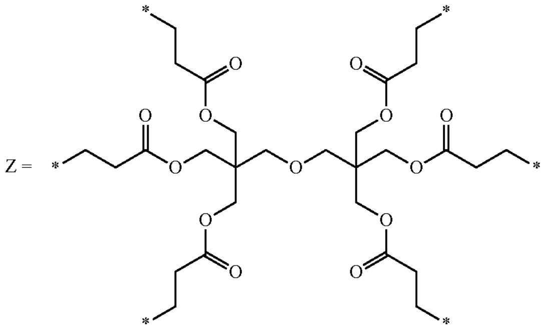

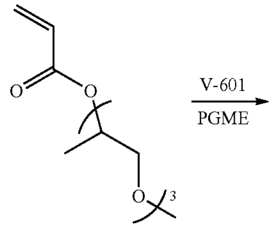

(M-1)

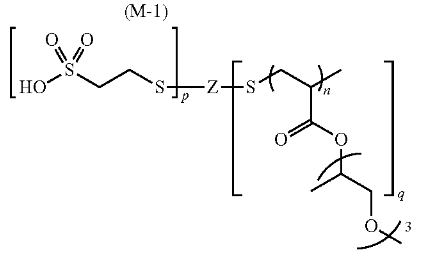

(P-9)
p/q = 3.5/2.5

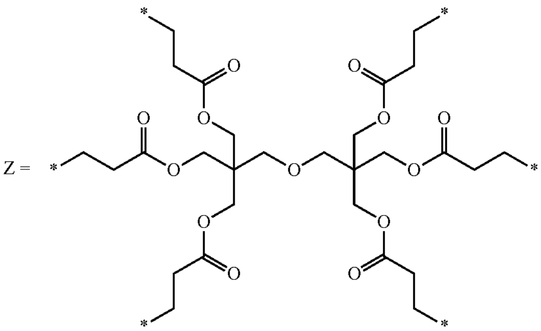

6.71 g of 1-methoxy-2-propanol was heated to a liquid temperature of 80° C. under a nitrogen stream. A solution obtained by dissolving 8.19 g of 30% by mass solution of the mercaptan compound (S-3), 27.54 g of methoxytripropylene glycol acrylate (M-1), and 73 mg of dimethyl 2,2'-azobis(2-methylpropionate) [V-601, manufactured by FUJIFILM Wako Pure Chemical Corporation] in 27.69 g of 1-methoxy-2-propanol was added dropwise thereto for 2.5 hours, and the mixture was heated at a liquid temperature of 80° C. for 2.5 hours. 73 mg of V-601 was further added thereto, followed by reaction at a liquid temperature of 90° C. for 2 hours under a nitrogen stream. After cooling to room temperature, 1-methoxy-2-propanol was distilled off by an evaporator to obtain Compound (P-9) (weight-average molecular weight: see Table 1, acid value: 14 mgKOH/g).

In Compound (P-9), the branched partial structure content is 90% by mass.

Example 10

Various evaluations were performed by the method described in Example 1, except that Compound (P-10) synthesized by the method described below was used.

Synthesis of Compound (P-10)

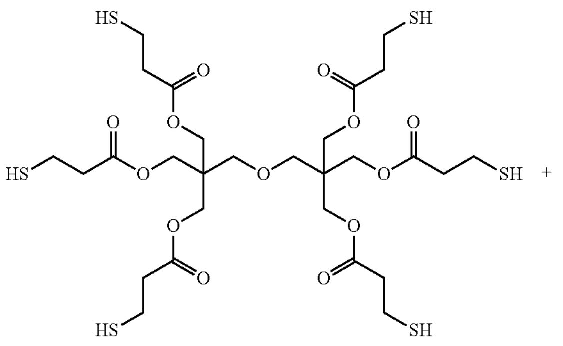

(Z-1)

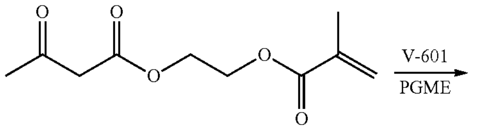

(A-4)

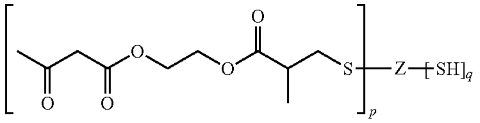

(S-4)
p/q = 3.5/2.5

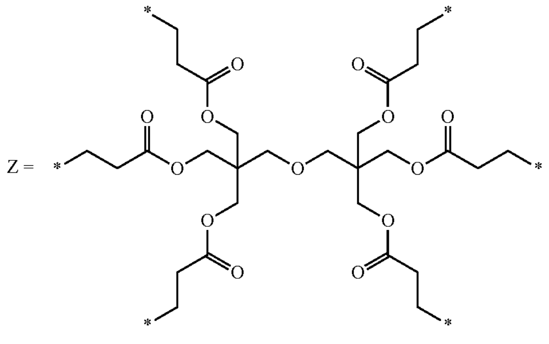

15.33 g of dipentaerythritol hexakis(3-mercaptopropionate) [(Z-1); manufactured by FUJIFILM Wako Pure Chemical Corporation] and 14.67 g of 2-(methacryloyloxy) ethyl acetoacetate (A-4) were dissolved in 70 g of 1-methoxy-2-propanol, and heated to a liquid temperature of 90° C. under a nitrogen stream. The feed ratio at this time was 1.0:3.5 in terms of molar ratio.

39 mg of dimethyl 2,2'-azobis(2-methylpropionate) [V-601, manufactured by FUJIFILM Wako Pure Chemical Corporation] was added thereto and heated for 2 hours. 39 mg of V-601 was further added thereto, followed by reaction at a liquid temperature of 90° C. for 2 hours under a nitrogen stream. By cooling to room temperature, a 30% by mass solution of a mercaptan compound (S-4) in which Compound (A-4) was added to a part of sulfur atoms of Compound (Z-1) was obtained.

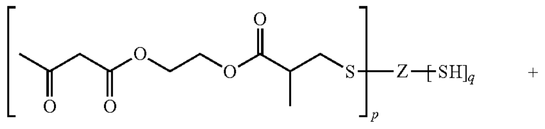

(S-4)
p/q = 3.5/2.5

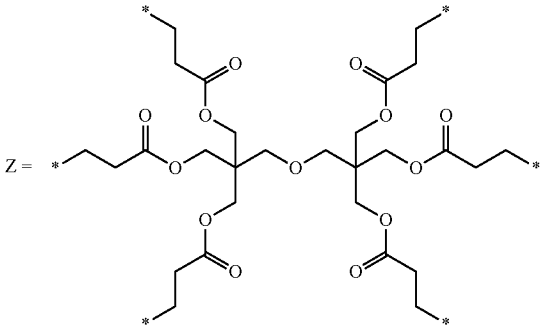

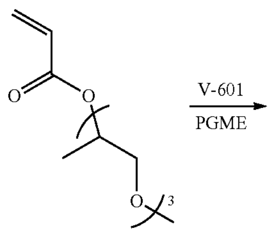

(M-1)

-continued

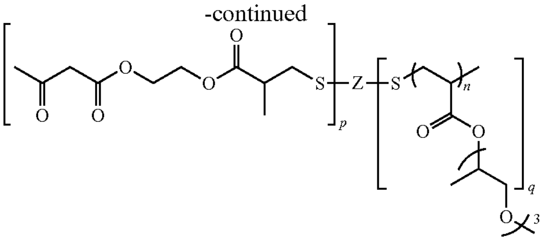

(P-10)
p/q = 3.5/2.5

Z =

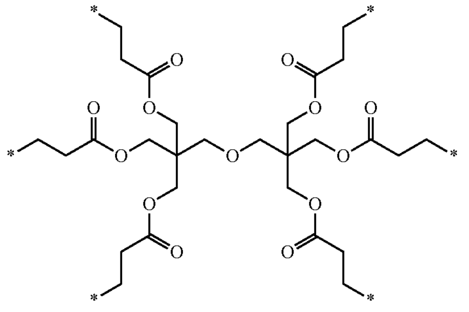

16.71 g of 1-methoxy-2-propanol was heated to a liquid temperature of 80° C. under a nitrogen stream. A solution obtained by dissolving 10.54 g of 30% by mass solution of the mercaptan compound (S-4), 26.84 g of methoxytripropylene glycol acrylate (M-1), and 71 mg of dimethyl 2,2'-azobis(2-methylpropionate) [V-601, manufactured by FUJIFILM Wako Pure Chemical Corporation] in 26.05 g of 1-methoxy-2-propanol was added dropwise thereto for 2.5 hours, and the mixture was heated at a liquid temperature of 80° C. for 2.5 hours. 71 mg of V-601 was further added thereto, followed by reaction at a liquid temperature of 90° C. for 2 hours under a nitrogen stream. After cooling to room temperature, 1-methoxy-2-propanol was distilled off by an evaporator to obtain Compound (P-10) (weight-average molecular weight: see Table 1, acid value: 13 mgKOH/g).

In Compound (P-10), the branched partial structure content is 90% by mass.

Example 11

Various evaluations were performed by the method described in Example 1, except that Compound (P-11) synthesized by the method described below was used.

Synthesis of Compound (P-11)

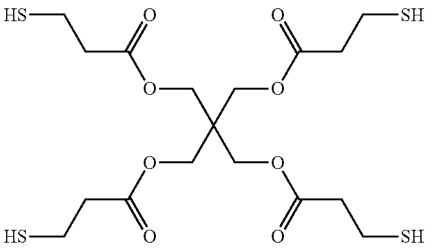

(Z-2)

+

-continued

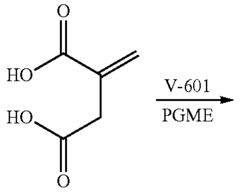

(A-1)

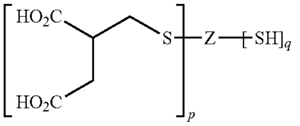

(S-5)
p/q = 2.5/1.5

Z =

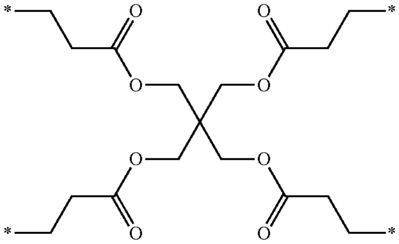

18.01 g of pentaerythritol tetra(3-mercaptopropionate) [(Z-2); manufactured by FUJIFILM Wako Pure Chemical Corporation] and 11.99 g of itaconic acid (A-1) were dissolved in 70 g of 1-methoxy-2-propanol, and heated to a liquid temperature of 90° C. under a nitrogen stream. The feed ratio at this time was 1.0:2.5 in terms of molar ratio.

53 mg of dimethyl 2,2'-azobis(2-methylpropionate) [V-601, manufactured by FUJIFILM Wako Pure Chemical Corporation] was added thereto and heated for 2 hours. 53 mg of V-601 was further added thereto, followed by reaction at a liquid temperature of 90° C. for 2 hours under a nitrogen stream. By cooling to room temperature, a 30% by mass solution of a mercaptan compound (S-5) in which Compound (A-1) was added to a part of sulfur atoms of Compound (Z-2) was obtained.

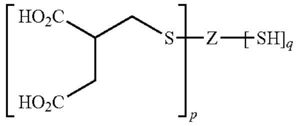

+

(S-5)
p/q = 2.5/1.5

Z =

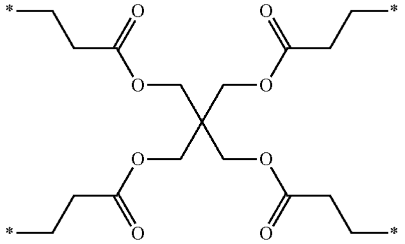

-continued

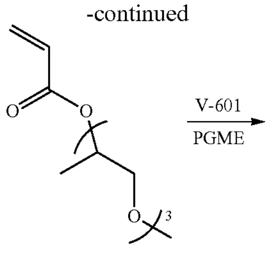

(M-1)

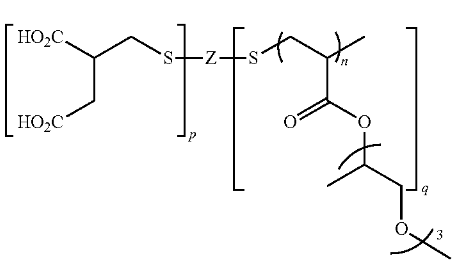

(P-11)
p/q = 2.5/1.5

Z =

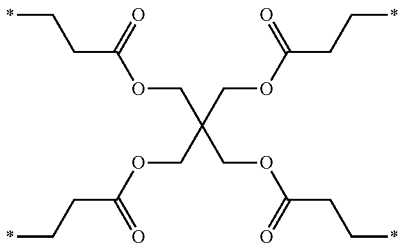

16.71 g of 1-methoxy-2-propanol was heated to a liquid temperature of 80° C. under a nitrogen stream. A solution obtained by dissolving 9.44 g of 30% by mass solution of the mercaptan compound (S-5), 27.17 g of methoxytripropylene glycol acrylate (M-1), and 72 mg of dimethyl 2,2'-azobis(2-methylpropionate) [V-601, manufactured by FUJIFILM Wako Pure Chemical Corporation] in 26.82 g of 1-methoxy-2-propanol was added dropwise thereto for 2.5 hours, and the mixture was heated at a liquid temperature of 80° C. for 2.5 hours. 72 mg of V-601 was further added thereto, followed by reaction at a liquid temperature of 90° C. for 2 hours under a nitrogen stream. After cooling to room temperature, 1-methoxy-2-propanol was distilled off by an evaporator to obtain Compound (P-11) (weight-average molecular weight: see Table 1, acid value: 33 mgKOH/g).

In Compound (P-11), the branched partial structure content is 90% by mass.

Example 12

Various evaluations were performed by the method described in Example 1, except that Compound (P-12) synthesized by the method described below was used.

Synthesis of Compound (P-12)

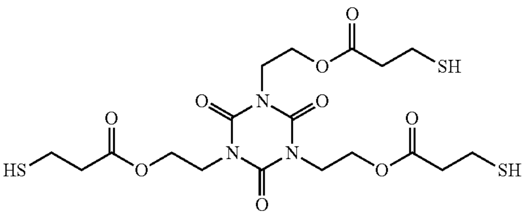

(Z-3)

+

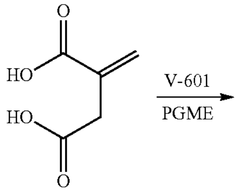

(A-1)

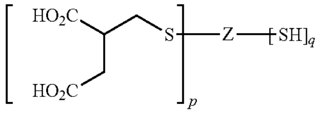

(S-6)
p/q = 2/1

Z =

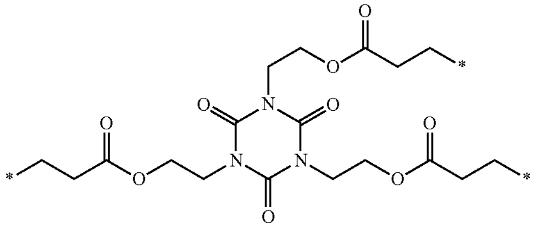

20.07 g of tris[2-(3-mercaptopropionyloxy)ethyl] isocyanurate [(Z-3); manufactured by Tokyo Chemical Industry Co., Ltd.] and 9.93 g of itaconic acid (A-1) were dissolved in 70 g of 1-methoxy-2-propanol, and heated to a liquid temperature of 90° C. under a nitrogen stream. The feed ratio at this time was 1.0:2.0 in terms of molar ratio.

44 mg of dimethyl 2,2'-azobis(2-methylpropionate) [V-601, manufactured by FUJIFILM Wako Pure Chemical Corporation] was added thereto and heated for 2 hours. 44 mg of V-601 was further added thereto, followed by reaction at a liquid temperature of 90° C. for 2 hours under a nitrogen stream. By cooling to room temperature, a 30% by mass solution of a mercaptan compound (S-6) in which Compound (A-1) was added to a part of sulfur atoms of Compound (Z-3) was obtained.

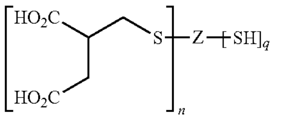

+

(S-6)
p/q = 2/1

Z =

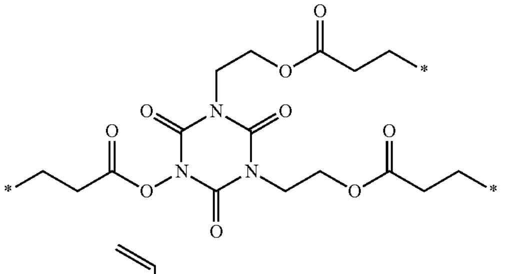

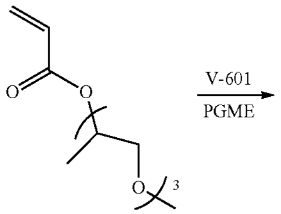

(M-1)

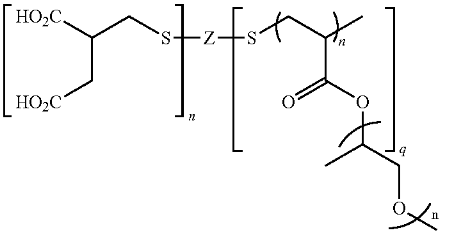

(P-12)
p/q = 2/1

Z =

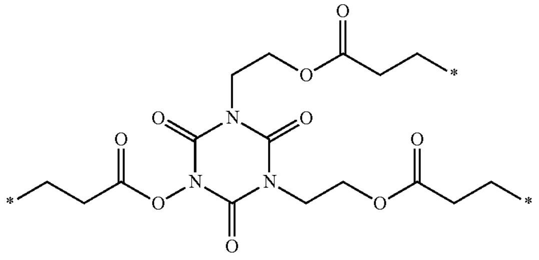

16.71 g of 1-methoxy-2-propanol was heated to a liquid temperature of 80° C. under a nitrogen stream. A solution obtained by dissolving 13.11 g of 30% by mass solution of the mercaptan compound (S-6), 26.07 g of methoxytripropylene glycol acrylate (M-1), and 69 mg of dimethyl 2,2'-azobis(2-methylpropionate) [V-601, manufactured by FUJIFILM Wako Pure Chemical Corporation] in 24.25 g of 1-methoxy-2-propanol was added dropwise thereto for 2.5 hours, and the mixture was heated at a liquid temperature of 80° C. for 2.5 hours. 69 mg of V-601 was further added thereto, followed by reaction at a liquid temperature of 90° C. for 2 hours under a nitrogen stream. After cooling to room temperature, 1-methoxy-2-propanol was distilled off by an evaporator to obtain Compound (P-12) (weight-average molecular weight: see Table 1, acid value: 37 mgKOH/g).

In Compound (P-12), the branched partial structure content is 90% by mass.

Comparative Example 1

Solubility was evaluated by the method described in Example 1, except that Comparative Compound (Q-1) synthesized by the method described below was used.

As a result, since the evaluation result of the solubility was C, the evaluation of other items was not performed.

Synthesis of Comparative Compound (Q-1)

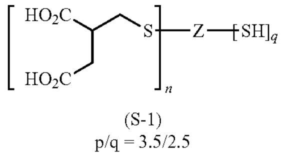

+

(S-1)
p/q = 3.5/2.5

Z =

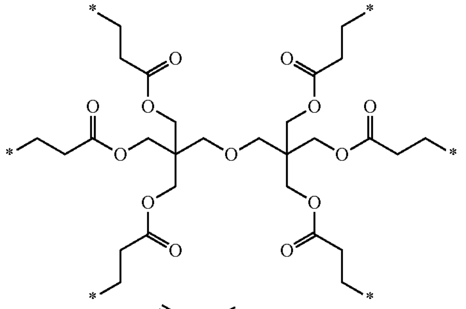

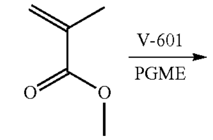

(M-6)

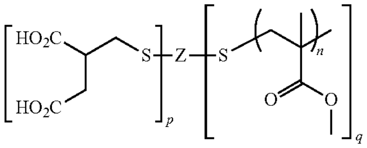

(Q-1)
p/q = 3.5/2.5

Z =

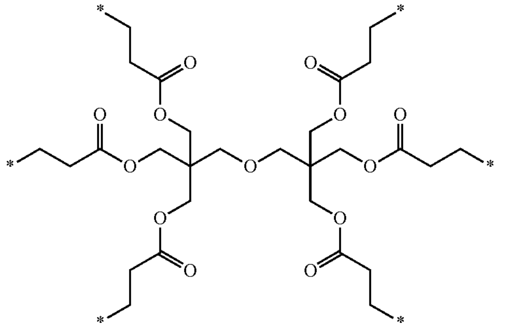

8.36 g of 1-methoxy-2-propanol was heated to a liquid temperature of 80° C. under a nitrogen stream. A solution obtained by dissolving 9.92 g of 30% by mass solution of the mercaptan compound (S-1), 12.03 g of methylmethacrylate (M-6), and 83 mg of dimethyl 2,2'-azobis(2-methylpropionate) [V-601, manufactured by FUJIFILM Wako Pure Chemical Corporation] in 9.77 g of 1-methoxy-2-propanol was added dropwise thereto for 2.5 hours, and the mixture was heated at a liquid temperature of 80° C. for 2.5 hours. 83 mg of V-601 was further added thereto, followed by reaction at a liquid temperature of 90° C. for 2 hours under a nitrogen stream.

The reactant was cooled to room temperature, then reprecipitated with water, collected by filtration, and dried to obtain Comparative Compound (Q-1) (weight-average molecular weight: see Table 1, acid value: 63 mgKOH/g) as powder.

Comparative Example 2

Solubility was evaluated by the method described in Example 1, except that Comparative Compound (Q-2) synthesized by the method described below was used.

As a result, since the evaluation result of the solubility was C, the evaluation of other items was not performed.

Synthesis of Comparative Compound (Q-2)

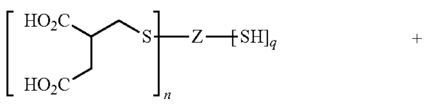

(S-1)
p/q = 3.5/2.5

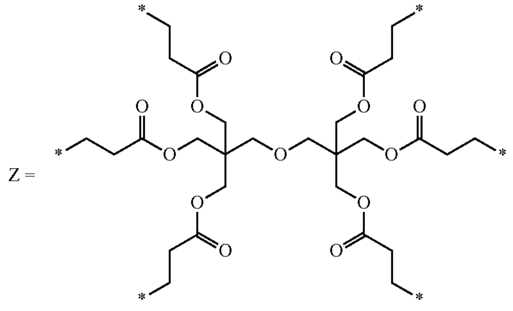

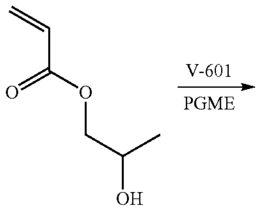

(M-7)

-continued

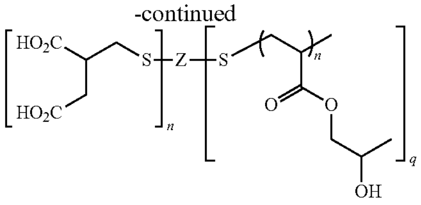

(Q-2)
p/q = 3.5/2.5

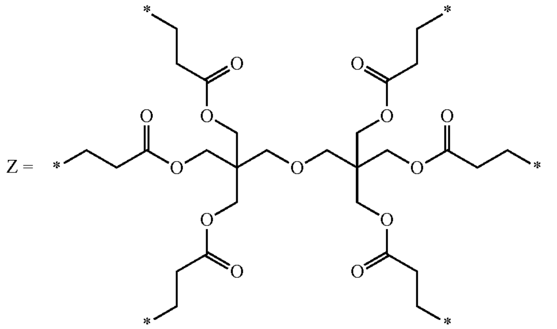

16.71 g of 1-methoxy-2-propanol was heated to a liquid temperature of 80° C. under a nitrogen stream. A solution obtained by dissolving 15.99 g of 30% by mass solution of the mercaptan compound (S-1), 25.20 g of hydroxypropylacrylate (M-7), and 134 mg of dimethyl 2,2'-azobis(2-methylpropionate) [V-601, manufactured by FUJIFILM Wako Pure Chemical Corporation] in 22.24 g of 1-methoxy-2-propanol was added dropwise thereto for 2.5 hours, and the mixture was heated at a liquid temperature of 80° C. for 2.5 hours. 134 mg of V-601 was further added thereto, followed by reaction at a liquid temperature of 90° C. for 2 hours under a nitrogen stream. After cooling to room temperature, 1-methoxy-2-propanol was distilled off by an evaporator to obtain Comparative Compound (Q-2) (weight-average molecular weight: see Table 1, acid value: 51 mgKOH/g).

Comparative Example 3

Various evaluations were performed by the method described in Example 1, except that Comparative Compound (Q-3) synthesized by the method described below was used.

Synthesis of Comparative Compound (Q-3)

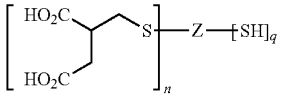

(S-1)
p/q = 3.5/2.5

+

Z =

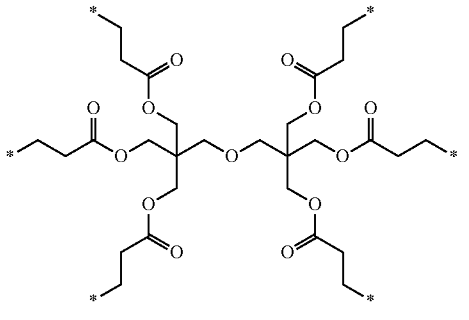

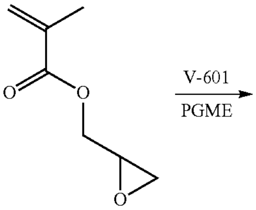

(M-8)

-continued

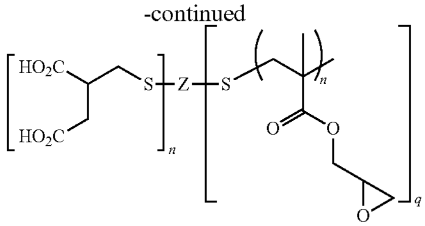

(Q-3)
p/q = 3.5/2.5

Z =

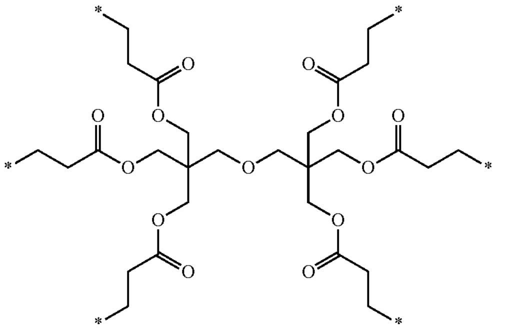

16.71 g of 1-methoxy-2-propanol was heated to a liquid temperature of 80° C. under a nitrogen stream. A solution obtained by dissolving 14.84 g of 30% by mass solution of the mercaptan compound (S-1), 25.20 g of glycidylmethacrylate (M-8), and 124 mg of dimethyl 2,2'-azobis(2-methylpropionate) [V-601, manufactured by FUJIFILM Wako Pure Chemical Corporation] in 23.04 g of 1-methoxy-2-propanol was added dropwise thereto for 2.5 hours, and the mixture was heated at a liquid temperature of 80° C. for 2.5 hours. 124 mg of V-601 was further added thereto, followed by reaction at a liquid temperature of 90° C. for 2 hours under a nitrogen stream. After cooling to room temperature, 1-methoxy-2-propanol was distilled off by an evaporator to obtain Comparative Compound (Q-3) (weight-average molecular weight: see Table 1, acid value: 47 mgKOH/g).

The above results are shown in Table 1 (Tables 1-1 to 1-5). $A^1$, $R^1$, Z, $R^2$, $P^1$, p, and q in Table 1 are $A^1$, $R^1$, Z, $R^2$, $P^1$, p, and q in General Formula (1), respectively. In the following, "*" represents a bonding position with an adjacent atom.

TABLE 1-1
| | A¹ | R¹ | Z | R² | P¹ | p | q | Weight-average molecular weight | Evaluation: Solubility | Evaluation: Dispersibility 1 | Evaluation: Dispersibility 2 | Evaluation: Brightness |
|---|---|---|---|---|---|---|---|---|---|---|---|---|
| Example 1 | 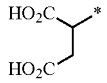 | $—CH_2—$ | 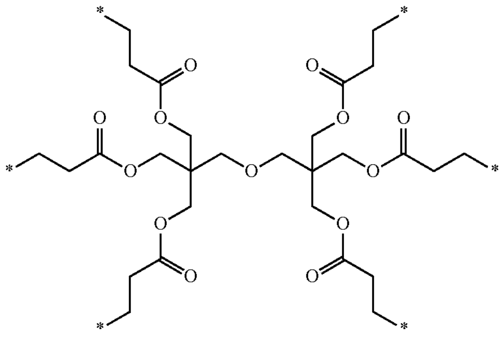 | Single bond | 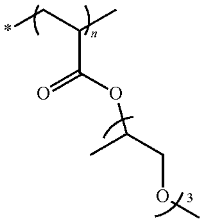 | 3.5 | 2.5 | 7000 | A | A | A | A |
| Example 2 | 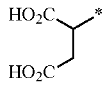 | $—CH_2—$ | 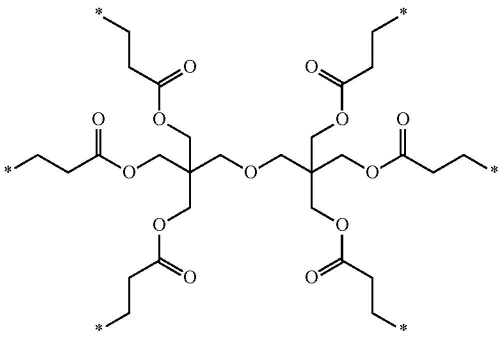 | Single bond | 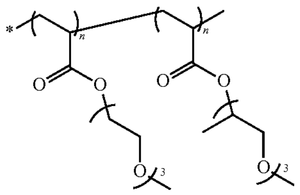 | 3.5 | 2.5 | 7000 | A | A | A | B |

TABLE 1-1-continued
| | $A^1$ | $R^1$ | Z | $R^2$ | $P^1$ | p | q | Weight-average molecular weight | Evaluation Solu-bility | Dispersi-bility 1 | Dispersi-bility 2 | Brightness |
|---|---|---|---|---|---|---|---|---|---|---|---|---|
| Example 3 | 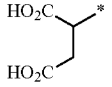 | $—CH_2—$ | 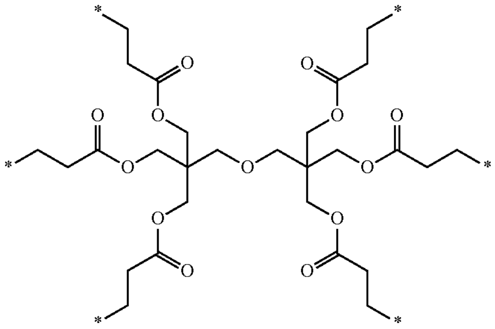 | Single bond | 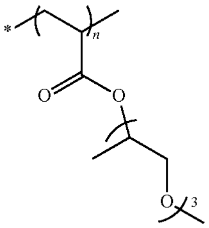 | 3.5 | 2.5 | 18000 | A | B | B | A |

TABLE 1-2
| | $A^1$ | $R^1$ | Z | $R^2$ | $P^1$ | p | q | Weight-average molecular weight | Evaluation: Solubility | Evaluation: Dispersibility 1 | Evaluation: Dispersibility 2 | Evaluation: Brightness |
|---|---|---|---|---|---|---|---|---|---|---|---|---|
| Example 4 | 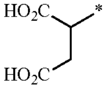 | —$CH_2$— | 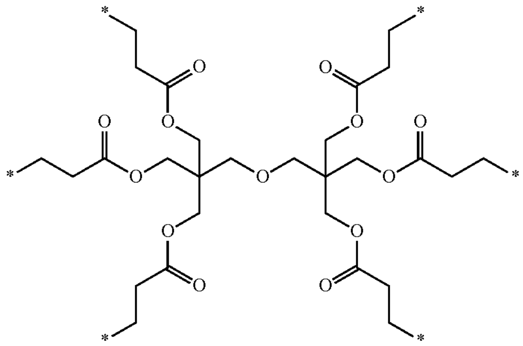 | Single bond | 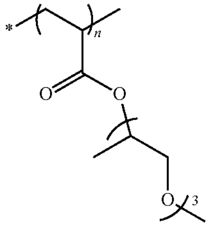 | 3.5 | 2.5 | 3500 | A | B | B | A |
| Example 5 | 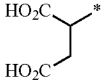 | —$CH_2$— | 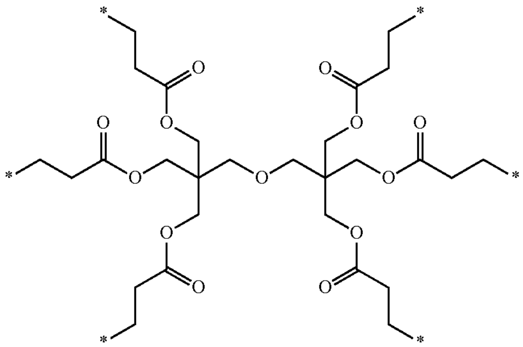 | Single bond | 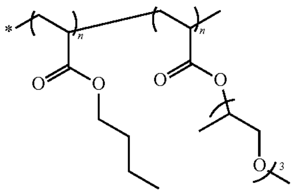 | 3.5 | 2.5 | 7000 | B | A | A | A |

TABLE 1-2-continued
| | $A^1$ | $R^1$ | Z | $R^2$ | $P^1$ | p | q | Weight-average molecular weight | Evaluation Solu-bility | Dispersi-bility 1 | Dispersi-bility 2 | Brightness |
|---|---|---|---|---|---|---|---|---|---|---|---|---|
| Example 6 | 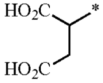 | $—CH_2—$ | 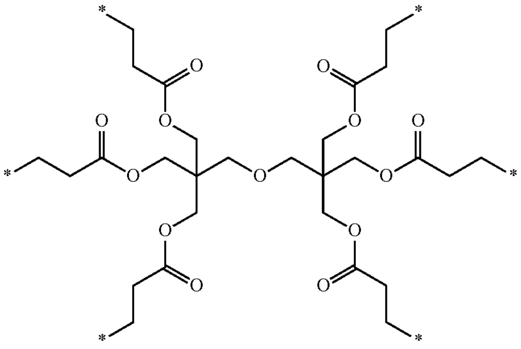 | Single bond | 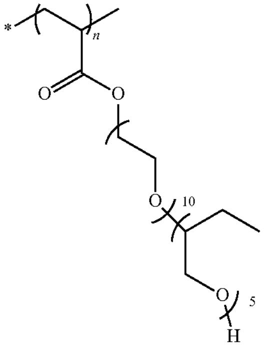 | 3.5 | 2.6 | 7000 | B | A | A | B |

TABLE 1-3
| | $A^1$ | $R^1$ | Z | $R^2$ | $P^1$ | p | q | Weight-average molecular weight | Evaluation Solubility | Dispersibility 1 | Dispersibility 2 | Brightness |
|---|---|---|---|---|---|---|---|---|---|---|---|---|
| Example 7 | 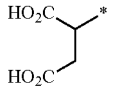 | $—CH_2—$ | 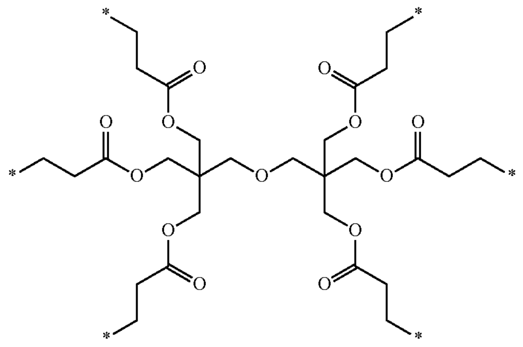 | Single bond | 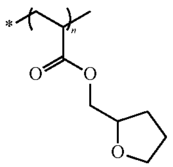 | 3.5 | 2.5 | 7000 | B | A | A | A |
| Example 8 | 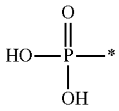 | $—CH_2CH_2—$ | 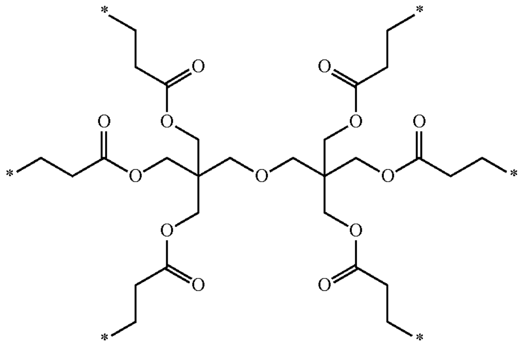 | Single bond | 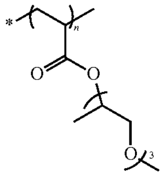 | 3.5 | 2.5 | 7000 | A | A | A | A |

TABLE 1-3-continued
| | $A^1$ | $R^1$ | Z | $R^2$ | $P^1$ | p | q | Weight-average molecular weight | Evaluation: Solubility | Evaluation: Dispersibility 1 | Evaluation: Dispersibility 2 | Evaluation: Brightness |
|---|---|---|---|---|---|---|---|---|---|---|---|---|
| Example 9 | 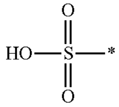 | $—CH_2CH_2—$ | 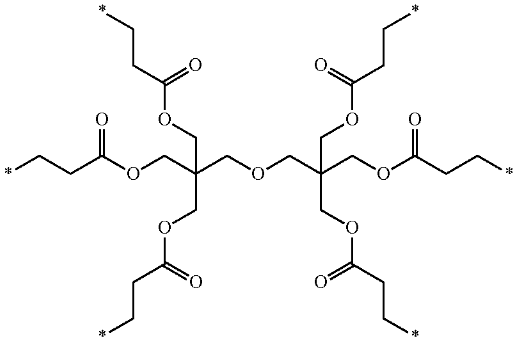 | Single bond | 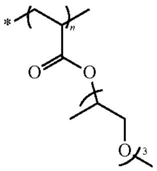 | 3.5 | 2.5 | 7000 | A | B | B | A |

TABLE 1-4
| | $A^1$ | $R^1$ | Z | $R^2$ | $P^1$ | p | q | Weight-average molecular weight | Evaluation: Solubility | Evaluation: Dispersibility 1 | Evaluation: Dispersibility 2 | Evaluation: Brightness |
|---|---|---|---|---|---|---|---|---|---|---|---|---|
| Example 10 | 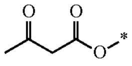 | 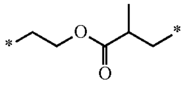 | 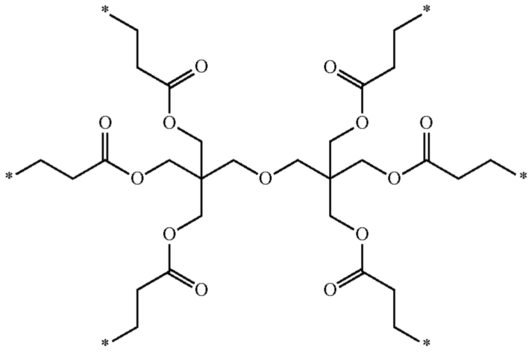 | Single bond | 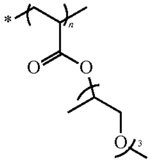 | 3.5 | 2.5 | 7000 | A | B | B | A |
| Example 11 | 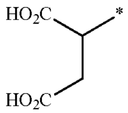 | $-CH_2-$ | 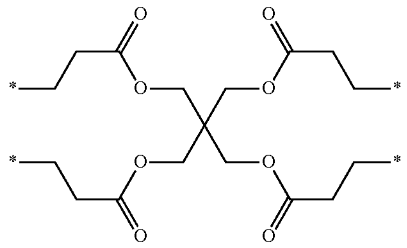 | Single bond | 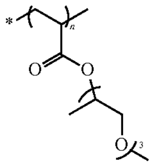 | 2.5 | 1.5 | 4700 | A | A | A | A |
| Example 12 | 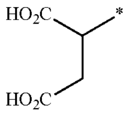 [SMILES: *C(CC(=O)O)C(=O)O] | $-CH_2-$ | 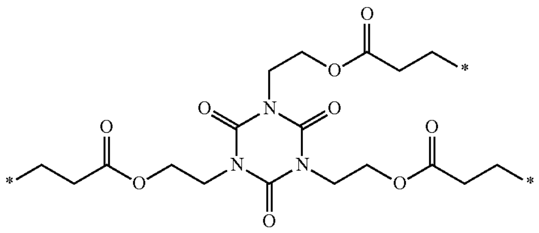 | Single bond | 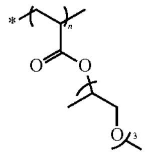 | 2 | 1 | 4500 | A | B | B | A |

TABLE 1-5
| | $A^1$ | $R^1$ | Z | $R^2$ | $P^1$ | p | q | Weight-average molecular weight | Evaluation: Solubility | Evaluation: Dispersibility 1 | Evaluation: Dispersibility 2 | Evaluation: Brightness |
|---|---|---|---|---|---|---|---|---|---|---|---|---|
| Comparative Example 1 | 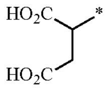 | $—CH_2—$ | 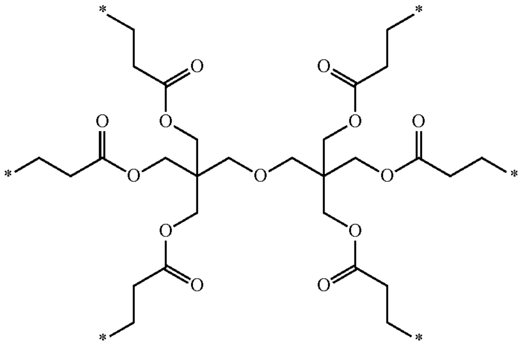 | Single bond | 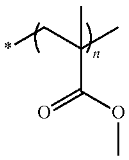 | 3.5 | 2.5 | 7000 | C | — | — | — |
| Comparative Example 2 | 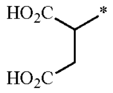 | $—CH_2—$ | 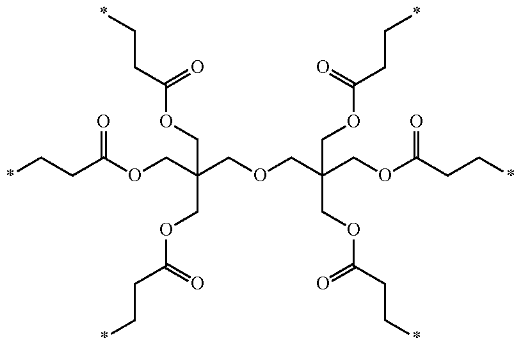 | Single bond | 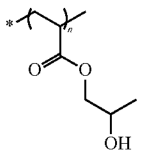 | 3.5 | 2.5 | 4500 | C | — | — | — |

TABLE 1-5-continued
| | $A^1$ | $R^1$ | Z | $R^2$ | $P^1$ | p | q | Weight-average molecular weight | Evaluation Solubility | Dispersibility 1 | Dispersibility 2 | Brightness |
|---|---|---|---|---|---|---|---|---|---|---|---|---|
| Comparative Example 3 | 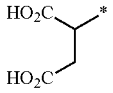 | $—CH_2—$ | 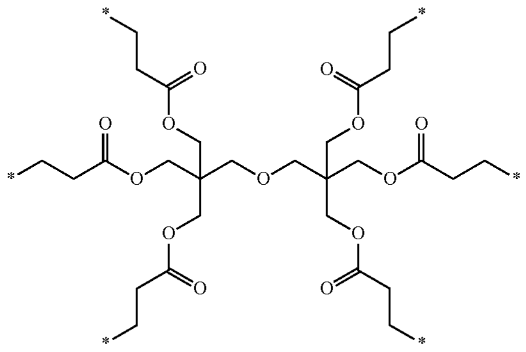 | Single bond | 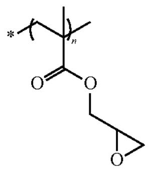 | 3.5 | 2.5 | 8300 | B | C | C | C |

From the comparison between Examples and Comparative Examples shown in Table 1, it can be confirmed that the compounds of Examples 1 to 12 exhibited high solubility in the polymerizable compound and contributed to an enhancement in the dispersibility of the inorganic particles in both of the polymerizable composition containing inorganic particles and the polymerizable composition further containing quantum dots. Furthermore, the wavelength conversion members produced using the quantum dot-containing polymerizable compositions containing the compounds of Examples 1 to 12 were wavelength conversion members capable of emitting light with high brightness as shown in Table 1.

Example 13

Various evaluations were performed by the method described in Example 1, except that Compound (P-21) synthesized by the method described below was used.

Synthesis of Compound (P-21)

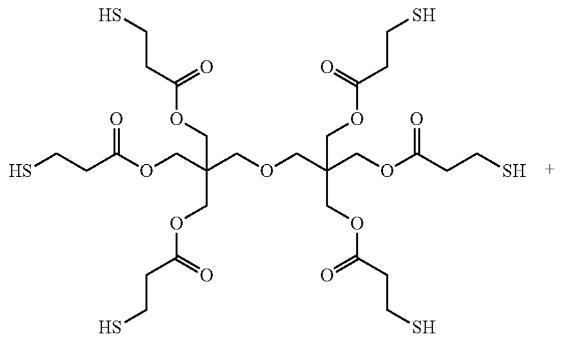

(Z-1)

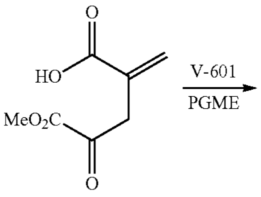

(A-5)

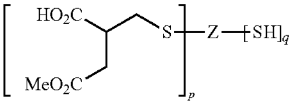

(S-7)
p/q = 3.5/2.5

Z =

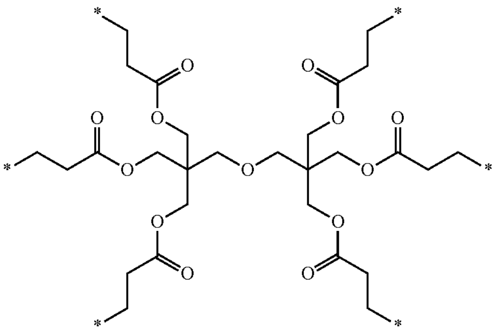

18.25 g of dipentaerythritol hexakis(3-mercaptopropionate) [(Z-1); manufactured by SC Organic Chemical Co., Ltd.] and 11.75 g of monomethyl itaconate (A-5) were dissolved in 70.0 g of 1-methoxy-2-propanol, and heated to a liquid temperature of 90° C. under a nitrogen stream. The feed ratio at this time was 1.0:3.5 in terms of molar ratio.

47 mg of dimethyl 2,2'-azobis(2-methylpropionate) [V-601, manufactured by FUJIFILM Wako Pure Chemical Corporation] was added thereto and heated for 2 hours. 47 mg of V-601 was further added thereto, followed by reaction at a liquid temperature of 90° C. for 2 hours under a nitrogen stream. By cooling to room temperature, a 30% by mass solution of a mercaptan compound (S-7) in which Compound (A-5) was added to a part of sulfur atoms of Compound (Z-1) was obtained.

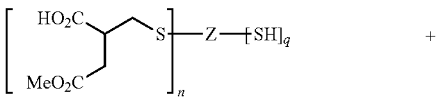

(S-7)
p/q = 3.5/2.5

Z =

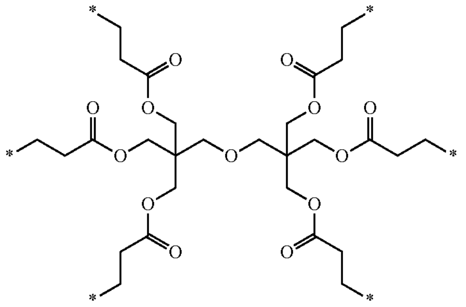

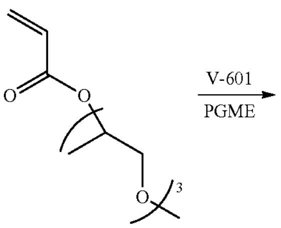

(M-1)

-continued

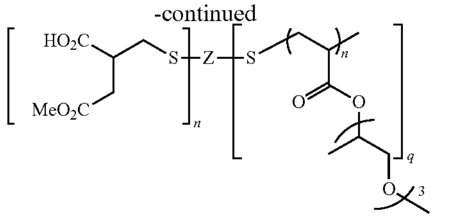

(P-21)
p/q = 3.5/2.5

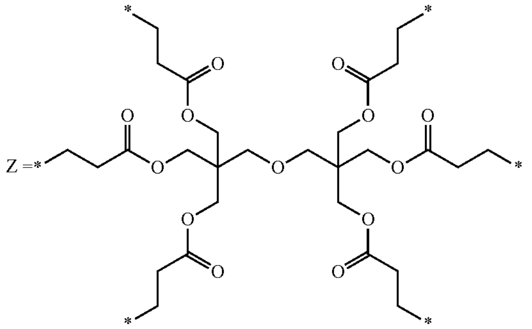

16.71 g of 1-methoxy-2-propanol was heated to 80° C. under a nitrogen stream. A solution obtained by dissolving 28.35 g of 30% by mass solution of the mercaptan compound (S-7), 21.50 g of methoxytripropylene glycol acrylate (M-1), and 57 mg of dimethyl 2,2'-azobis(2-methylpropionate) [V-601, FUJIFILM Wako Pure Chemical Corporation] in 19.16 g of 1-methoxy-2-propanol was added dropwise thereto for 2.5 hours, and the mixture was heated at a liquid temperature of 80° C. for 2.5 hours. 57 mg of V-601 was further added thereto, followed by reaction at a liquid temperature of 90° C. for 2 hours under a nitrogen stream. After cooling to room temperature once, 1-methoxy-2-propanol was distilled off under reduced pressure at 60° C. Next, 20 g of methanol was added thereto, then the mixture was distilled off again under reduced pressure at 60° C. to obtain Compound (P-21) (weight-average molecular weight: see Table 2A and Table 2B, acid value: 43 mgKOH/g).

In Compound (P-21), the branched partial structure content is 95% by mass.

Example 14

Various evaluations were performed by the method described in Example 1, except that Compound (P-22) synthesized by the method described below was used.

Synthesis of Compound (P-22)

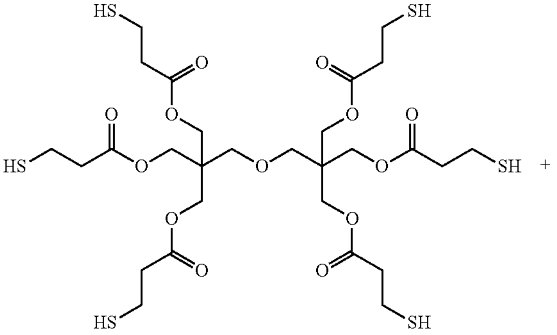

(Z-1)

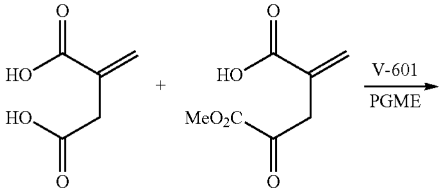

(A-1) (A-5)

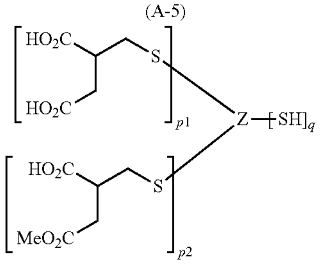

(S-8)
p1/p2/q = 3/0.5/2.5

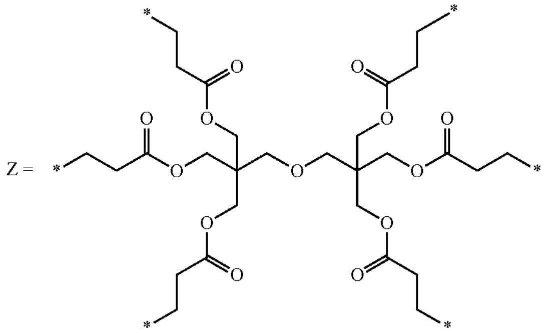

18.86 g of dipentaerythritol hexakis(3-mercaptopropionate) [(Z-1); manufactured by SC Organic Chemical Co., Ltd.], 9.40 g of itaconic acid (A-1), and 1.74 g of monomethyl itaconate (A-5) were dissolved in 70.0 g of 1-methoxy-2-propanol, and heated to a liquid temperature of 90° C. under a nitrogen stream. The feed ratio at this time was 1.0:3.0:0.5 in terms of molar ratio.

49 mg of dimethyl 2,2'-azobis(2-methylpropionate) [V-601, manufactured by FUJIFILM Wako Pure Chemical Corporation] was added thereto and heated for 2 hours. 49 mg of V-601 was further added thereto, followed by reaction at a liquid temperature of 90° C. for 2 hours under a nitrogen stream. By cooling to room temperature, a 30% by mass solution of a mercaptan compound (S-8) in which Compound (A-1) and Compound (A-5) were added to a part of sulfur atoms of Compound (Z-1) was obtained.

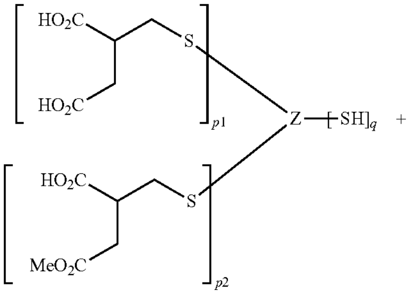

(S-8)

p1/p2/q = 3/0.5/2.5

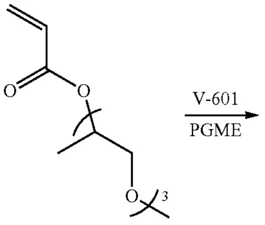

(M-1)

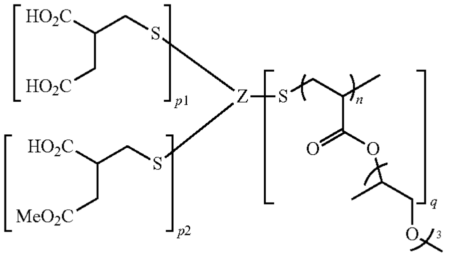

(P-22)

p1/p2/q = 3/0.5/2.5

Z =

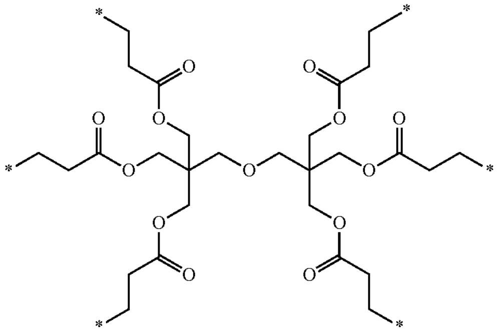

14.68 g of 1-methoxy-2-propanol was heated to 75° C. under a nitrogen stream. A solution obtained by dissolving 8.73 g of 30% by mass solution of the mercaptan compound (S-8), 27.38 g of methoxytripropylene glycol acrylate (M-1), and 73 mg of dimethyl 2,2'-azobis(2-methylpropionate) [V-601, FUJIFILM Wako Pure Chemical Corporation] in 28.15 g of 1-methoxy-2-propanol was added dropwise thereto for 2.5 hours, and the mixture was heated at a liquid temperature of 75° C. for 2.5 hours. 73 mg of V-601 was further added thereto, followed by reaction at a liquid temperature of 90° C. for 2 hours under a nitrogen stream. After cooling to room temperature once, 1-methoxy-2-propanol was distilled off under reduced pressure at 60° C.

Next, 20 g of methanol was added thereto, then the mixture was distilled off again under reduced pressure at 60° C. to obtain Compound (P-22) (weight-average molecular weight: see Table 2A and Table 2B, acid value: 26 mgKOH/g).

In Compound (P-22), the branched partial structure content is 95% by mass.

Example 15

Various evaluations were performed by the method described in Example 1, except that Compound (P-23) synthesized by the method described below was used.

Synthesis of Compound (P-23)

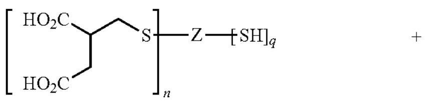

(S-1)

p/q = 3.5/2.5

Z =

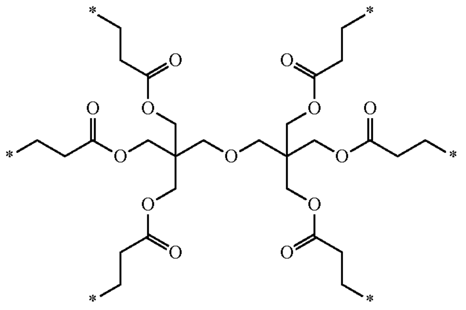

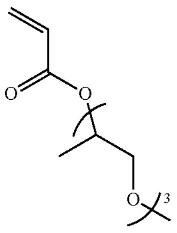

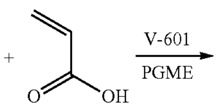

(M-23)

(M-1)

-continued

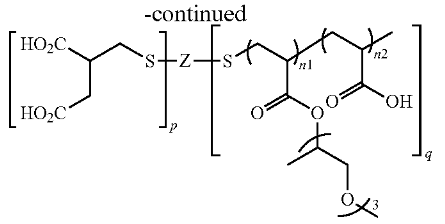

(P-23)
p/q = 3.5/2.5

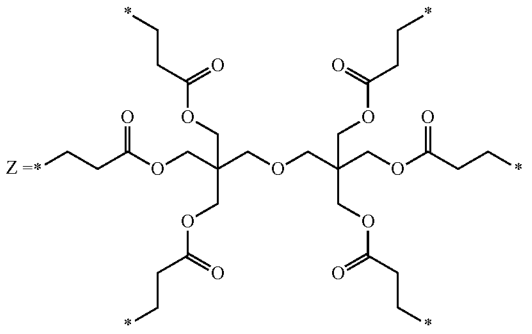

14.68 g of 1-methoxy-2-propanol was heated to 75° C. under a nitrogen stream. A solution obtained by dissolving 8.89 g of 30% by mass solution of the mercaptan compound (S-1), 27.06 g of methoxytripropylene glycol acrylate (M-1), 0.27 g of acrylic acid (M-23), and 74 mg of dimethyl 2,2'-azobis(2-methylpropionate) [V-601, FUJIFILM Wako Pure Chemical Corporation] in 28.15 g of 1-methoxy-2-propanol was added dropwise thereto for 2.5 hours, and the mixture was heated at a liquid temperature of 75° C. for 2.5 hours. 74 mg of V-601 was further added thereto, followed by reaction at a liquid temperature of 90° C. for 2 hours under a nitrogen stream. After cooling to room temperature once, 1-methoxy-2-propanol was distilled off under reduced pressure at 60° C. Next, 20 g of 2-propanol was added thereto, then the mixture was distilled off again under reduced pressure at 60° C. to obtain Compound (P-23) (weight-average molecular weight: see Table 2A and Table 2B, acid value: 35 mgKOH/g). In the structure of Compound (P-23), n1 and n2 are the number of repeating units, and same as or different from each other.

n1 and n2 are values that can be calculated from the weight-average molecular weight and the structure. The same also applies to n1 and n2 described later.

In Compound (P-23), the branched partial structure content is 95% by mass.

Example 16

Various evaluations were performed by the method described in Example 1, except that Compound (P-24) synthesized by the method described below was used.

Synthesis of Compound (P-24)

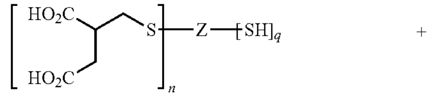

(S-1)
p/q = 3.5/2.5

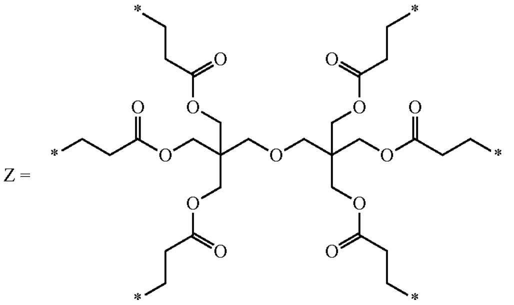

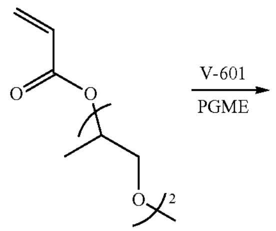

(M-24)

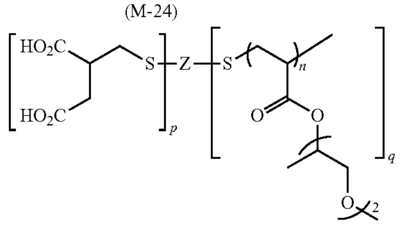

(P-24)
p/q = 3.5/2.5

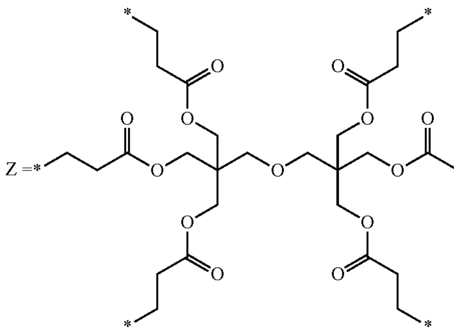

14.68 g of 1-methoxy-2-propanol was heated to 80° C. under a nitrogen stream. A solution obtained by dissolving 10.91 g of 30% by mass solution of the mercaptan compound (S-1), 26.73 g of methoxydipropylene glycol acrylate (M-24, Light Acrylate DPM-A manufactured by KYOEISHA CHEMICAL Co., Ltd.), and 91 mg of dimethyl 2,2'-azobis(2-methylpropionate) [V-601, FUJIFILM Wako Pure Chemical Corporation] in 26.63 g of 1-methoxy-2-propanol was added dropwise thereto for 2.5 hours, and the mixture was heated at a liquid temperature of 80° C. for 2.5 hours. 91 mg of V-601 was further added thereto, followed by reaction at a liquid temperature of 90° C. for 2 hours under a nitrogen stream. After cooling to room temperature once, 1-methoxy-2-propanol was distilled off under reduced pressure at 70° C. Next, 20 g of methanol was added thereto, then the mixture was distilled off again under reduced pressure at 70° C. to obtain Compound (P-24) (weight-average molecular weight: see Table 2A and Table 2B, acid value: 35 mgKOH/g).

In Compound (P-24), the branched partial structure content is 95% by mass.

Example 17

Various evaluations were performed by the method described in Example 1, except that Compound (P-25) synthesized by the method described below was used.

Synthesis of Compound (P-25)

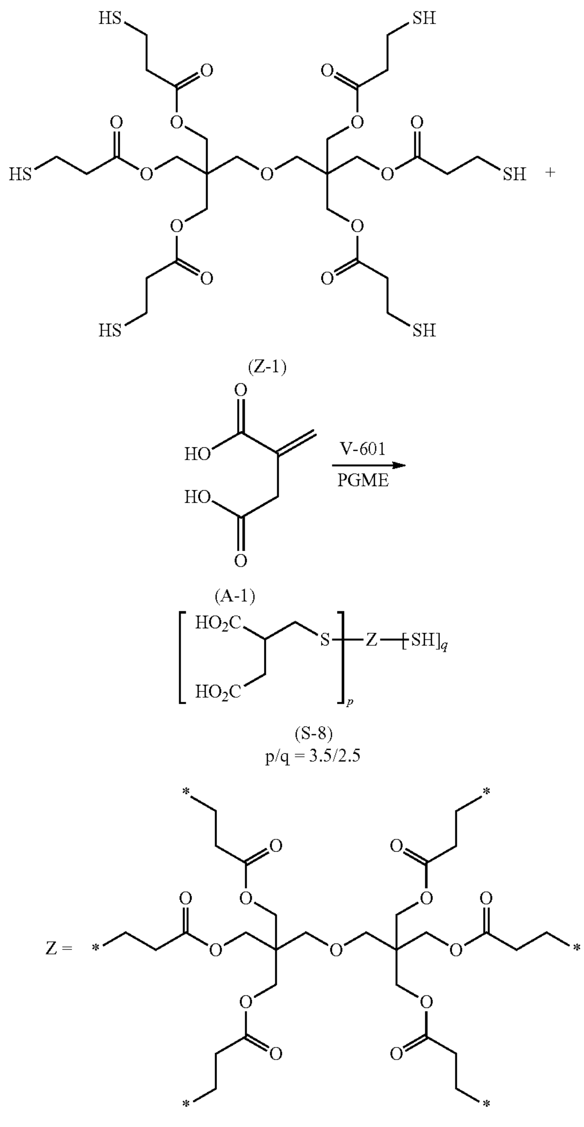

(Z-1)

(A-1)

(S-8)
p/q = 3.5/2.5

Z =

18.97 g of dipentaerythritol hexakis(3-mercaptopropionate) [(Z-1); manufactured by SC Organic Chemical Co., Ltd.] and 11.03 g of itaconic acid (A-1) were dissolved in 70.0 g of 1-methoxy-2-propanol, and heated to a liquid temperature of 90° C. under a nitrogen stream. The feed ratio at this time was 1.0:3.5 in terms of molar ratio.

49 mg of dimethyl 2,2'-azobis(2-methylpropionate) [V-601, manufactured by FUJIFILM Wako Pure Chemical Corporation] was added thereto and heated for 2 hours. 49 mg of V-601 was further added thereto, followed by reaction at a liquid temperature of 90° C. for 2 hours under a nitrogen stream. By cooling to room temperature, a 30% by mass solution of a mercaptan compound (S-8) in which Compound (A-1) was added to a part of sulfur atoms of Compound (Z-1) was obtained.

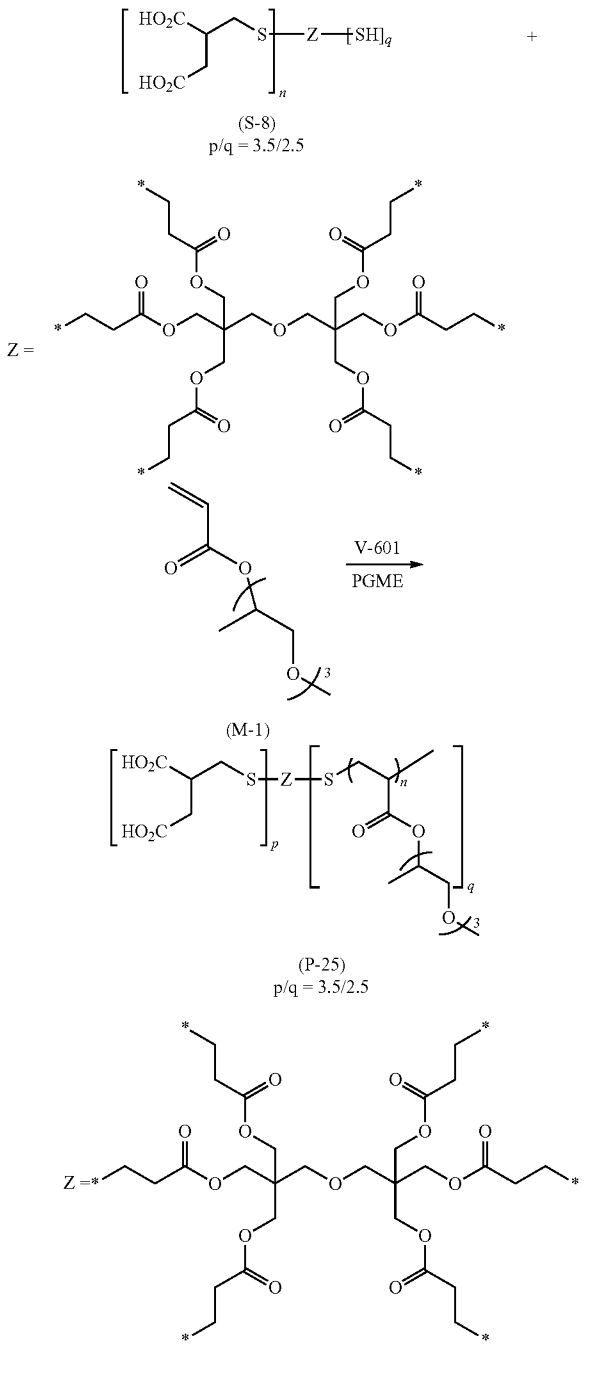

(S-8)
p/q = 3.5/2.5

Z =

(M-1)

(P-25)
p/q = 3.5/2.5

Z =

15.54 g of 1-methoxy-2-propanol was heated to 75° C. under a nitrogen stream. A solution obtained by dissolving 8.69 g of 30% by mass solution of the mercaptan compound (S-8), 27.39 g of methoxytripropylene glycol acrylate [(M-1), manufactured by Shin-Nakamura Chemical Co., Ltd.], and 73 mg of dimethyl 2,2'-azobis(2-methylpropionate) [V-601, FUJIFILM Wako Pure Chemical Corporation] in 10.91 g of 1-methoxy-2-propanol was added dropwise thereto for 2.5 hours, and then 5.57 g of 1-methoxy-2-propanol was added dropwise thereto over 10 minutes. Subsequently, the mixture was heated at a liquid temperature of 75° C. for 2.5 hours. 73 mg of V-601 was further added thereto, followed by reaction at a liquid temperature of 90° C. for 2 hours under a nitrogen stream. After cooling to room temperature, 1-methoxy-2-propanol was distilled off under reduced pressure at 70° C. Next, 20 g of methanol was added thereto, then the mixture was distilled off again under reduced pressure at 70° C. to obtain Compound (P-25) (weight-average molecular weight: see Table 2A and Table 2B, acid value: 28 mgKOH/g).

In Compound (P-25), the branched partial structure content is 95% by mass.

Example 18

Various evaluations were performed by the method described in Example 1, except that Compound (P-26) synthesized by the method described below was used.

Synthesis of Compound (P-26)

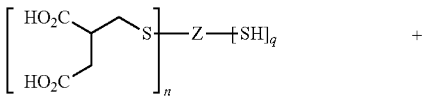

(S-1)
p/q = 3.5/2.5

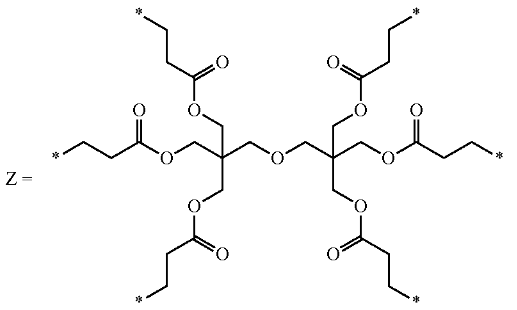

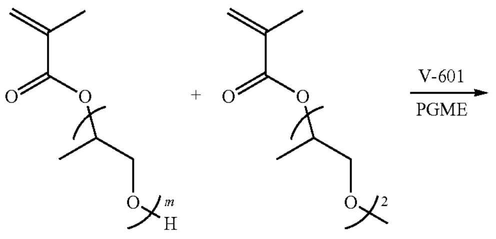

(M-26-1) (M-26-2)

-continued

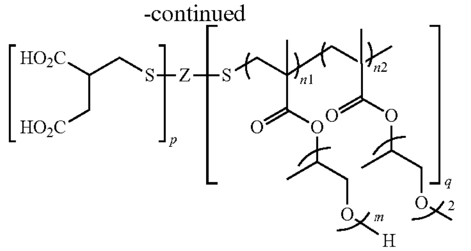

(P-26)
p/q = 3.5/2.5

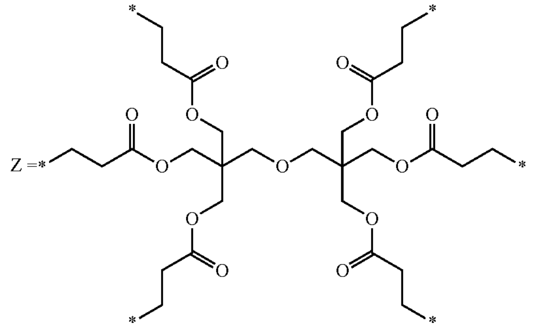

16.71 g of 1-methoxy-2-propanol was heated to 80° C. under a nitrogen stream. A solution obtained by dissolving 8.99 g of 300% by mass solution of the mercaptan compound (5-1), 13.65 g of polypropylene glycol methacrylate [(M-26-1), BLEMMVER PP-1000 manufactured by NOF CORPORATION], 13.65 g of methoxydiethylene glycol acrylate (M-26-2), and 75 mg of dimethyl 2,2'-azobis(2-methylpropionate) [V-601, FUJIFILM Wako Pure Chemical Corporation] in 32.71 g of 1-methoxy-2-propanol was added dropwise thereto for 2.5 hours, and the mixture was heated at a liquid temperature of 80° C. for 2.5 hours. 75 mg of V-601 was further added thereto, followed by reaction at a liquid temperature of 90° C. for 2 hours under a nitrogen stream. After cooling to room temperature once, 1-methoxy-2-propanol was distilled off under reduced pressure at 70° C. Next, 20 g of methanol was added thereto, then the mixture was distilled off again under reduced pressure at 70° C. to obtain Compound (P-26) (weight-average molecular weight: see Table 2A and Table 2B, acid value: 28 mgKOH/g).

In Compound (P-26), the branched partial structure content is 95% by mass.

Example 19

Various evaluations were performed by the method described in Example 1, except that Compound (P-27) synthesized by the method described below was used.

Synthesis of Compound (P-27)

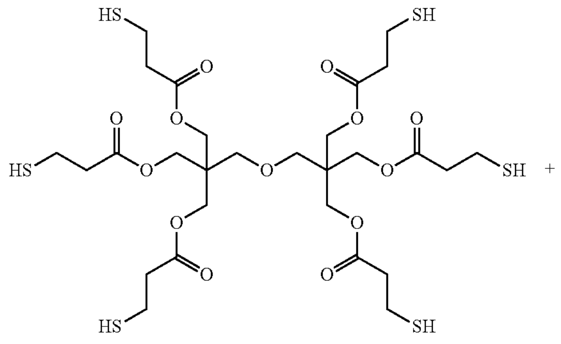

(Z-1)

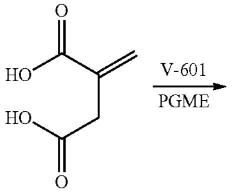

(A-1)

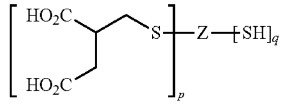

(S-9)
p/q = 4/2

Z =
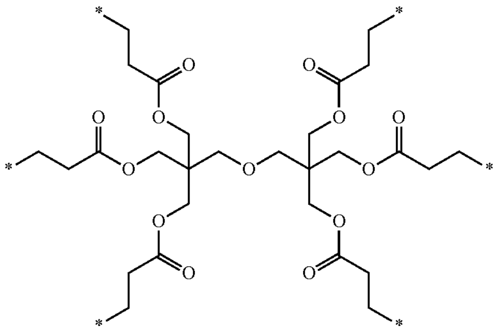

18.02 g of dipentaerythritol hexakis(3-mercaptopropionate) [(Z-1); manufactured by SC Organic Chemical Co., Ltd.] and 11.98 g of itaconic acid (A-1) were dissolved in 70.0 g of 1-methoxy-2-propanol, and heated to a liquid temperature of 90° C. under a nitrogen stream. The feed ratio at this time was 1.0:4.0 in terms of molar ratio.

53 mg of dimethyl 2,2'-azobis(2-methylpropionate) [V-601, manufactured by FUJIFILM Wako Pure Chemical Corporation] was added thereto and heated for 2 hours. 53 mg of V-601 was further added thereto, followed by reaction at a liquid temperature of 90° C. for 2 hours under a nitrogen stream. By cooling to room temperature, a 30% by mass solution of a mercaptan compound (S-9) in which Compound (A-1) was added to a part of sulfur atoms of Compound (Z-1) was obtained.

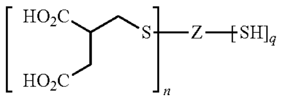

+

(S-9)
p/q =4/2

Z =
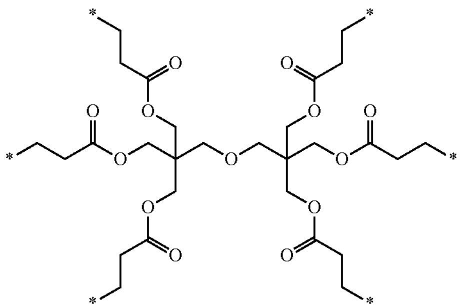

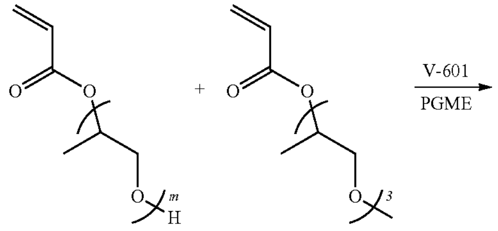

(M-27) (M-2)

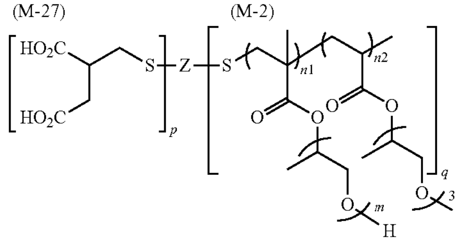

(P-27)
p/q = 4/2

Z =
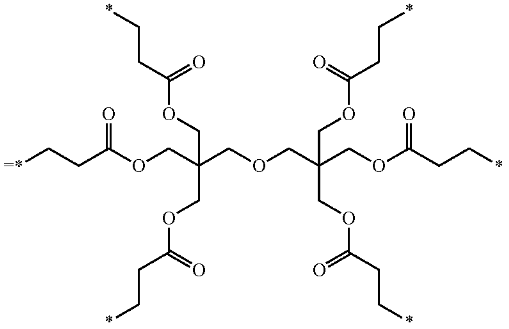

16.71 g of 1-methoxy-2-propanol was heated to 80° C. under a nitrogen stream. A solution obtained by dissolving 10.18 g of 30% by mass solution of the mercaptan compound (S-9), 13.47 g of polypropylene glycol acrylate [(M-27), BLEMMER AP-400 manufactured by NOF CORPORATION], 13.47 g of triethylene glycol acrylate (M-2), and 65 mg of dimethyl 2,2'-azobis(2-methylpropionate) [V-601, FUJIFILM Wako Pure Chemical Corporation] in 31.87 g of 1-methoxy-2-propanol was added dropwise thereto for 2.5 hours, and the mixture was heated at a liquid temperature of 80° C. for 2.5 hours. 65 mg of V-601 was further added thereto, followed by reaction at a liquid temperature of 90° C. for 2 hours under a nitrogen stream.

After cooling to room temperature once, 1-methoxy-2-propanol was distilled off under reduced pressure at 70° C. Next, 20 g of methanol was added thereto, then the mixture was distilled off again under reduced pressure at 70° C. to obtain Compound (P-27) (weight-average molecular weight: see Table 2A and Table 2B, acid value: 35 mgKOH/g).

In Compound (P-27), the branched partial structure content is 95% by mass.

The results are shown in Table 2A and Table 2B. $A^1$, $R^1$, Z, $R^2$, $P^1$, p, and q in Table 2A and Table 2B are $A^1$, $R^1$, Z, $R^2$, $P^1$, p, and q in General Formula (1), respectively. In the following, "*" represents a bonding position with an adjacent atom.

TABLE 2A

| | Compound | $A^1$ | $R^1$ | Z | $R^2$ | $P^1$ |
|---|---|---|---|---|---|---|
| Example 13 | (P-21) | 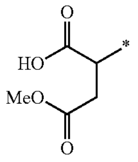 [SMILES: *C(CC(=O)OC)C(=O)O] | $-CH_2-$ | 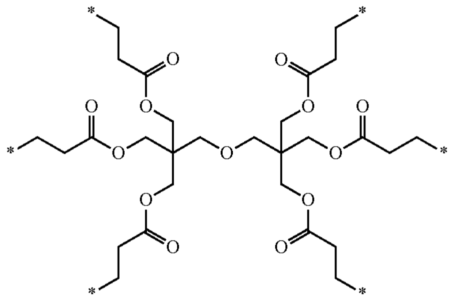 | Single bond | 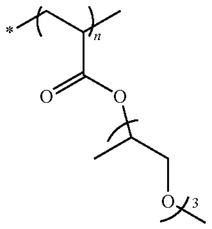 |
| Example 14 | (P-22) | 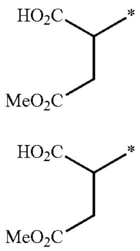 | $-CH_2-$ | 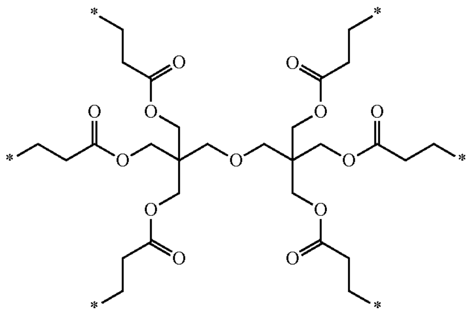 | Single bond | 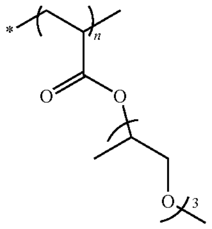 |
| Example 15 | (P-23) | 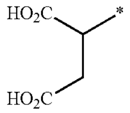 | $-CH_2-$ | 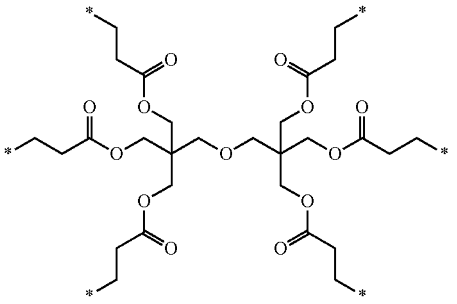 | Single bond | 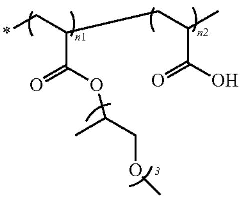 |
| Example 16 | (P-24) | 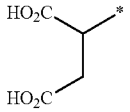 [SMILES: *C(CC(=O)O)C(=O)O] | $-CH_2-$ | 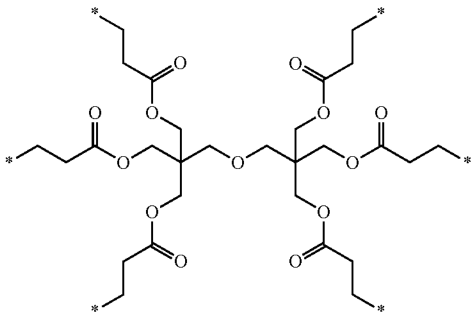 | Single bond | 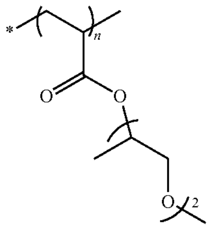 |

TABLE 2A-continued

| | Compound | $A^1$ | $R^1$ | Z | $R^2$ | $P^1$ |
|---|---|---|---|---|---|---|
| Example 17 | (P-25) | 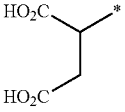 | —$CH_2$— | 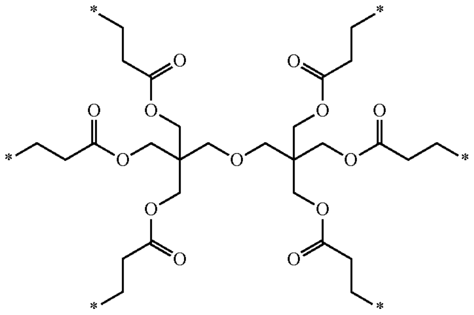 | Single bond | 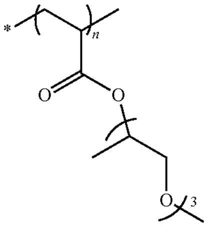 |
| Example 18 | (P-26) | 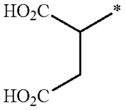 [SMILES: *C(CC(=O)O)C(=O)O] | —$CH_2$— | 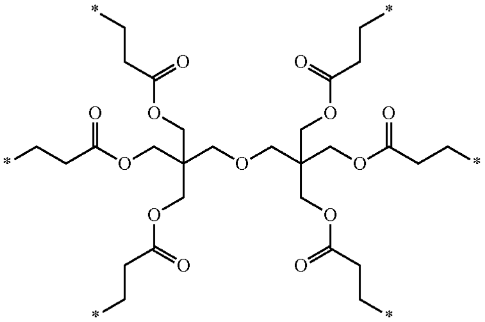 | Single bond | 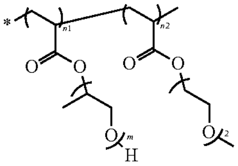 |
| Example 19 | (P-27) | 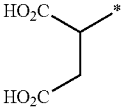 [SMILES: *C(CC(=O)O)C(=O)O] | —$CH_2$— | 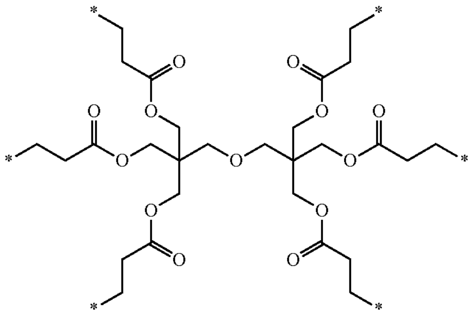 | Single bond | 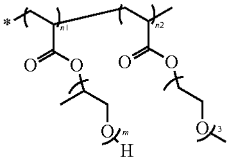 |

TABLE 2B

| | p | q | Weight-average molecular weight | Evaluation | | | |
|---|---|---|---|---|---|---|---|
| | | | | solubility | dispersibility 1 | dispersibility 2 | brightness |
| Example 13 cont. | 3.5 | 2.5 | 4500 | A | B | B | A |
| Example 14 cont. | 3.0/0.5 | 2.5 | 8000 | A | A | A | A |
| Example 15 cont. | 3.5 | 2.5 | 8000 | A | A | A | A |
| Example 16 cont. | 3.5 | 2.5 | 7000 | A | A | A | A |
| Example 17 cont. | 3.5 | 2.5 | 7500 | A | A | A | A |
| Example 18 cont. | 3.5 | 2.5 | 12000 | A | A | A | B |
| Example 19 cont. | 4 | 2 | 6000 | A | A | A | B |

Example 20

A wavelength conversion member was produced by the method described in Example 1 except that 0.1 parts by mass of Compound (P-24) was used instead of 1 part by mass of Compound (P-1) in the preparation of the quantum dot-containing polymerizable composition in the method for producing a wavelength conversion member described in Example 1, and the evaluation of the brightness was A.

Example 21

A wavelength conversion member was produced by the method described in Example 1 except that 0.1 parts by mass of the compound (P-25) was used instead of 1 part by mass of the compound (P-1) in the production of the quantum dot-containing polymerizable composition in the method for producing a wavelength conversion member described in Example 1, and the evaluation of the brightness was A.

From the results shown in Table 2A and Table 2B, it can be confirmed that Compounds (P-21) to (P-27) exhibited high solubility in the polymerizable compound and contributed to an enhancement in the dispersibility of the inorganic particles in both of the polymerizable composition containing inorganic particles and the polymerizable composition further containing quantum dots.

Furthermore, from the results shown in Table 2A and Table 2B and the above-described results of Examples 20 and 21, it can be also confirmed that the wavelength conversion member produced using the quantum dot-containing polymerizable composition containing Compounds (P-21) to (P-27) was a wavelength conversion member capable of emitting light with high brightness.

One aspect of the present invention is useful in various technical fields in which inorganic particles are utilized.

EXPLANATION OF REFERENCES

10, 10A, 10B: wavelength conversion member
12: first substrate film
12*a*, 14*a*: support film
12*b*, 14*b*: barrier layer
14: second substrate film
16: wavelength conversion layer
18: resin layer
18*a*: concave portion
20: quantum dot-containing portion
24, 24*e*: quantum dot
26: matrix
28: mixed layer
30: impermeable layer
34: underlying organic layer
36: inorganic layer
38: protective organic layer
50: backlight unit
52A: light source
52B: light guide plate
52C: planar light source
54: wavelength conversion member
56A: reflecting plate
56B: retroreflective member
60: liquid crystal display device
62: liquid crystal cell unit
64: liquid crystal cell
68, 70: polarizing plate
72, 74: polarizer
76, 78, 82, 84: polarizing plate protective film
L1: composition for forming resin layer
L2: quantum dot-containing polymerizable composition
L3: coating liquid containing oxygen-impermeable material
M: mold

What is claimed is:

1. A compound represented by General Formula (1),

General Formula (1)

$$\left(A^1-R^1-S\right)_p Z\left(S-R^2-P^1\right)_q$$

in General Formula (1),
p is in a range of 2 to 9,
q is in a range of 1 to 8,
p+q is an integer in a range of 3 to 10,
Z represents a (p+q)-valent organic group,
$R^1$ and $R^2$ each independently represent a single bond or a divalent organic group,
$A^1$ represents a monovalent group including one or more groups selected from the group consisting of an acidic group, a basic group having a nitrogen atom, a urea group, a urethane group, a group having a coordinating oxygen atom, a hydrocarbon group having 4 or more carbon atoms, an alkoxysilyl group, an epoxy group, an isocyanate group, and a hydroxy group,
p pieces of $A^1$'s and p pieces of $R^1$'s may be each independently the same as or different from each other,
$P^1$ represents a polymer structure including a partial structure represented by General Formula (2), and
in a case where q is 2 or more, q pieces of $P^1$'s and q pieces of $R^2$'s may be each independently the same as or different from each other, General Formula (2)

$$*-X^2-O\left(Y^1-O\right)_{n1}X^1$$

in General Formula (2),
n is 1 or more,
* represents a bonding position with an adjacent atom,
in a case where n1 is 1, $X^1$ represents a monovalent organic group, $X^2$ represents a divalent organic group, $Y^1$ represents a branched divalent hydrocarbon group, and $Y^1$ and $X^1$ or $X^2$ may form a ring, provided that the ring is a four- or more membered ring, and
in a case where n1 is 2 or more, $X^1$ represents a hydrogen atom or a monovalent organic group, $X^2$ represents a divalent organic group, $Y^1$ represents a divalent organic group, one or more $Y^1$'s each represent a branched divalent organic group, and $Y^1$ and $X^1$ or $X^2$ may form a ring, and n1 pieces of Y's may be the same as or different from each other.

2. The compound according to claim 1,
wherein the partial structure represented by General Formula (2) includes a vinyl polymer chain.

3. The compound according to claim 2,
wherein the vinyl polymer chain contains a repeating unit represented by General Formula (4-1), General Formula (4-1)

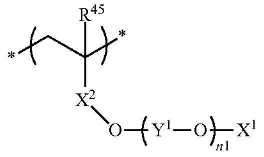

in General Formula (4-1), $R^{45}$ represents a hydrogen atom or a methyl group, $X^1$, $X^2$, $Y^1$, and n1 each have the same definitions as $X^1$, $X^2$, $Y^1$, and n1 in General Formula (2), and * represents a bonding position with an adjacent atom.

4. The compound according to claim 3, wherein the repeating unit represented by General Formula (4-1) is a repeating unit represented by General Formula (4-3), General Formula (4-3)

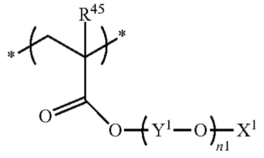

in General Formula (4-3), $R^{45}$ represents a hydrogen atom or a methyl group, $X^1$, $Y^1$, and n1 each have the same definitions as $X^1$, $Y^1$, and n1 in General Formula (2), and * represents a bonding position with an adjacent atom.

5. The compound according to claim 1, wherein the polymer structure represented by $P^1$ includes a polyalkylene glycol chain.

6. The compound according to claim 5, wherein in General Formula (2),

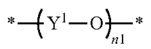

represents a polyalkylene glycol chain, where * represents a bonding position with an adjacent atom.

7. The compound according to claim 5, wherein the polyalkylene glycol chain is a polypropylene glycol chain.

8. The compound according to claim 1, wherein the compound has a weight-average molecular weight of a range of 4,000 to 15,000.

9. The compound according to claim 1, wherein a content of the partial structure represented by General Formula (2) in the polymer structure represented by $P^1$ is 30% by mass or more, provided that in the case where n1 is 2 or more, the partial structure is a moiety in which $Y^1$ is a branched divalent organic group.

10. The compound according to claim 1, wherein a content of the partial structure represented by General Formula (2) in the polymer structure represented by $P^1$ is 70% by mass or more, provided that in the case where n1 is 2 or more, the partial structure is a moiety in which $Y^1$ is a branched divalent organic group.

11. The compound according to claim 1, wherein the compound has a weight-average molecular weight of a range of 4,000 to 15,000, the partial structure represented by General Formula (2) includes a vinyl polymer chain, the vinyl polymer chain contains a repeating unit represented by General Formula (4-3), General Formula (4-3)

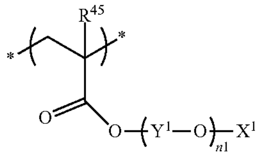

in General Formula (4-3), $R^{45}$ represents a hydrogen atom or a methyl group, $X^1$, $Y^1$, and n1 each have the same definitions as $X^1$, $Y^1$, and n1 in General Formula (2), and * represents a bonding position with an adjacent atom, the polymer structure represented by $P^1$ includes a polypropylene glycol chain, and a content of the partial structure represented by General Formula (2) in the polymer structure represented by $P^1$ is 70% by mass or more, provided that in the case where n1 is 2 or more, the partial structure is a moiety in which $Y^1$ is a branched divalent organic group.

12. A polymerizable composition comprising:

the compound according to claim 1;

inorganic particles; and a polymerizable compound.

13. A cured product obtained by curing the polymerizable composition according to claim 12.

* * * * *